(12) United States Patent
Virhiä

(10) Patent No.: US 9,756,491 B2
(45) Date of Patent: Sep. 5, 2017

(54) SYSTEM AND METHOD FOR SOCIAL SENSOR PLATFORM BASED PRIVATE SOCIAL NETWORK

(71) Applicant: Personal Sensors Interactive Ltd, Vaajakoski (FI)

(72) Inventor: Toni Matti Virhiä, London (GB)

(73) Assignee: Zen-Me Labs Oy, Tampere (FI)

(*) Notice: Subject to any disclaimer, the term of this patent is extended or adjusted under 35 U.S.C. 154(b) by 90 days.

(21) Appl. No.: 14/631,602

(22) Filed: Feb. 25, 2015

(65) Prior Publication Data

US 2016/0142891 A1    May 19, 2016

Related U.S. Application Data

(60) Provisional application No. 62/079,948, filed on Nov. 14, 2014.

(51) Int. Cl.
  *H04W 4/20* (2009.01)
  *H04W 4/00* (2009.01)
  *G06Q 10/00* (2012.01)
  *H04W 84/18* (2009.01)

(52) U.S. Cl.
  CPC .......... *H04W 4/206* (2013.01); *G06Q 10/00* (2013.01); *H04W 4/008* (2013.01); *H04W 84/18* (2013.01)

(58) Field of Classification Search
  CPC combination set(s) only.
  See application file for complete search history.

(56) References Cited

U.S. PATENT DOCUMENTS

| | | |
|---|---|---|
| 2005/0075116 A1* | 4/2005 | Laird ............. A61B 5/04 455/456.3 |
| 2005/0258937 A1 | 11/2005 | Neuwirth |
| 2006/0022815 A1 | 2/2006 | Fischer |
| 2006/0271392 A1 | 11/2006 | Komaki |
| 2007/0250410 A1 | 10/2007 | Brignone |
| 2007/0266310 A1 | 11/2007 | Sasaki |
| 2009/0209904 A1* | 8/2009 | Peeters .......... A61B 5/0002 604/66 |
| 2010/0027426 A1 | 2/2010 | Nair |
| 2011/0200226 A1 | 8/2011 | Takahata |
| 2013/0064197 A1* | 3/2013 | Novak .......... H04W 72/085 370/329 |
| 2014/0253289 A1 | 9/2014 | Groth |

FOREIGN PATENT DOCUMENTS

| | | |
|---|---|---|
| EP | 0901090 | 3/1999 |
| WO | 0184839 | 11/2001 |
| WO | 2008038017 | 4/2008 |
| WO | 2010035025 | 4/2010 |
| WO | 2010067205 | 6/2010 |

OTHER PUBLICATIONS

"Internet of things"—Wikipedia, Nov. 9, 2014, https://en.wikipedia.org/w/index.php?title=internet_of_things&oldid=633143778.

* cited by examiner

*Primary Examiner* — Kabir A Timory
(74) *Attorney, Agent, or Firm* — BelayIP Oy

(57) ABSTRACT

The present systems and methods are directed to a private network of personal social sensors. The sensors are irreversibly paired with a communication device which ensures privacy of data. The sensors communicate data via a short range communications link to a communication device that in turn securely transmits the sensor data to a secure data store. A user may share their data with others within their social sensor network.

20 Claims, 53 Drawing Sheets

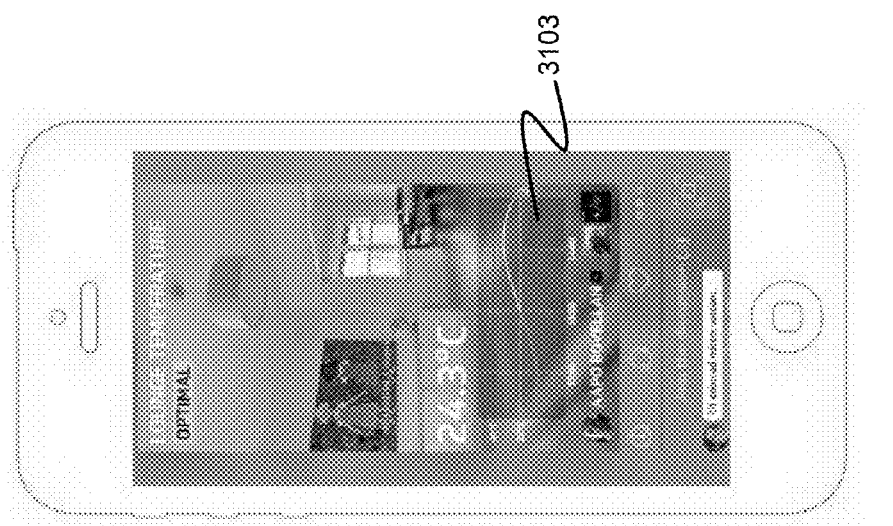
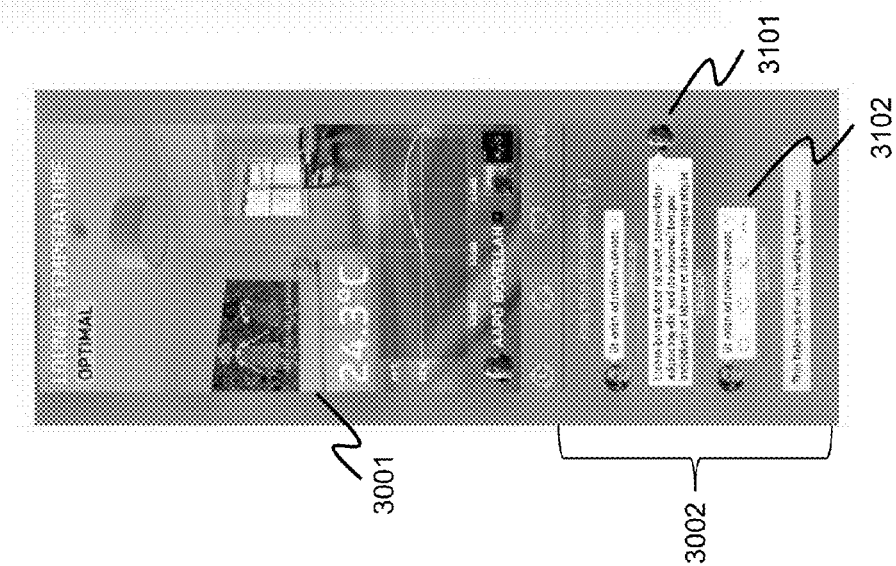
FIG. 31b
FIG. 31a

SYSTEM AND METHOD FOR SOCIAL SENSOR PLATFORM BASED PRIVATE SOCIAL NETWORK

CROSS REFERENCE

The present application claims the benefit of U.S. Provisional Application No. 62/079,948 filed Nov. 14, 2014, which is incorporated herein by reference in its entirety.

FIELD

The present disclosure relates to a private network of social sensors generally and more specifically to devices, systems and methods for creating and utilizing a private personal sensor network and platform that securely gathers and monitors environmental parameters and interfaces with a network.

BACKGROUND

Portable electronic devices such as smart phones and tablets have become ubiquitous in everyday life, allowing users to monitor and share their personal everyday experiences with their friends or the world. This includes sharing photos, videos, music, messages and just about all other aspects of daily life. Becoming ever more prevalent are personal sensor devices that monitor fitness and health and allow the wearer to track and share exercise, diet and sleep habits or to monitor it via a smart device. Furthermore, there are social media sites, like Facebook™ and Instagram™ that allow users to share every aspect of their daily lives, from the moment they awake in the morning until they sleep at night. Some user voluntarily share this information on social media sites, such as Facebook™ Instagram™ or Twitter™ while others only wish to share it with a close network of friends or to keep it private. Unfortunately, there are many people who look to exploit this available personal information for various purposes, including identify theft, stalking, bullying, etc. This is often a result of unsecure data transmissions, computer hacking of devices, storage media or interception of unsecure data in transit. Further, it is often the case that the user loses control and ownership of their data.

Accordingly, a need exists for a device, system and method for collecting, storing and transmitting secure personal information with the ability to securely share it on a limited or wide basis. Further, it is necessary to have a system where a user can keep and control data in a private manner and selectively share it when and with whomever they choose. Further, there is a need for a system and service wherein the user maintains the ownership of the data.

Social media usage continues to expand and users look to share not only their personal comments and photos, but their interactions with the surroundings and their environment. To do this personal sensors are being developed that allow users to monitor and share eating, sleeping, and exercise habits. There are also numerous wireless sensors and home automation devices that allow users to monitor and control temperature, humidity, ambient light, etc. Many of these sensors communicate through various applications over Wi-Fi or the internet and allow users to monitor these sensors and often control lights, thermostats, alarms, etc. The various sensors involved are often bulky, consume large amounts of power and are often aesthetically unpleasing. Additionally these sensors often do not protect the data they collect and share and are vulnerable to monitoring and interception because the collected data is intended to be transmitted outside a closed environment. Accordingly, a need exists for a sensor and system that is secure, utilizes low power, is aesthetically pleasing, expandable, manages privacy through the use of a personal hardware gateway, allows a user to designate privacy setting on a granular basis, and allows a user to share information in a social environment.

SUMMARY OF THE INVENTION

Accordingly, in the present system, the privacy tools and security features are fundamental to establish data ownership and privacy. In an embodiment, the present system not only enables user's to gather, monitor, and share data, but it also enables the user to maintain private ownership of the data, and to do what ever they choose with the data including auction or otherwise sell or dispose of the data on the user's terms. Unlike, present system that exploit user data and effectively claim ownership of user data, the present system allows users to maintain 100% control of the personal data. The system will not share anything outside of the system without the user's express authorization. In an embodiment, user can even determine where the data is saved. That is, a user may easily avoid any third party storage or third party clouds In an embodiment, a system for gathering data comprising a sensor with a unique sensor ID, a communications device with a unique communication device ID and a data store are disclosed. The sensor is paired with the communications device in an exclusive relationship based on the sensor ID and the communications device ID, the communications device is paired with the data store based on the communications device ID, and the sensor communicates a sensor data to the communications device via a first communications link, and the communications device communicates the sensor data to the data store via a second communications link.

In another embodiment, the system further comprises a device certificate. The device certificate comprises an information code associated with the unique sensor ID or the unique communications device ID. In another embodiment, the first communications link is a short range communications link. In still another embodiment, the information code is a machine readable code. In still another embodiment, the device certificate is a paper certificate and the information code is unique to the sensor or the communications device. In still another embodiment, the device certificate is available electronically and the information code is unique to the sensor or the communications device.

In another embodiment, the sensor data in the data store may be shared with a plurality of users. In another embodiment, the communications device substantially instantaneously, inhibits the sharing of the sensor data at the request of a data owner.

In embodiment, a method for collecting data is disclosed. The method comprising, generating, via a sensor, sensor data related to an environmental parameter; transmitting, from the sensor, via a short range communications link, the sensor data to a communications device; receiving, at the communications device, the sensor data, transmitting, from the communications device, to a network, via a communications link, the received sensor data, receiving at a data store, via the network, the transmitted sensor data; and storing the sensor data in the data store.

In another embodiment, the method further comprises displaying the sensor data on a display of a personal user device, wherein the displayed sensor data is associated with at least one of the following: a geographic location, a user, a sensor type, a geographic region, a vendor, a residence, a commercial establishment, a vehicle, a building, a storage location, and a facility. In still another embodiment, the displayed sensor data is positioned on an underlying map, and the map may display a personal space layer.

In another embodiment, the method further comprises determining a data storage location based on a user selected data storage setting, wherein the data storage setting may be selected from a private storage setting or a third-party storage setting. In another embodiment, the plurality of users can provide comments on the collected data in near real time. In still another embodiment, pairing the sensor to the communications device is done in an exclusive relationship based on the sensor ID and the communications device ID.

In another embodiment, the communications device pairs with a plurality of sensors. In still another embodiment, the pairing between the sensor and the communications device is irreversible.

In an embodiment, a method for establishing sensor data privacy is disclosed. The method comprises installing a client on a first communications device, establishing, via a first short range communications link, a connection between the first communications device and a second communication device, communicating, via a communications link, between the first communications device and a database, inputting, into the first communications device, a unique ID associated with the second communications device, transmitting, via the communications link, the unique ID associated with the second communications device, authenticating the second communications device, by comparing the unique ID associated with the second communications device to data stored in the database, and pairing, based on the authentication, the first communications device and the second communications device.

In another embodiment, the method comprises, establishing, via a second short range communications link, a connection between the second communications device and a sensor, inputting, via the client, a sensor ID associated with the sensor, transmitting, via the communications link, the sensor ID to the database, authenticating the sensor, by comparing the sensor ID to data stored in the database, pairing, based on the authentication, the sensor with the first communications device and the second communications device.

In another embodiment, the method comprises, transmitting sensor data from the sensor, via the second short range communications link, to the second communications device, receiving, at the second communications device, the sensor data, transmitting from the second communications device, via a second communications link, the received sensor data, receiving, the transmitted sensor data; and storing the sensor data in a secure data store. In still another embodiment, the method comprises displaying the sensor data on a map display based on location data associated with the stored sensor data.

BRIEF DESCRIPTION OF THE DRAWINGS

FIGS. 31A-B depicts an activity screen with a social network in accordance with an embodiment of the present disclosure;

DETAILED DESCRIPTION

Figure 1:
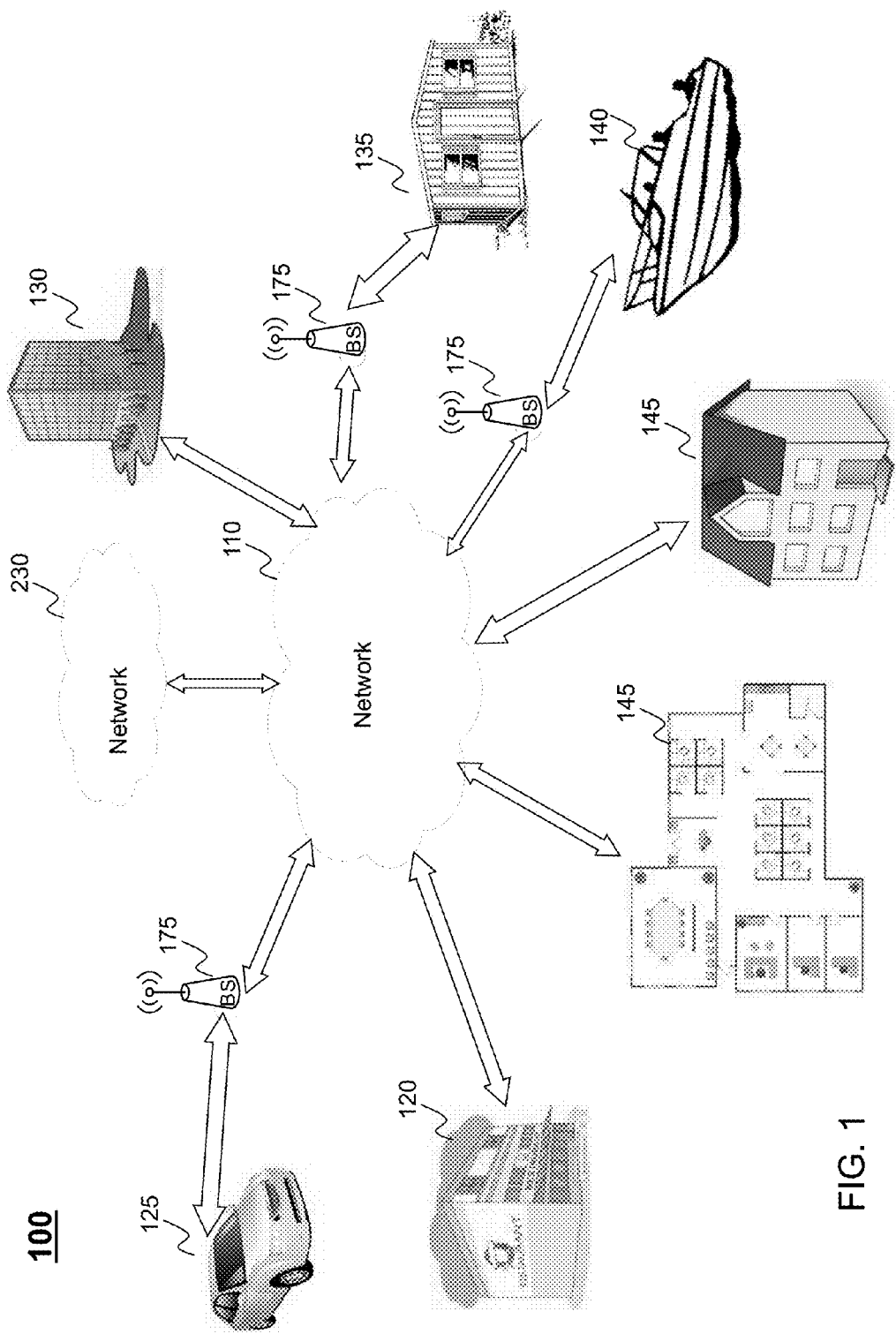
FIG. 1 depicts a sensor social network in accordance with an embodiment of the present disclosure.

FIG. 1 depicts a network in accordance with an embodiment of the present disclosure. The sensor network 100 may include a series of proprietary sensors, third party sensors, controllable switches, cameras, etc. or other devices. It is to be understood, that the term sensors as used herein may included sensors for gathering data from the surroundings, as well as controllable switches, cameras, proximity detector and other monitored devices. Sensors may be deployed in many different environments, such as retail locations 120, cars, 125, office buildings, 130, storage buildings, 135, boats, 140 homes, and offices and/or apartments 145. The deployed sensors may then communicate to network 110 directly or via a cellular network 175. Network 110 may be any wide area network such as the internet which may then communicate with other networks 230. Network 230 may be a private network with private storage capabilities or may be a personal user network with personal storage capabilities. Network 230 may include any one network or several networks, including a LAN, WAN or open source global network, public or private, or any combination thereof with access to the sensor platform coupled to the network, and the devices coupled to the network, are included in such reference. It should be understood that all of the disclosed systems and methods may be performed by a distributed system. Such a distributed system may be based on a local area network (LAN) operating within a single location, a wide area network (WAN) encompassing several locations, or an open systems network such as the Internet. It should be further understood that devices used in accordance with the present invention may couple directly or indirectly, through wired or wireless communications to a global data network, and the network may comprise a private network.

In an embodiment, the deployed sensors communicates via a short range communications technology such as Bluetooth or Bluetooth Low Energy, ZigBee, Ru-Bee, infrared, Wi-Fi, through a personal communications device such as a dedicated link device or through a mobile communications device to network 110. The link device may be a personal gateway for transmitting the sensor data to network 110. In an embodiment, the sensor data is communicated to network 230 which may store the information in a proprietary storage or in a personal storage. Personal storage may include, but is not limited to a dedicated personal hardware space on a personal network, a home network a personal cloud storage space or any storage space dedicated to the user. A proprietary storage may include a storage provided by a communications provider, the sensor provider, the sensor platform provider or any combination thereof. A key to the sensor network 100 is its ability to keep the data gathered by the sensors secure and private. In an embodiment, this is accomplished by uniquely pairing sensors with link devices, personal communications devices and storage locations. By pairing the devices they can only communicate with their paired components, as such, the data will remain secure throughout the network because the data can not be intercepted by a device that has not previously been associated with the specific system components.

In an embodiment, each sensor and link device has a unique multi-digit ID number associated with it. The multi-digit ID number or "silicon ID" is hard wired into a hardware component that stores the ID number by hardware. In an embodiment, the ID number is hardwired into a chip using a one time programmable (OTP) fuse method. In this embodiment, the component has a number of fuses that are permanently blown to either represent a 0 or 1 and the code is this way burned by the number of fuses into the component. In this manner, the hard wired ID number can not be altered any way. Each component with a multi-digit ID number is unique based on the ID number they represent to the system. A database of the unique ID numbers may be maintained in a secure database. This allows the network to confirm the pairing of devices based on the unique ID numbers. It is to be understood, that the secure database of ID numbers must be maintained in such a manner as to not allow access to the unique device ID data.

In an embodiment, once a user has paired a sensor with a link device or other device, the sensor data will be maintained by the user in a secure storage in network 230 or may be stored in the user's personal storage. This data may also be selectively shared with other members of the sensor network if the data owner so chooses. In this way, users may share and use data generated by other users, thereby creating a social network of sensor data users. This sharing of data allows others a view into the "real world" of their contacts on the sensor network, prompting an exchange of real world information about each other. By sharing data between users, a user's "virtual" network is greatly expanded. For example, a user who wishes to know the humidity in a given area does not need to place his or her own humidity sensor in that area if another user is willing to share data from a humidity sensor already placed in that area. This creation of an expanded "virtual" network expands the scope and amount of data available to a user and the social community as a whole.

Devices used in the sensor network may take any number of different forms, including personal computers, notebook computers, palm-top computers, hand-held computers, smart devices, such as mobile phones, televisions, tablets, web appliances, and the like, and/or any device which is capable of receiving and processing digital data via a network connection.

Figure 2:
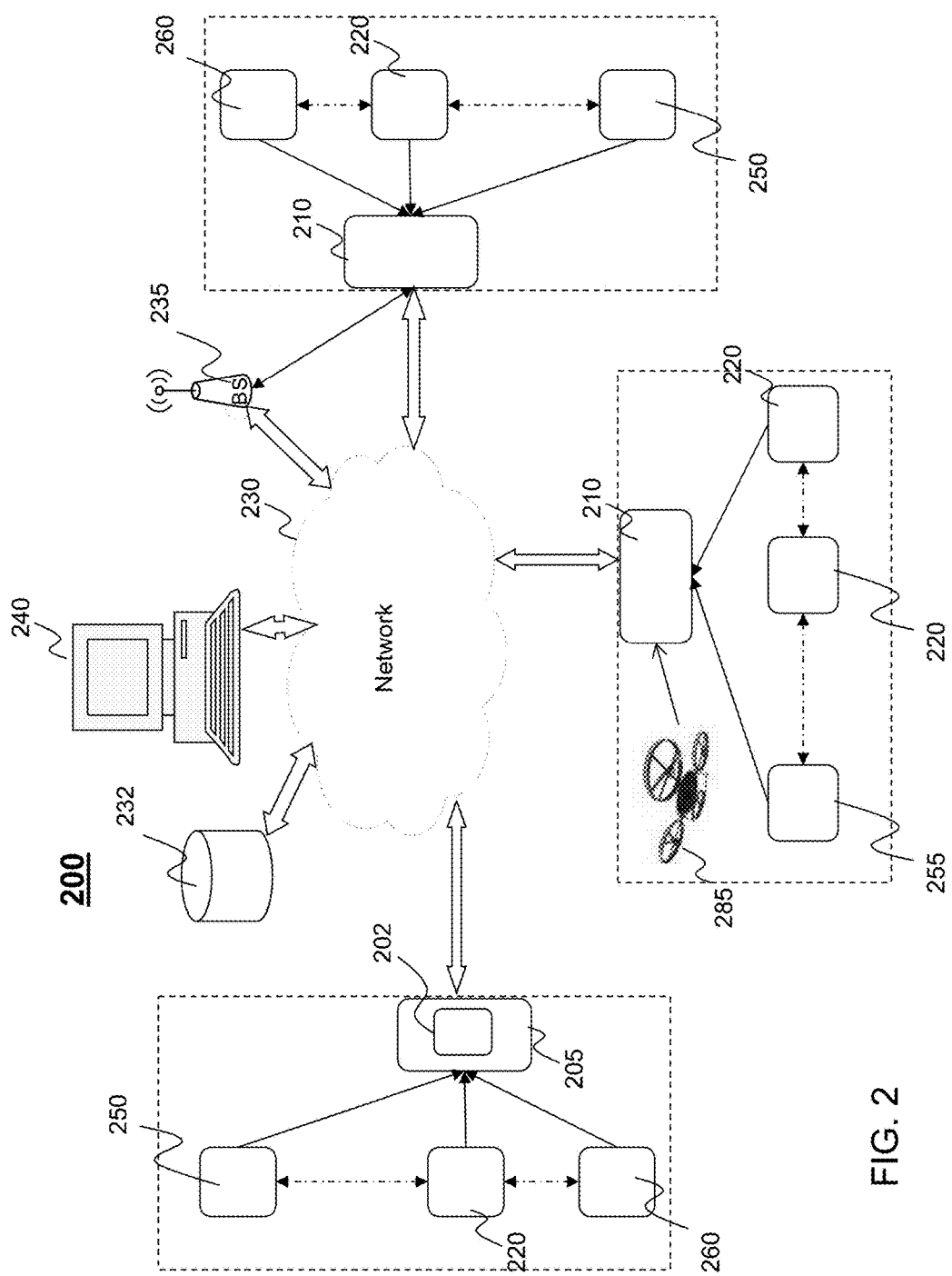
FIG. 2 is a diagram of a sensor social networking platform in accordance with an embodiment of the present disclosure.

FIG. 2 depicts a view of the sensor platform 200. Sensor platform 200 may comprise link device 210 which connects sensors 220 and other wireless devices, via a short range communications link, such as Bluetooth, Bluetooth Low Energy, ZigBee, Ru-Bee, infrared, or Wi-Fi to backend systems via network 230, secure data storage 232, and a browser application 240. Bluetooth or Bluetooth Low Energy (BLE) is generically used herein to refer to any short range communications link. Sensors 220 and other devices may communicate via short range communications to a paired mobile device 205, such as a mobile phone or tablet which has client 202 installed.

Link device 210 is a personal privacy gateway and may communicate to network 230 via Wi-Fi, 3G, 4G, or any other over the air communications standard. Link device 210 may have a GPS receiver for maintaining and reporting its location and may have a multi-frequency transceiver for receiving and transmitting information wirelessly. Link device 210 may be DC powered via USB port, induction, or any other charging means, and/or comprises an internal battery for back-up. Link device 210 may interface with switch 250, off-grid switch 255 or beacon 260 in addition to the various sensors 220.

Switch 250 is a remote controlled AC switch with energy measurement capabilities. Switch 250 may allow other AC powered devices to be plugged into it, thereby providing power capabilities to the remote device. Off-grid switch 255 may be a remote controlled switch with 12 VDC applications. Beacon 260 may be a sensor type device used for proximity applications. In an embodiment, the link device 210 enables interfacing of third party sensors.

Sensors

Sensors are an integral component of the present disclosure. Sensors are typically used to measure one or more specific environmental conditions but may also include video cameras, audio devices, thermal imaging devices, etc. The sensors in an embodiment communicate with a low energy short range communications protocols, such as low energy Bluetooth (BLE) although other protocols are acceptable. Other protocols include but are not limited to standard Bluetooth, ZigBee, Ru-Bee, Wi-Fi mobile data such as 3G/4G. In an embodiment, sensors are irreversible paired with a link device 210 when in use. This pairing ensures privacy and prevents unintended monitoring. The system level privacy functionality between a sensor and the link device prevent a sensor's data from being intercepted and/or otherwise compromised.

Sensors may include, but are not limited to relative humidity and temperature, ambient light, vibration, motion, sound and leak although many other sensors are contemplated. Some other sensors may include pH, moisture, video personal fitness, proximity, shock and pressure, time lapse, density, particle, visual, molecular, seismic, air quality, etc. In some embodiments, sensors may be mounted in mobile platforms like flying autonomous sensor 285.

In some embodiments, the sensors have internal power sources such as rechargeable Lithium batteries, although other power sources such as traditional batteries (non-chargeable), capacitors, energy cells, or real-time energy harvesting such as electromagnetic, radio waves or induction may be contemplated. In an embodiment, the sensors comprise an internal solar cell for recharging or directly powering the sensor device 220.

In certain embodiments, the sensors have at least the following main hardware features. A low energy short range communications interface such as a BLE 4.1 interface which can be based on a CSR1012 type chip, although other chipsets and communication protocols are possible.

Each sensor may also have an internal antenna, memory such as a EEPROM to store application software as well as operating and other parameters. In various embodiments each sensor may have an internal power source such as a battery as well as circuitry to enable a charging functionality. In an embodiment, an external power source is used, although due to the size of the sensors, such an external source is not the primary power source. In an embodiment, each sensor will have its own security and privacy functionality based on a unique internal authentication code assigned to each sensor. This authentication number may be a 32 bit hard wired serial number although other security and privacy criteria and configurations may be used.

In an embodiment, each sensor will be able to harvest solar energy through the face of the sensor. The solar energy may be used to power the sensor directly and/or charge the internal power source. In some embodiments, the solar energy may be obtained from ambient light. Because of the need to harvest solar or ambient light, the face of the sensor may be configured to optimize the passage and/or collection of such solar or ambient light. Alternatively and/or additionally the sensor may have a integrated portion which is able to process solar and/or ambient light.

In some embodiments, the sensors may be a temperature and/or relative humidity sensor with the actual detector located on the inside of the sensor device. In an embodiment, the temperature and/or relative humidity will be detected from the air. In an embodiment a leak detector sensor may include a sensor that monitors and detects leakage or flooding of liquids. This may comprise an internal sensor, a surface mounted sensors or an external sensor. Additionally and/or alternatively, sensors may have an external contacts utilizing resistive detection between the contacts to detect leaks. Further, sensors may have external probes for placing in a location or environment, where placement of the sensor body is not possible.

In some embodiments, vibration sensors may be deployed within the network. Vibration sensors may detect acceleration with an internal accelerometer as well as 2D and 3D motion. Vibration detection may also include detection of position or some predefined pattern, motion or amplitude. In an embodiment, motion detectors are used to detect the motion of an object in proximity to the sensor. The detection may be based on passive IR-detection with a passive IR sensor or active IR detection. The motion sensor may also be based on thermal variations, changes in air current, interruptions with electromechanical beams or waves.

An embodiment may include the use of an ambient light sensor which may detect changes in and/or the strength of ambient light through the front surface of the sensor. An audio or sound sensor may be used in an embodiment to detect absolute or relative levels of sound or may detect changes in the ambient sound levels. Such sensors may detect specific frequencies, audio patterns, or vocal recognition.

In an embodiment, proximity beacons as well as control devices are considered sensor type devices and may also employ BLE and energy harvesting hardware techniques similar to the sensors. Control devices may be either switch based or off-grid based. Switch based control devices may operate on AC voltage and may be employed to control other devices. Off-grid control devices may control devices used to control devices requiring DC power.

The switch control device, in an embodiment, has a BLE chipset, an internal antenna, memory, typically in the form of a EEPROM to store the application software and other parameters. The switch control device may utilize power from an AC power supply when connected with a main power source. In an embodiment, the switch control device will have one or more AC-sockets or receptacles for power output to the controlled device. The output is remotely controlled over BLE. The switch control device may be used to measure consumed power, regulate, detect and control power. Like sensors, the devices may comprise security and privacy functions based on internal authentication codes and additionally may comprise USB outputs for charging.

Off-grid switching devices may comprise a BLE chip set, an internal antenna, memory storage, and a DC power output. The DC output may be remotely controlled over the BLE connection. Like the switched control device, the off-grid device may monitor power usage, time of usage, consumption, etc. It may comprise security and privacy functionality based on a unique internal authentication code.

In an embodiment, sensors may be mobile either through dedicated programming and/or managed control or through autonomous control. In an embodiment, one such sensor may be a flying autonomous sensor with similar flying qualities to an airborne platform based sensor. The airborne based sensor may be mounted in an aerial platform intended for indoor use and in particular use, within a personal space, such as a home, warehouse, business or office. The flying autonomous sensor may be programmed to periodically take flight in a predetermined pattern to monitor and or sense conditions within a room, building, indoor structure, or any other controlled area. In an embodiment, the flying autonomous sensor is powered through an on board battery or other power device such as solar. The flying autonomous sensor may be charged thorough an induction type circuit or may have an onboard battery. It may also be charged through solar, RF, turbine, magnetic induction, or any other methods. In an embodiment, when not in flight, the flying autonomous sensor may rest on an induction type power charger and be available as required. The flying autonomous sensor may reside within a niche in a wall, on a shelf or in any other non-obtrusive location when not in flight. In an embodiment, at a predetermined time or in response to another stimulus, the flying autonomous sensor may self deploy to gather the required sensor data. Data that may be collected in this manner, may include but is not limited to, motion data, temperature data, ambient light data, noise data, or any other type of sensor data. In an embodiment, the flying autonomous sensor may gather and update structural 3-D data of an indoor space as well as maintaining visual augmented reality of the indoor space. In this manner, due to its ability to change positions and views, the flying autonomous sensor is able to map and/or model the 3-D the space it is monitoring. Such monitoring enables the flying autonomous sensor to interface with an augmented or virtual reality view of the space and allows the user or operator to interface with it and the space utilizing augmented reality glasses for example. Another example of the use of the flying autonomous sensor is to monitor changes in the indoor space. For example, the flying autonomous sensor can track and follow up objects and their movements within a dedicated space based on chronological visuals readings of the entire space and comparing that to past histories. In this manner, the flying autonomous sensor may be able to cover larger areas then fixed sensors and may further be able to isolate areas of interest to the user.

In an embodiment, the flying autonomous sensor may "learn" from the sensor data and accordingly adjust its flight path and or flight schedule. It is to be understood, that any small aerial or other flying platform may be used to deploy the sensor, or a series of flying platforms may be used alone or in conjunction to gather sensor data. In an embodiment, a number of airborne platforms may be deployed to gather noise data in a large area such as a warehouse, or air flow data. By simultaneously deploying multiple sensors, a clearer picture of the environment may be obtained. Similarly, in an office or home environment, an airborne sensor mounted on a micro-airborne platform may be used to help optimize, work flow, or space utilization, by tracking data over longer periods of time and adjusting to changing conditions. The airborne sensor may also contain other sensors to aid with the flight such as IR sensors, IR cameras, code scanners that can read bar codes or QR codes, laser sensors to detect flight paths, or distancing devices.

Figure 3B:
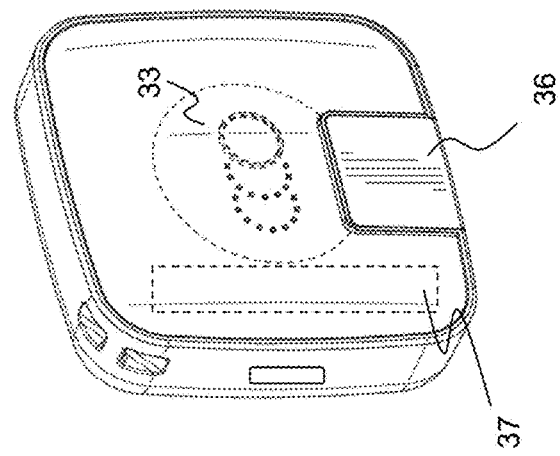
FIGS. 3A and 3B are illustrations of sensors in accordance with an embodiment of the present disclosure.
Figure 3A:
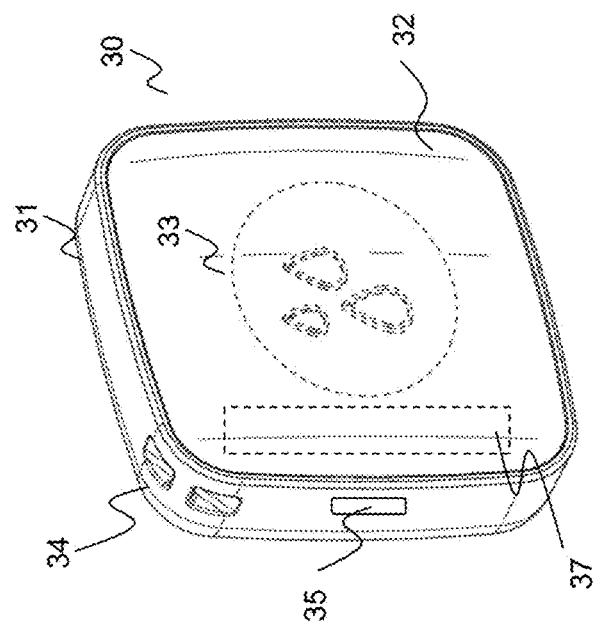

FIG. 3A depicts a typical sensor 30. In an embodiment, sensor 30 may be waterproof and shockproof. FIG. 3B depicts a typical motion sensor with a motion window 36. Sensor 30 may comprise housing 31, face 32, indicator 33, latch 34 and push button 35. Housing 31 may be made from any material such as metal, plastic, ceramic, carbon fiber, or a combination of materials. Housing 31 may be rectangular with rounded corners although other shapes are possible. In an embodiment, housing 31 encompassed both the frame and back cover in a single part although there is no limitations on the number of components used to make up housing 31. Some suitable materials for housing 31 include but are not limited to aluminum, nickel, stainless steel, tin, copper or any other machineable material.

Depending on the sensor's use, face 32 may be made from a solid material or may be made from a number of different materials. For example, some materials may be permeable to light, sound, temperature. In addition face 32 may be made from one or more materials with different properties. For example, face 32 may comprise sections that pass ambient light to underlying solar cells, or may comprise sections that are active solar cells. For example, area 37 which is aligned with underlying solar cells may have different characteristics then other portions of the face 32, although it may appear visually similar. In an embodiment, two different types of solar cells were used within the same sensor, one optimized for man made light and the other for natural outdoor sunlight. This way the sensor energy harvesting is optimized both for indoor and outdoor use. Similarly, area 37 may be an active solar cell. Face 32 may be transparent to certain parts of the spectrum while opaque to others. Motion window 36 may be transparent to IR radiation and may be located directly above an internal IR sensor while the remainder of face 32 is impervious to IR radiation.

Indicator 33 may be an illuminated raised portion on face 32 and may be descriptive to the sensors function. Additionally and/or alternatively, indicator 33 may be a source identifier such as a logo. Indicator 33 may be illuminated by internal LEDs depending on the light guide solution. The intensity of the individual LEDs for the indicator may be controlled by internal circuitry and illumination may provide information about the health and status of the sensor. For example, in an embodiment, the sensor may provide an indication of power level, fault condition, or other functionality by LED color. In an embodiment, the LED pulses on and off during operation indicating sensor activity and alerts the user about the sensor and when it is measuring and when it is idle. Additionally and or alternatively, the LED color is changeable by the user so that the sensor can better fit to individual interior designs.

Latch 34 may be any suitable latch point that may be used for mounting sensor 30. Push button 35 may be a single push-button used to power on/off the sensor as well as for identification during the pairing of signals with link device 210. In an embodiment, push button 35 is a double action tactile switch with the first position used for pairing and second position is power ON/OFF. Other or additional switches and types may be used without departing from the present disclosure.

Figure 3C:
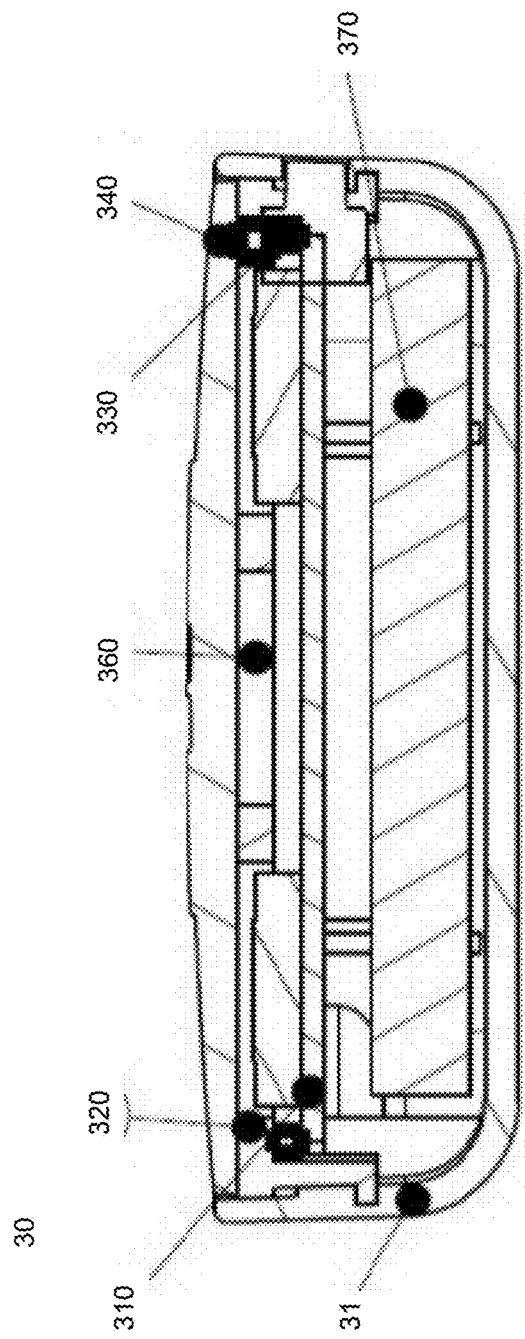
FIG. 3C is a cross sectional illustration of a sensor in accordance with an embodiment of the present disclosure.

FIG. 3C depicts a cross sectional view of a typical sensor 30 in an embodiment of the present disclosure. Sensor 30 includes housing 31, printed circuit board (PCB) 310 including a solar cell, a middle frame 320, a sensor gasket 330, face 32, sensor 360 and battery 370. PCB 310 may include all the BLE and power harvesting circuitry and control. It is to be understood, that the term BLE as used herein refers to and includes other low power short range communications links and is not limited to Bluetooth 4.1 or any other version of Bluetooth. Sensor gasket 330 aids with the sealing of the face 32 to the housing 31 and may ensure a watertight seal. In an embodiment, sensor 360 may be any one of the disclosed sensors, such as temperature, pressure, ambient light, motion, leak, etc. Battery 370 may be a power source, and may be rechargeable, replaceable, or disposable. Battery 370 may be made from a variety of materials, such as AgZn, Lithium ion, NiCd, NiMH, NiZn, Alkaline, Lithium, Magnesium, Mercury oxide, Nickel oxyhydroxide, Silver-oxide (silver-zinc), Zinc-air, Zinc-carbon, Zinc-chloride.

Figure 4:
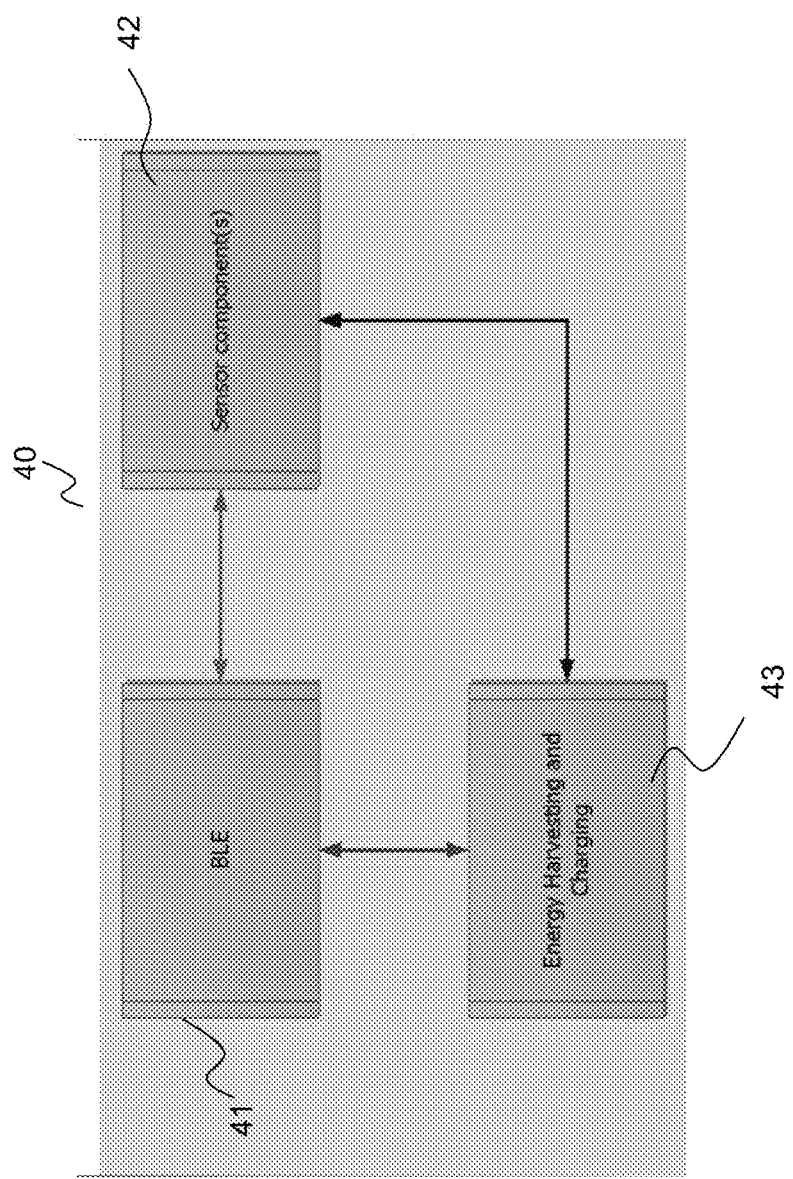
FIG. 4 depicts the components within a sensor in accordance with an embodiment of the present disclosure.

FIG. 4 depicts the main component of a sensor circuit board 40 for a typical sensor. Internally, in an embodiment, the sensor's electronics assembly may be on a single internal PCB which may include an antenna. Additionally and/or alternatively, the circuitry may be broken up by functionality and the antenna may be incorporated into housing 31 or may be mounted on housing 31. In an embodiment, the sensor 30 may include solar cell(s) assemblies that may be used to harvest solar energy via the front surface. Printed circuit board assembly 40 may be located under face 32 and may include all the necessary circuitry and solar cells required to operate the sensor 30. Typically, sensor circuit board 40 includes a BLE chipset 41, sensor components 42 and energy and charging components 43. A rechargeable battery (not shown) may be located below the PCBA. In addition, in some embodiments, the sensor components 42 may be separate from the PCBA 40 and may even be surface mounted on sensor 30.

Ideally, in an embodiment, the sensor requires a battery that can be charged and discharged in temperatures from −30° C. to +60° C. and which will maintain a charge for at least three years and which can function on a single charge for up to 6 months, however, other lifecycles are possible. In an embodiment, the battery capacity is estimated to be about 300 mAh with charging. This requirement is based on a projection of six months of operational time without charging. While shorter and longer charging and discharging periods are acceptable. Various lithium-ion and lithium pro batteries may be used. Additionally, vanadium pentoxide lithium coin batteries may also be used as well as super capacitor type batteries. In an embodiment, NiMH batteries may be used to power the sensor.

Figure 5:
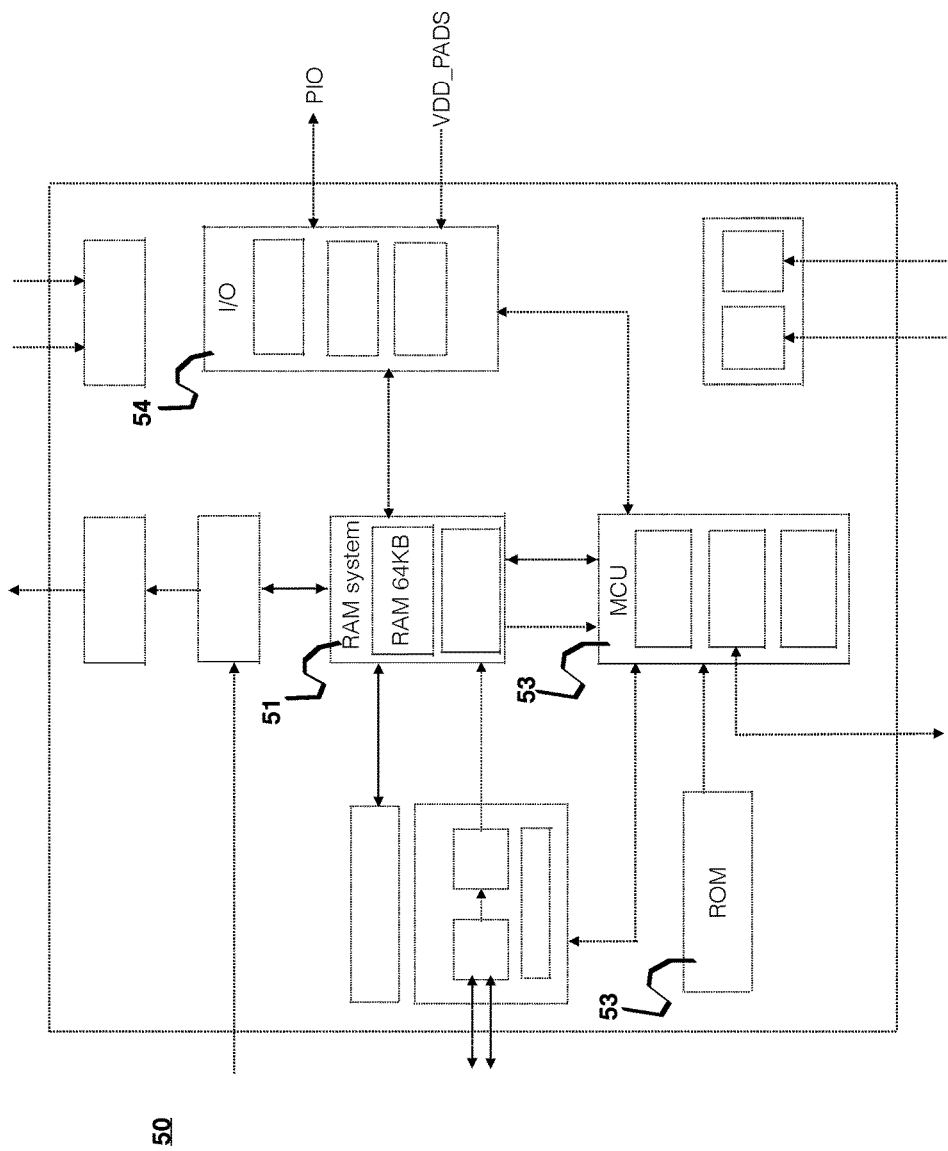
FIG. 5 depicts the main components of a typical BLE chip set in accordance with an embodiment of the present disclosure.

Sensors 30 may be controlled with the BLE chipset. In an embodiment, the BLE subsystem is based on a CSR1012 component from CSR LLC, which includes a 16-bit processor and single mode Bluetooth Low Energy RF transmitter. FIG. 5 depicts the main components of a typical BLE chip set. System RAM 51 is typically, 64 KB of integrated RAM supports the RISC MCU and is shared between the ring buffers used to hold data for each active connection, general-purpose memory required by the Bluetooth stack and the user application. Internal ROM 52 has 64 KB of internal ROM. This memory is provided for system firmware implementation. If the internal ROM holds valid program code, on boot-up, this is copied into the program RAM. Microcontroller 53 is an interrupt controller and event timer that run the Bluetooth software stack and control the Bluetooth radio and external interfaces. A 16-bit RISC microcontroller is used for low power consumption and efficient use of memory. Programmable I/O Ports 54 may have 12 lines of programmable bidirectional I/O powered from VDD_PADS. PIO lines are software-configurable as weak pull-up, weak pull-down, strong pull-up or strong pull-down. Any of the PIO lines can be configured as interrupt request lines or to wake the IC from deep sleep mode. WAKE-input shall be used wake the IC from Dormant or Hibernate states. The chipset may also comprise an LED flasher/PWM module battery monitor to monitor and report battery status to the software, a temperature sensor, and other control power circuitry.

In an embodiment, the RF portion is Bluetooth® v4.1 compliant and employs a −92.5 dBm Bluetooth low energy receiver. The BLE chipset requires an external EEPROM for the application software. In an embodiment, software is upgradable via over the air transmission.

The specified privacy and security requirements for the present system require a unique identifier in each node including in all sensors and/or switch devices. In an embodiment, the sensors each have a unique serial number that is used for irreversible pairing with the communications device 205 or link device 210. In an embodiment, the sensor uses a one time programmable (OTP) memory that stores the identifier keys.

Figure 6:
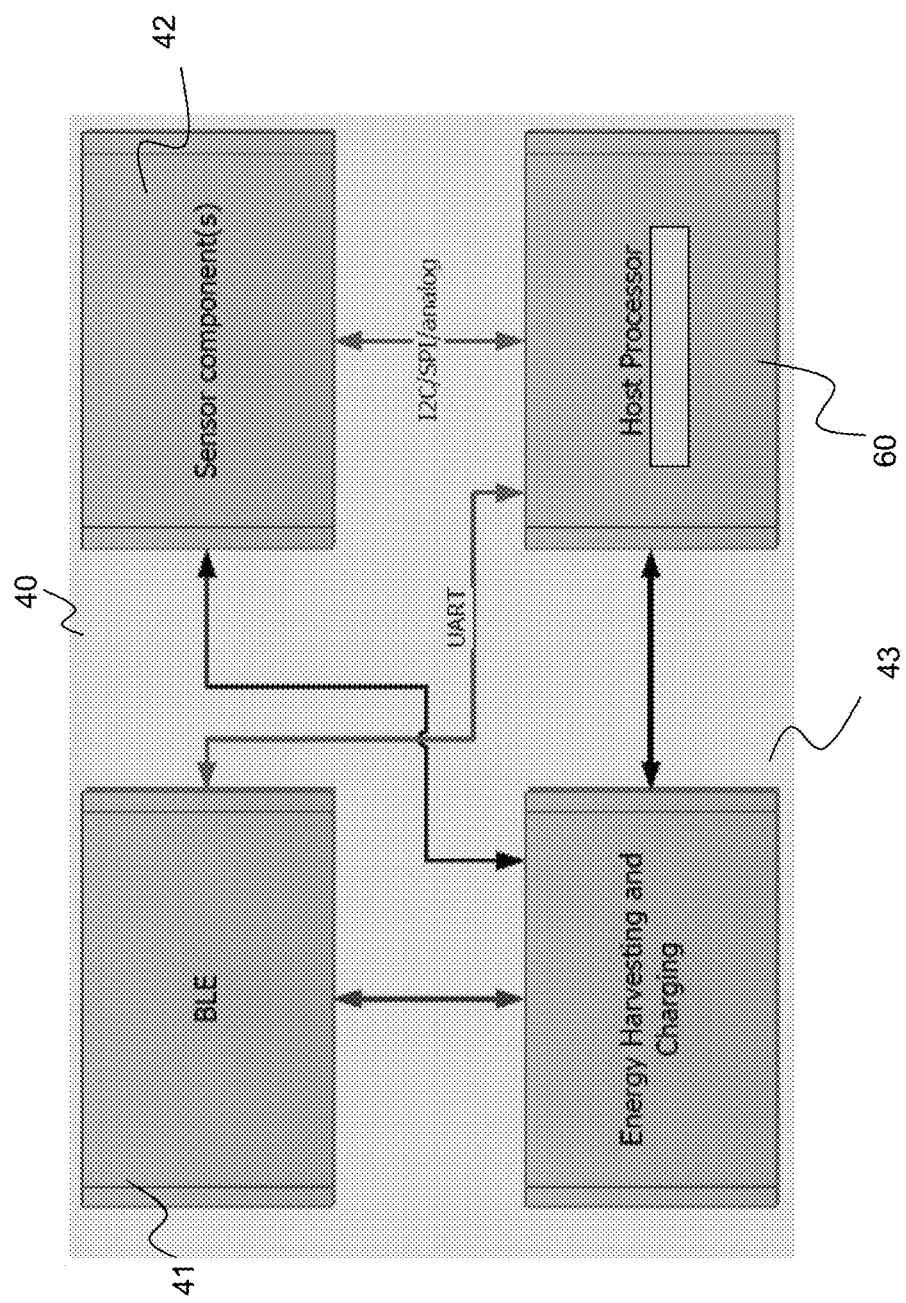
FIG. 6 depicts the components within a sensor in accordance with an embodiment of the present disclosure.

FIG. 6 depicts the internal sensor module 42 within sensor 30 with an additional external processor 60. In some embodiments, a separate low power processor 60 is added to the sensor to increase processing power. The additional processor does not impact the basic BLE implementation and energy harvesting. Power management may also be implemented in the host processor 60 to control its own execution and sensor components.

In an embodiment, sensors require very long operational time and solar cell charging to achieve it. The typical sensor power consumption is about 0.1 mA. The solar cell, in an embodiment was able to harvest energy at least 5 or 10 times the consumption requirement to extend the sensor operational time. Accordingly, in an embodiment, the solar cell should harvest a minimum of 1 mA in normal room light with additional IC monitors on the input voltage to prevent overloading of the cell.

In an embodiment, solar charging is not used and the sensor can operate on primary battery power only. To ensure the desired extended life, the primary battery requires a low self discharge rate, high capacity and wide temperature range. An example of such a battery is an Eve batteries EF702338, which is a (Li—SOCl2) cell from EVE® batteries. Based on the expected power consumption 2-3 years life time could be expected from such a battery.

In an embodiment of a temperature and humidity sensor, the temperature and relative humidity measurement were done with a single sensor component although individual sensor components may be incorporated into a single sensor housing. The sensor polled by the BLE reported the data via the secure link device 210. The data range was limited only by the range of the sensor selected. It will be understood by those skilled in the art that the system is not limited to a specific sensor and may employ sensors that works within the design parameters of the system.

In an embodiment, a leak sensor based on resistive measurement between spaced contacts was used. In an embodiment, the contacts were fed through the bottom of the sensor device and mount on the surface of the device. The sensor itself was placed in close proximity to an area of an expected leak. When a leak does occur the resistance of water (or other liquid) is presumably lower than the resistance of air or of the material the sensor is in contact with, i.e., concrete, tile, wood, fiberglass, or plastic. The change of resistance causes the sensor to record a change. Additionally and/or alternatively, a cable accessory with an external probe may be used that includes detector electrodes. In such an embodiment, the sensor may be mounted with the external leads placed in the area of interest. The leads can be removable from the sensor or may be integrated into the sensor. In an embodiment, the sensor has both surface mounted and removable leads.

In an embodiment a motion sensor was used. The motion sensor utilizes one or more pyroelectric infrared sensors to detect motion in the sensor's field of view. The sensor may comprise of one, two, three or more detection areas. The sensitivity of the sensor is relative to the physical area of the sensor. In an embodiment, the sensors utilizes different software and different processing based on the number and size of the sensors. If a detector has one detection element for example, the software keeps track of the previous reading and implements some dynamic setting of the change in the threshold level. In the case of multiple detection areas the reading from each area can be compared to each other to detect motion. This gives some flexibility in detection algorithms. In a motion sensor with multiple detection elements, the individual elements may be polled in sequence. Additionally and/or alternatively, each sensor element, may trigger an interrupt when the signal exceeds pre-defined threshold levels. In a motion sensor, the sensor window 36 in the front panel, must have good transmittance for wavelengths across the full spectrum and most preferable in the infrared to ultra violet range. In some embodiments, the window and the sensor have additional optical features to collect light from the desired area. In an embodiment, the lens or face and any specialty regions may be optimized and require different properties to operate based on the sensor operation. Separate units allow the uses to change the cover material into anything special that the sensor unit might require.

In an embodiment, an ambient light sensor detects illumination and ambient light on a scale of lumens/square meter or LUXs. In an embodiment, the sensor can detect from pitch dark to direct sunlight or a range from 0 to 100,000 Lux.

In an embodiment, a vibration sensor utilizes a low power 3D accelerometer such as those available from Freescale or Analog Devices. The sensor components interface with the BLE chipset and consume very limited power.

In an embodiment, the sound sensor can detect sound pressure (volume) and compare it to predefined threshold limit. The sensor's electronics may comprise a microphone, microphone amplifier, rectifier/integrator stage and comparator and buffer amplifier depending on the signal processing. In an embodiment, the sound sensor may require a separate host processor. In an embodiment, if more advanced signal processing is needed the audio signal may be interfaced to a host processor that has faster sampling rates and more memory available for the audio samples.

In an embodiment, a control switch may be implemented as a sensor and will be based on the BLE chipset. Instead of requiring it to use solar power or energy harvesting, the control switch may use a regulator AC/DC circuit to use the power from the main source. Because of the additional and different circuitry, the dimensions (width and length) may be different than the other sensors.

Figure 7:
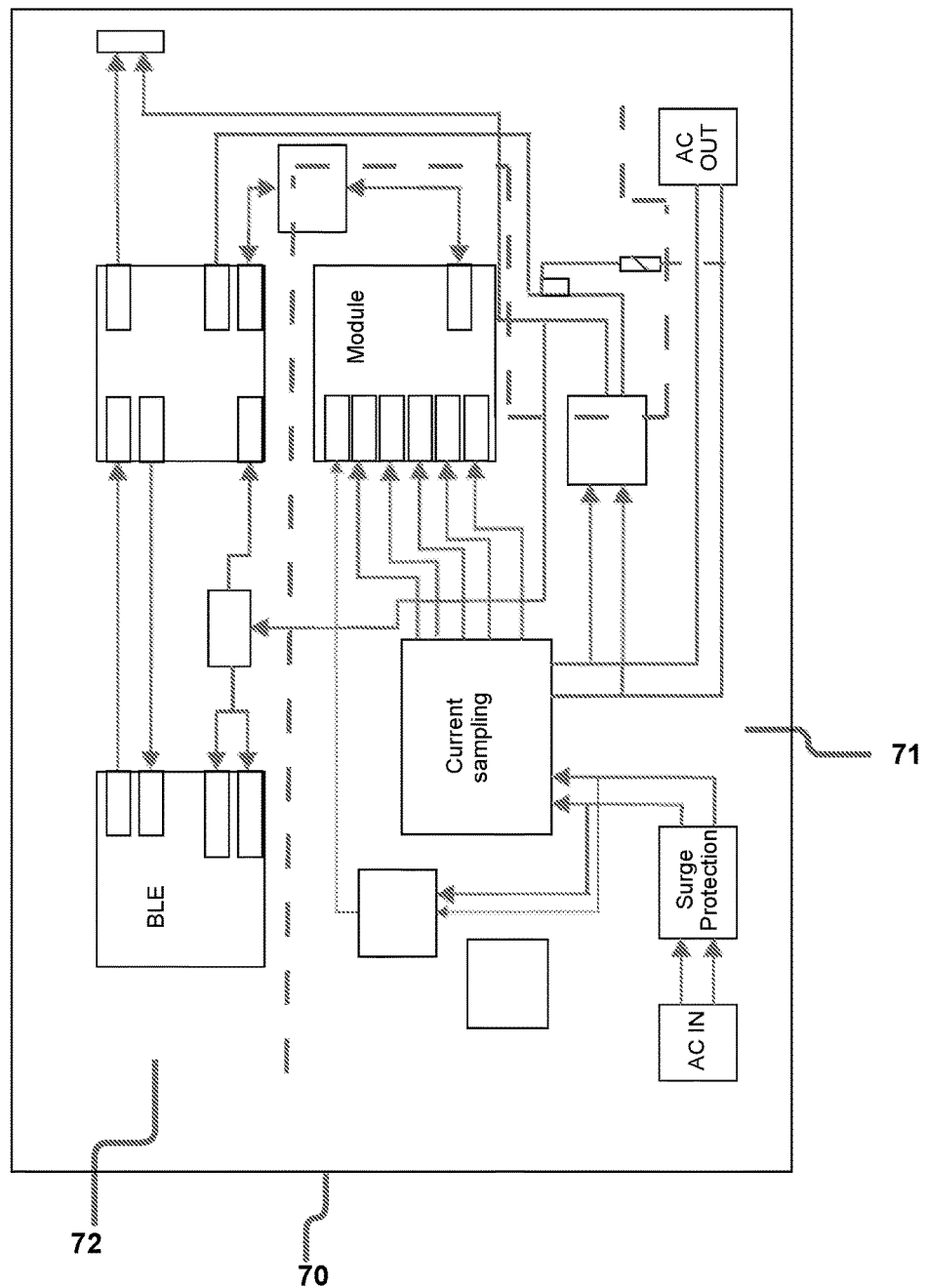
FIG. 7 depicts a block diagram of the circuitry of a switch device in accordance with an embodiment of the present disclosure.

FIG. 7 depicts a block diagram of the circuitry of a switch device. Switch device 70 includes input power module 71 and communications and control portion 72. Power module 71 comprises AC input, surge protection, current sampling, and AC output control. Communications and control portion 72 comprises BLE module and a microcontroller. The power supply for the switch is regulated from the AC-input via power module portion 71. Communications and control portion 72 may comprise a USB charging interface with a regulated 5V output with maximum current limited to 1.5 A.

Figure 8:
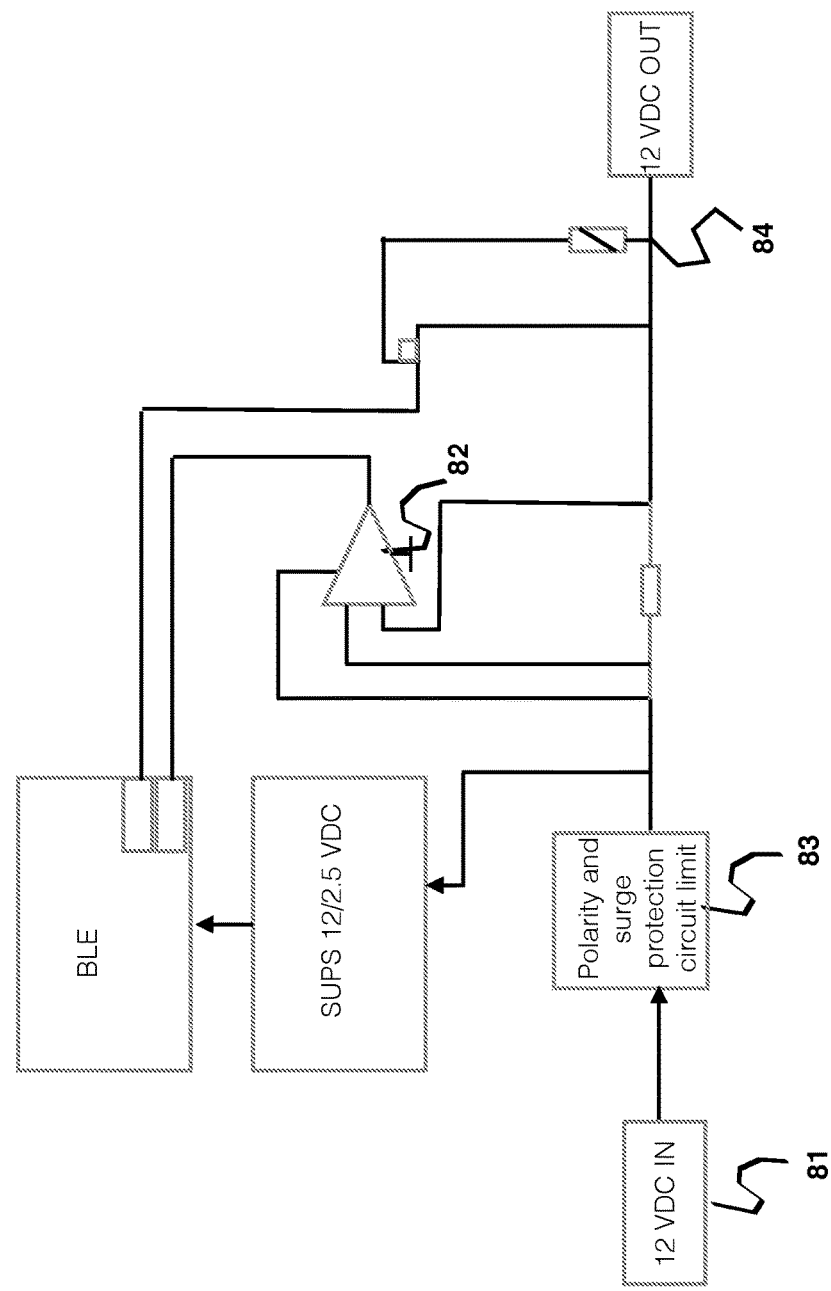
FIG. 8 depicts a block diagram of the circuitry of a DC switch device in accordance with an embodiment of the present disclosure.

Off-grid switch 255, may be a DC based switch based on the BLE chipset. Energy harvesting and solar charging are not required and may be replaced with a 12/2.5 VDC regulator circuit. FIG. 8 depicts an embodiment of an off grid switch for controlling a DC output. The input power 81 supplied from a 12 VDC is fed through a series resistor. An amplifier 82, powered from 12V is used the measure the voltage across the resistor and scale the voltage to the ADC's input range of about 0-1.3V. The off switch grid input requires surge and reverse polarity protection circuits 83. The 12V input is connected via a relay 84 to 12V output. The device can limit the maximum output current to 5 A. In an embodiment, semiconductor switches were used.

In an embodiment, the sensors 220 include a 2.4 GHZ ISM band antenna although antennas in other frequency bands and ranges may be used. Additionally and/or alternatively, the antenna may be mounted internally to the device, may be mounted on the PCB, may be incorporated into the case of the device or may be external to the sensor device. In an embodiment, the antenna is integrated into part of the PCB. In an embodiment, a ceramic antenna component was used because of insufficient space within the device.

In an embodiment, the sensor 220 supports irreversible pairing with a link device 210, that requires a special authentication circuit included in the design. The link device 210 manages data privacy matters on a hardware basis by managing access and controlling the sharing of items defined as private to external networks. The link device 210 may route information to a personal cloud or device instead of an external cloud or device based on user selections and preferences. Further, in an embodiment, the link device 210 allows the system hardware to instantly stop sharing data at any given point of time at the request of the user. The authentication circuit has a pre-programmed unique serial number that may be from 10 to 128 digits, preferable with a unique serial number between 30 and 40 digits. In an embodiment, there will also be additional product/device specific keys that are programmed into the one time programmable ("OTP") memory of the authentication circuit. In an embodiment, if unique Bluetooth addresses are needed they can be based on the authentication keys and user ID. The specific key needed for pairing of sensor device 220 may be delivered with each sensor and link device in printed form. Additionally and/or alternatively, the key may be delivered in an e-mail, voice mail, pin code, or other secure form of transmission. In addition, each sensor 220 may have a unique serial number which may be copied to EEPROM for use by the internal circuitry. It may also be laser etched or otherwise marked on the device itself.

In an embodiment, the link device 210 is a connectivity device comprising a BLE 4.1 communications module, a Wi-Fi 802.11 communications module, a 3G/4G wireless modem, a GPS chipset, an internal antenna for all wireless modules, a CPU with memory for software and data buffering purposes, and an internal battery and charging functionality. In some embodiments, the Wi-Fi system in the link device is capable of functioning as a wireless router for heavy data traffic trough the link device. In an embodiment, this is used, for example, to stream high definition video from a source to its destination.

Figure 9A:
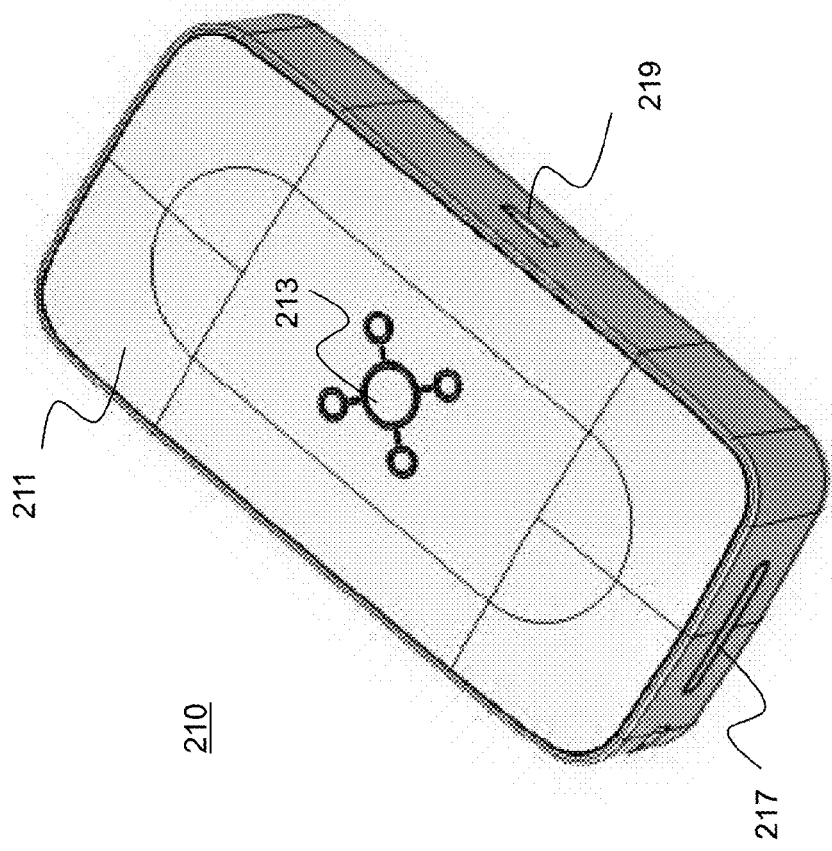
FIG. 9A depicts an illustration of a link device in accordance with an embodiment of the present disclosure.
Figures 9B, 9C:
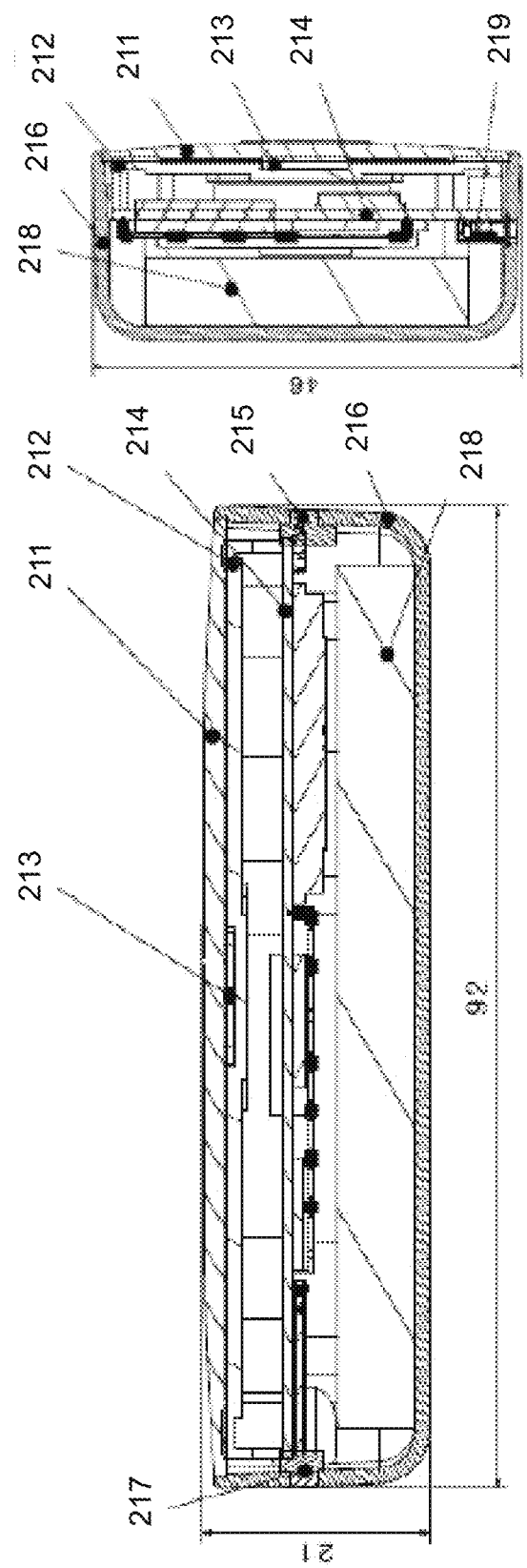
FIGS. 9B-C are is a cross sectional illustration of a link device in accordance with an embodiment of the present disclosure.

As seen in FIGS. 9A-9C, the link device 210 comprises a link bezel or face 211, a link frame with antenna 212, a light guide 213, a hardware assembly 214 such as a printed circuit board, a power button 215, a case or frame 216, a sim card slot 217, a battery 218 and a USB connector 219.

The link device 210 provides security and privacy functions and may be powered from a DC supply via USB or operate from power stored in battery 218. The link bezel may be any RF transparent/translucent material such as glass, polycarbonate, plastic, or any other type of material. Link frame 212 is an internal frame and may be metal, plastic, ceramic and may have an antenna integrally molded into or mounted on the surface of the structure. Light guide 213 may be any material, such as plastic that can conduct LED light to the surface of link bezel 211. The light guide 213 may provide the user with a visual indicator of the status of the link device 210. Hardware assembly 214 may be a single PCB or multiple interconnected PCBs. It may be a single layer board or a multi-layer board. It may contain all the RF, power regulation, charging, control, memory and any other required circuitry or chipsets. Power button 215 may be used to power the link device 210 on and off or place the device in standby or power save modes. Frame 216 may be metal, plastic, or ceramic and forms the body of the device. Sim slot 217 allows for the insertion of a sim card either by push-push or a tray type card. Battery 218 is a rechargeable and/or replaceable battery and provides sufficient DC power to link device 210 for operation. Link device 210 may also have a standard or micro USB connector 219 for communication with the hardware assembly 214 and/or charging of battery 218.

The link device 210 may have one or more buttons 219, a capacitance screen, a touch screen, a pressure screen or any other input interface. Additionally and/or alternatively, it may allow for connection with another device, such as a keypad, through the micro-USB port 219 for programming and/or trouble shooting. Additionally and/or alternatively, it may have a reset button and or a button for pairing of Bluetooth and/or connecting to WLAN. In an embodiment, a double action tactile switch is used. The link device 210 may have an illuminated logo 213 on the top cover. Lighting is done by RGB LEDs.

The link device 210 may have a USB port 219. The main use for it will be the charging of the device and or updating software, firmware, or any other debug or data interface. USB port 219 may be used for programming of the device and debugging. In an embodiment the USB interface 219 support USB 2.0 modes. The link device may have a SIM card holder 217 that interfaces directly to the cellular modem. External power may be supplied to the link device 210 via USB interface 219. The nominal input may be about 5V/1.5 A max. Interfacing to AC-supply and vehicles is done by using an external power supply.

Figure 10:
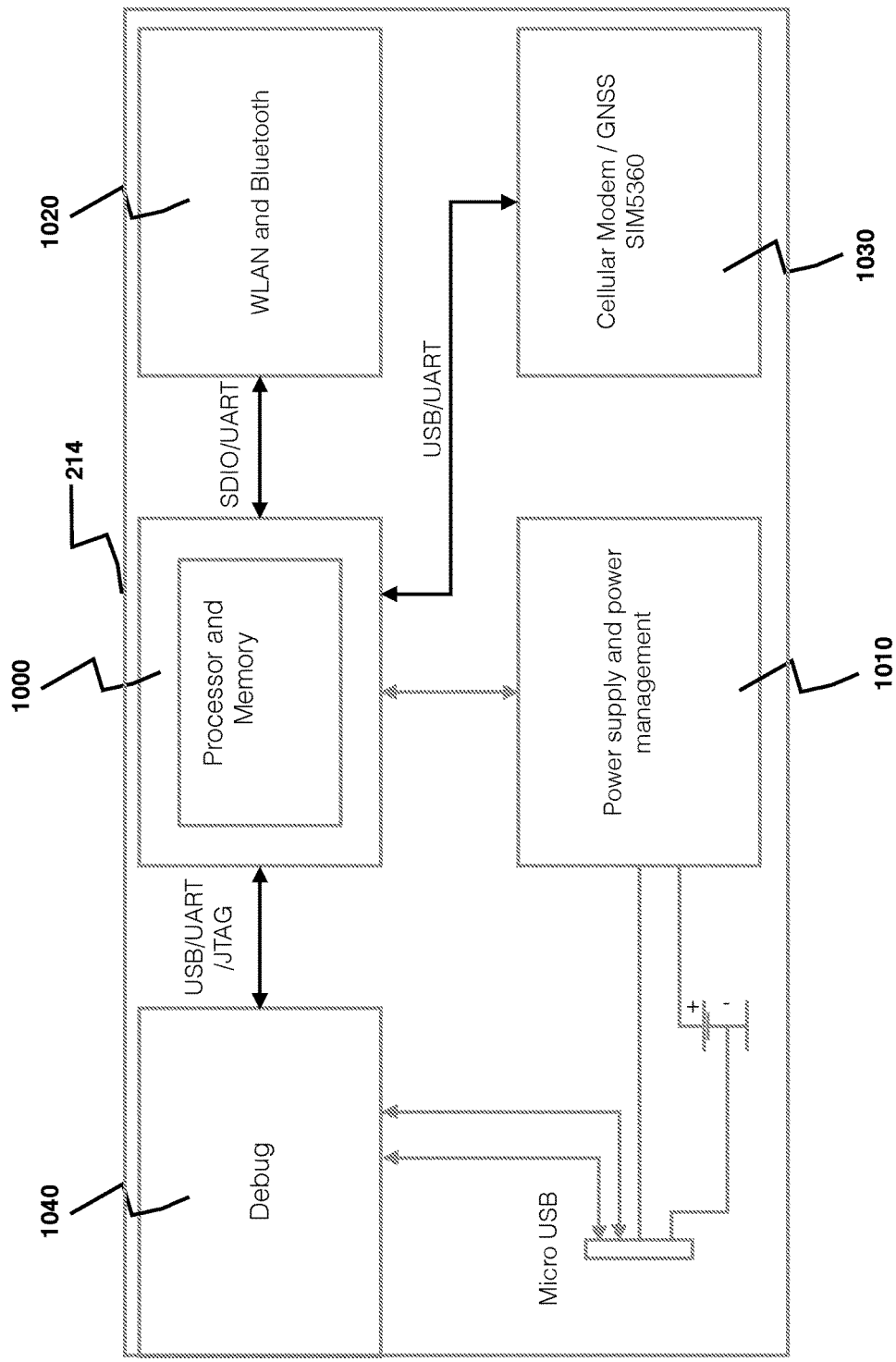
FIG. 10 depicts a high level block diagram of the hardware assembly of a link device in accordance with an embodiment of the present disclosure.

FIG. 10 depicts a high level block diagram of the hardware assembly 214 of link device 210, comprising a processor and memory section 1000, a power supply and power management module 1010, a communications module 1020 which may comprise WLAN and Bluetooth communications capabilities, cellular modem/GNSS communications module 1030, a logic/debugging module 1040 and additional buss/internal communications hardware.

In an embodiment, the link device 210 operates on an embedded Linux platform. An Atmel SAMA5D31 processor was chosen to execute the Linux operating system and application. In an embodiment, mobile DDR SDRAM memory was used for data memory for the processor. Such memory requires very low self refresh current. NAND flash memory was selected to be used as code memory. In an embodiment, the memories selected were of industrial quality because of the operating temperature range of the link device 210.

Figure 11:
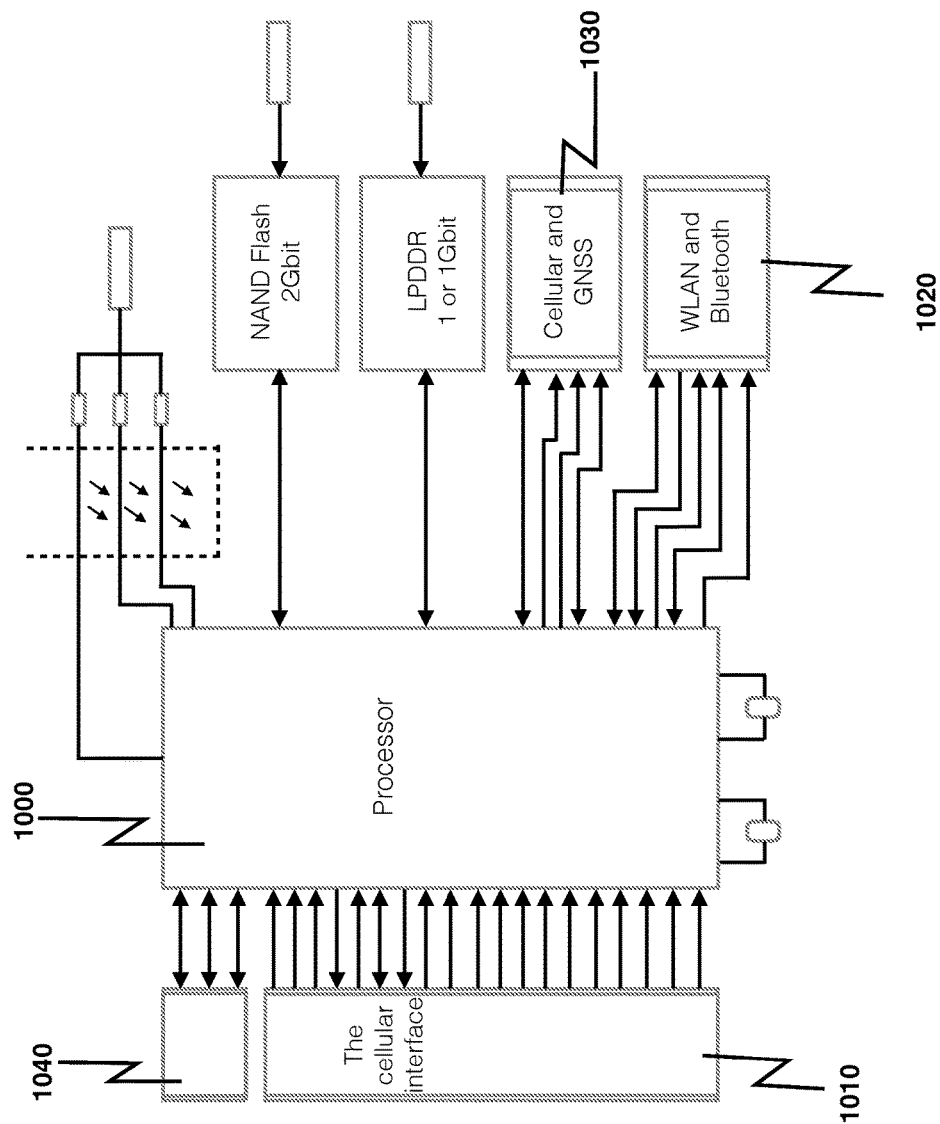
FIG. 11 is a block diagram of the interconnections of the hardware assembly of the link device in accordance with an embodiment of the present disclosure.

FIG. 11 is a block diagram of the interconnections of hardware assembly 214. In an embodiment, the processor includes a fuse controller. In that block there are 192 bits for user application. The link devices will need a unique serial number. In an embodiment, about 20 of the 192 bits are used for serial number (incremental number), a few bits may be utilized to identify the product or product variant. Additionally, if these numbers can be used to generate the manufacturer specific part of MAC-code (3 bytes). The other 3 bytes of MAC-code contain the Organization Unique Identifier (OUID). The MAC-codes can also be pre-programmed in Wi-Fi and Bluetooth components. IMEI-codes may also be pre-programmed in the cellular modem.

In an embodiment, the processor supported the following safety and security features. power-on reset cells, independent watchdog, main crystal clock failure detection, write protection for the registers, Secure Hash Algorithm (SHA1, SHA224, SHA256, SHA384, SHA512), memory management unit security, true random number generator, an encryption engine that supports AES: 256-bit, 192-bit, 128-bit Key Algorithm compliant with FIPS PUB 197 Specifications, two-key or three-key algorithm compliant with FIPS PUB 46-3 Specifications and a secure boot solution.

The processor and software, in an embodiment, support OTA downloading of the firmware. The link device 210 and any peripheral sensors 220 must support irreversible pairing. The identifiers (serial number is stored identifier and is generated in the software) related to it may be stored in a OTP-block of memory. The processor may have a watchdog function for automatic re-start or reboot. The reset logic will be able to boot, when supply voltage is connected.

The cellular interface 1010 may be implemented using a SimCom SIM5360 module or any other appropriate module and should accommodate at a minimum a wide range of standard cellular communications frequency ranges and standards such as at least the following:

| Frequency Band | Receiving | Receiving Transmission |
| --- | --- | --- |
| GSM850 | 869~894 MHz | 824~849 MHz |
| E-GSM900 | 925~960 MHz | 880~915 MHz |
| DCS1800 | 1805~1880 MHz | 1710~1785 MHz |
| PCS1900 | 1930~1990 MHz | 1850~1910 MHz |
| WCDMA 2100 | 2110~2170 MHz | 1920~1980 MHz |
| WCDMA1900 | 1930~1990 MHz | 1850~1910 MHz |
| WCDMA 850 | 869~894 MHz | 824~849 MHz |
| WCDMA 900 | 925~960 MHz | 880~915 MHz |

Figure 12:
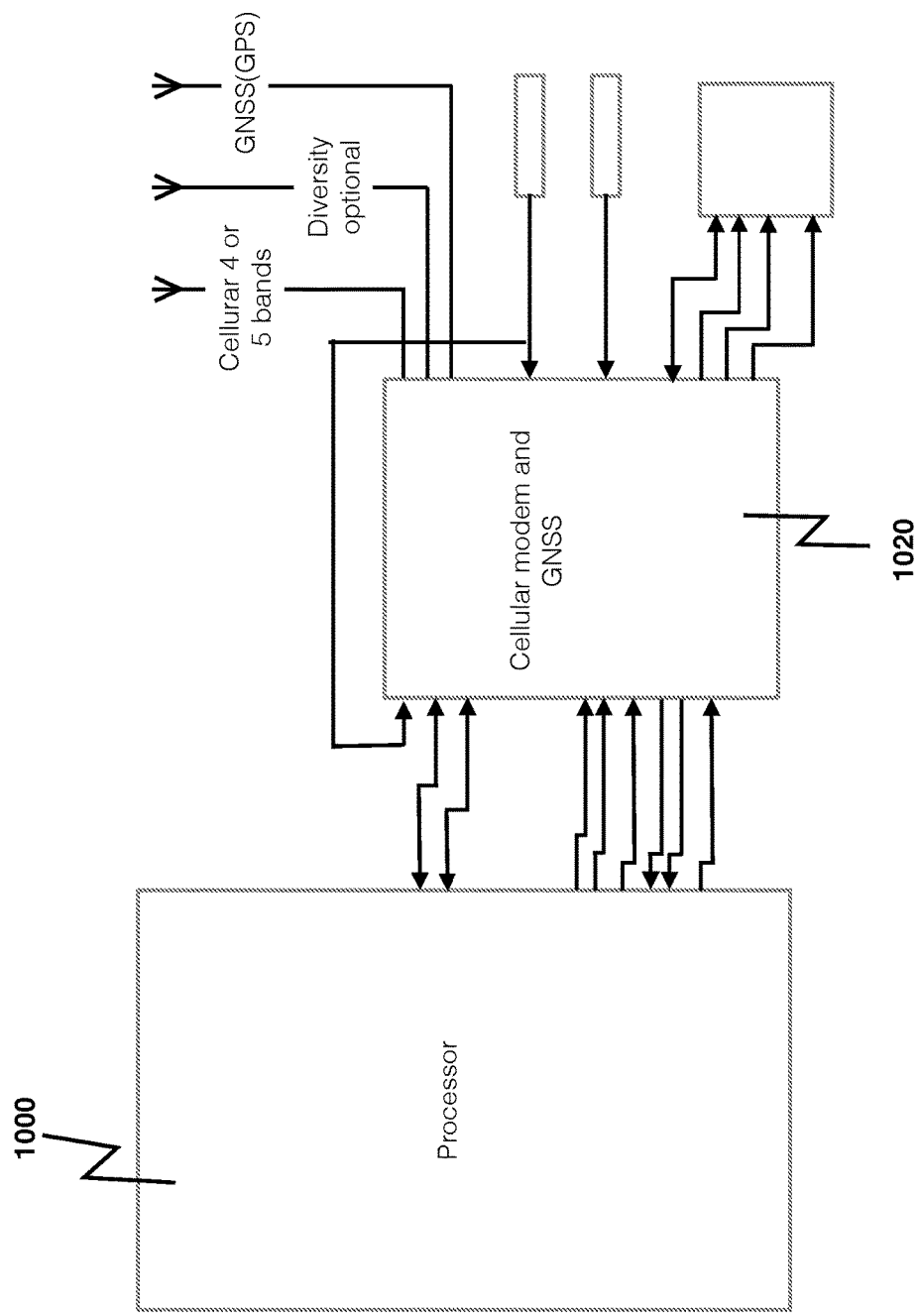
FIG. 12 is a block diagram of a cellular subsystem of a link device in accordance with an embodiment of the present disclosure.

FIG. 12 is a block diagram of a cellular subsystem 1030 and the interconnections between processor 1000 and cellular modem 1020. FIG. 12 also depicts the antennas for the cellular and GPS communication systems. It is understood that one or more antennas may be used to service multiple frequencies and frequency ranges.

Figure 13:
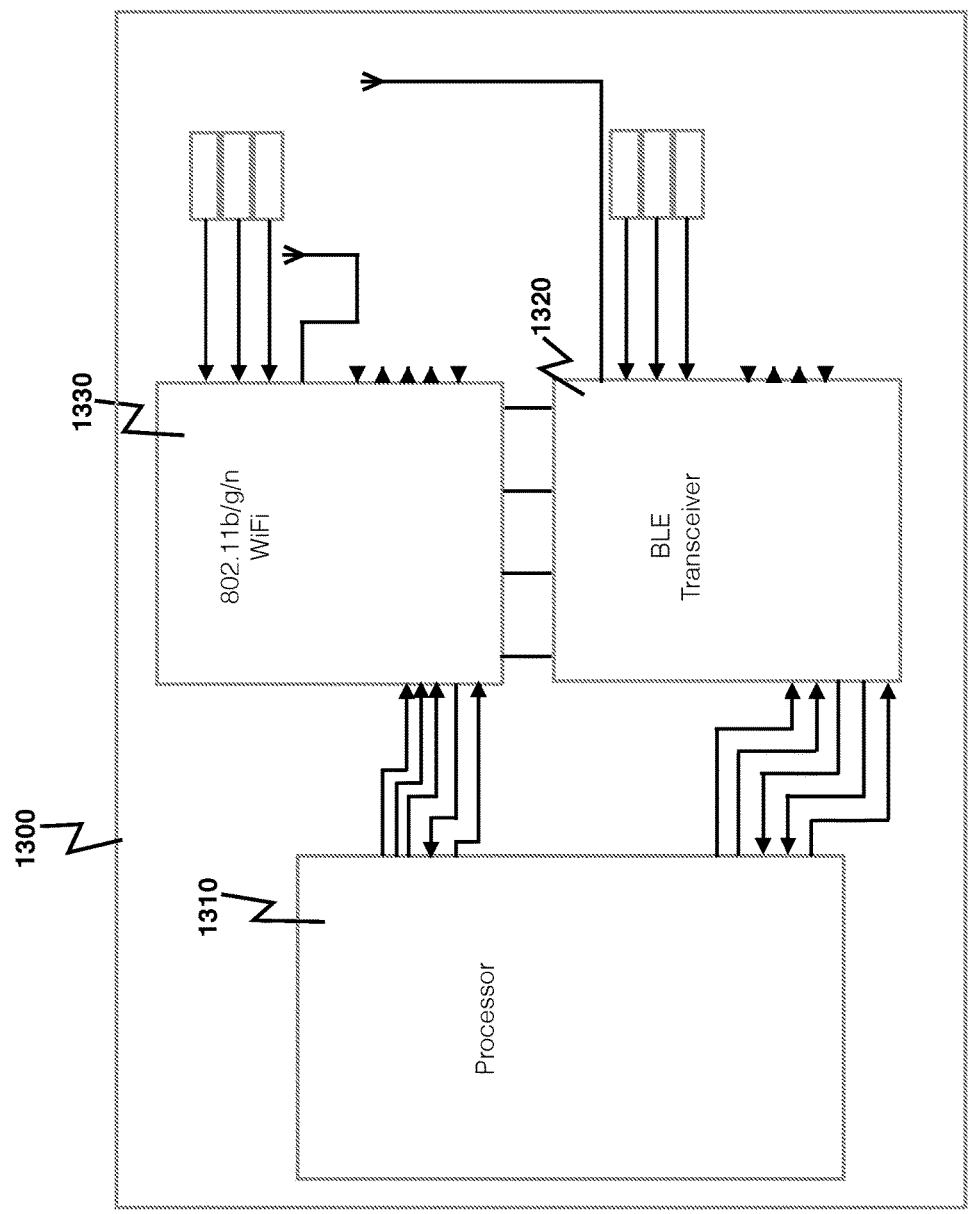
FIG. 13 depicts the WLAN/Bluetooth subsystem in a link device in accordance with an embodiment of the present disclosure.

FIG. 13 depicts the WLAN/Bluetooth subsystem 1300. Subsystem 1300 includes a processor 13010 such as an A5 core processor or similar capabilities, BLE transceiver 1320, such as a CSR8811 bluecore processor, and a Wi-Fi Module 1330. The WLAN module 1330 should be IEEE 802.11b/g/n compliant or equivalent, although other standards are usable. The WLAN module 1330 should operate in the 2.4 to 2.472 GHz range and have 1 to 13 channels. In an embodiment the data rates range from 1, 2, 5.5, 11 Mbps for the, 802.11b data rates to 6, 9, 12, 18, 24, 36, 48, and 54 Mbps for the 802.11g data rates to CS0-7, 400/800 ns 72.2, 65, 58.5, 57.8, 52, 43.3, 39, 28.9, 26, 21.7, 19.5, 14.4, 13, 7.2, 6.5 Mbps for the 802.11n data rates.

The modulation may be DSSS (CCK, DQPSK, DBPSK) and OFDM (BPSK, QPSK, 16QAM, 64QAM). The WLAN module 1330 should support IEEE 802.11e QoS, IEEE 802.11i advanced security and have multiple power saving modes to maximize battery life. The WLAN module 1330 may communicate in any one of the following modulation strategies, including, but not limited to GSM/GPRS/DCS/PCS/WCDMA/GPS.

In operation RF Performance and power consumption may be as follows:

| Parameter | Test conditions | Value |
|---|---|---|
| 802.11/b | | |
| Transmit output power | 12/5.5/11 Mbps | +17 dBm |
| Minimum input level sensitivity | 11 Mbps CCK, FER < 8% at PSDU length of 1024 b | −85 dBm |
| Maximum input level | 11 Mbps CCK, FER < 8% | +5 dBm capability at PSDU length of 1024 bytes |
| 802.11/g | | |
| Transmit output power | 54 Mbps OFDM | +15 dBm |
| Minimum input level sensitivity | 54 Mbps OFDM, FER < 10% at PSDU length of 1024 bytes | −70 dBm |
| Maximum input level capability | 54 Mbps OFDM, FER < 10% at PSDU length of 1024 bytes | −13 dBm |
| 802.11/n | | |
| Transmit output power | MCS6 | +12 dBm |
| Minimum input level sensitivity | MCS7 (FER < 10% at PSDU length of 1024 bytes) | −68 dBm |
| Maximum input level capability | MSC7 (FER < 10% at PSDU length of 1024 bytes) | −17 dBm |
| Power consumption (examples) | | |
| 11 Mbps transmit@ +17 dBm | Continuous packet, PSDU length of 1024 Bytes (958 us), packet interval 50 μs | 221 mA @ 3V3 120 mA @ 1V8 |
| 11 Mbps receive | −85 dBm. Continuous packet, PSDU length of 1024 Bytes, packet interval 50 μs | 10 mA @ 3V3 133 mA @ 1V8 |
| Deep sleep | | 13 uA @ 3V3 75 uA @ 1V8 |

The BLE transceiver 1320 should be a low power device with an external antenna. The software may be based on CSR Synergy protocol stack and Linux drivers and protocol stack. The host interface will be 4-bit SDIO with 3.3V signaling. The maximum clock rate may be about 50 MHz.

In addition to SDIO some GPIO signals (PIO) may be needed (co-existence, reset, standby). The antenna may be external to the device and may have a 50Ω output impedance.

In an embodiment, BLE transceiver 1320 was an APM8811 dual mode Bluetooth module or CSR8811 component. The main features of module 1320 are network standard dual-mode Bluetooth/Bluetooth low energy radio operating in the 2400 to 2480 MHz (79 channel) frequency range for basic rate and EDR, 2400 to 2480 MHz (40 channel) for BLE. Supported modulation includes GFSK and π/4 DPSK & 8DPSK for basic rate & EDR GFSK for BLE. The maximum RF transmission power is typically about 6 dBm and in a range of about 4-7.5 dBm. The receiver sensitivity should be about −85.5 dBm range with a maximum of about −70 dBm, LE The GPS/GLONASS for the cellular module supports both A-GPS and S-GPS, and then provides three operating modes: mobile-assisted mode, mobile-based mode and standalone mode. The GPS Receiver should be a 16-channel, GPS L1 Frequency (1575.42 MHz) with about an update rate of about 1 Hz; with a GPS data format NMEA-0183; a tracking sensitivity of about −159 dBm (GPS −158 dBm (GLONASS); a cold-start sensitivity of about −148 dBm, an accuracy of 2.5 m with an external antenna.

The link device 210 may include several internal antennas. In an embodiment, penta-band cellular modem antenna were used at 850, 900, 1800, 1900, 2100 MHz frequencies. In another embodiment, a tri-band antenna, of 850 and 900 MHz are needed in the US and 2100 MHz for testing purposes. A 2.4 GHz ISM band antenna may be required for WLAN and Bluetooth. A separate or combined antenna may be used to service one or more modules. The GNSS (GPS) may require a separate antenna. All antennas may be internal or surface mounted.

The link device 210 may also have a persistent MAC-addresses for WLAN and BLE and IMEI-code for the cellular modem. These codes may be generated by software i.e. OUID+device/port id+serial number. 24-bits are available for OUID and 24 bits for custom code. The IMEI-code may be pre-programmed in the cellular modem.

In operation, the sensors 220, switches 250, off-grid switches 255 or beacons 260 are irreversibly paired with the link device 210 or paired mobile device 205. Each sensor 220, switch 250, off-grid switch 255 or beacon 260 has a unique silicon ID that ensures that the sensors 220, switches 250, off-grid switches 255 or beacons 260 can not be used by any other user once it is paired with a link device 210 or mobile device 205.

In an embodiment for example, a user obtains a sensor 220 and a link device 210. Using a device, such as mobile 205 or tablet, the user may install a client 202 or application on the mobile device 205. The client or application 202 once installed, locates the link device using the BLE link. Next, client 202 via mobile device 205 may scan a paper certificate containing a unique ID for the device and associated with that specific link device 210. The paper certificate may come with the device or may be sent via a secure link for the user to print after registering the product with the manufacturer. After scanning or photographing the ID certificate, the client 202 may ask about the user and/or the device or both. Once this information has been entered for the link device 210, the client 202 inquires about sensors 220 and other linked devices such as switches 250, off-grid switches 255 or beacons 260.

Once the information from each certificate is entered via the respective paper certificates, the link device 210 will only communicate with the paired sensors 220, switches 250, off-grid switches 255 or beacons 260. Additionally and/or alternatively, a sensor 220, switch 250, off-grid switch 255 or a beacon 260 may also communicate with the mobile device and/or tablet that was used for the original pairing. The sensors 220, switches 250, off-grid switches 255 or beacons 260 will not communicate directly with any other devices outside their limited personal network.

The unique ID information may be presented in the form of a card, a text message, a QR code, a bar code, or any other identifying method. This may be included when the product is received or may be subsequently transmitted securely to the user. It is to be understood, that without the ID certificates that contain the unique ID for each link device 210 and sensor type device (220, 250, 255, 260) the pairing with the devices via short range communication such as Bluetooth would not be possible because each link device and sensor device has a hard wired unique silicon ID chip incorporated into the device. It is this unique pairing that provides the security for the sensor data. Unlike traditional Bluetooth devices, which are detectable to another Bluetooth device, once the sensors are paired with the link device they are no longer detectable to any other link device or other Bluetooth device.

Figure 14:
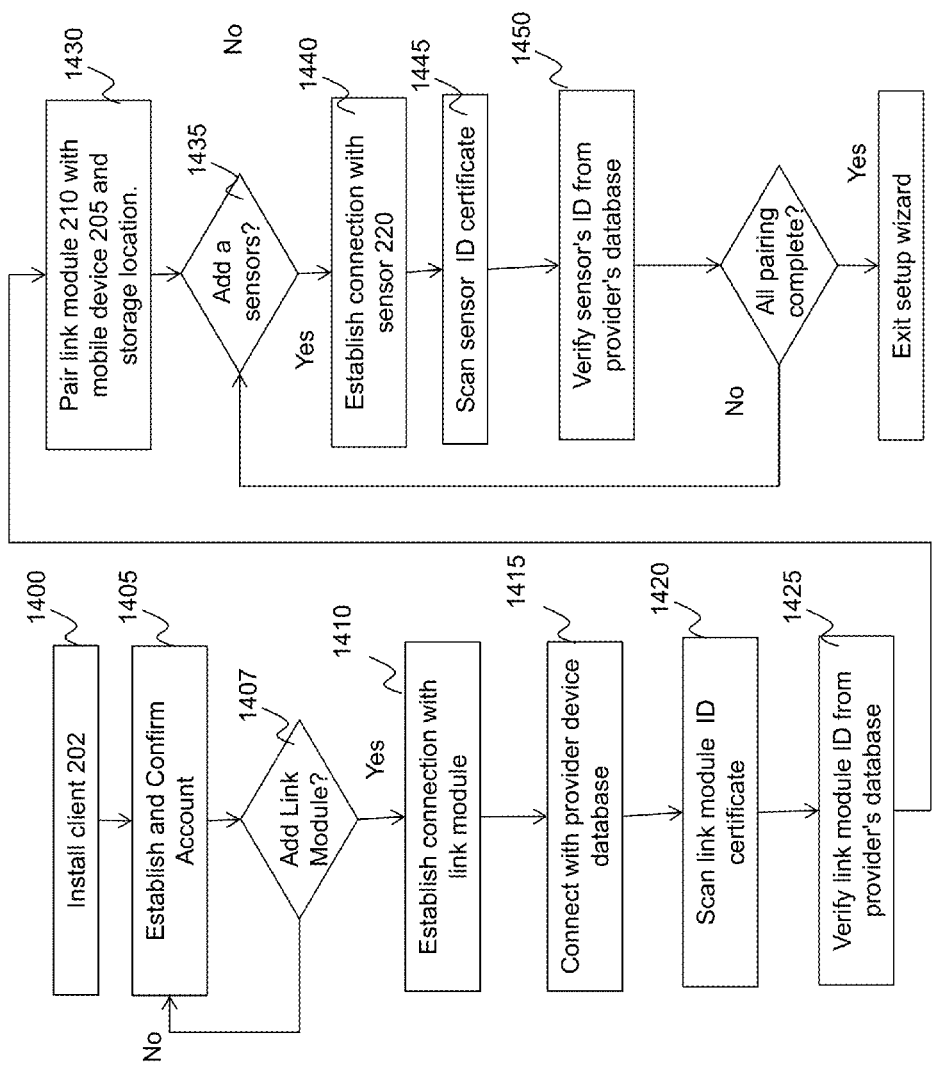
FIG. 14 is a flow diagram of the initialization process in accordance with an embodiment of the present disclosure.

FIG. 14 illustrates the steps in the initial pairing sequence. At step 1400, client 202 is installed on device 205. Installation may include a wired or wireless installation and may be delivered in any suitable format. Client 202 may be available on-line from the vendor. The client 202 may be download from an AppStore such as the Apple® store of Google Play®. Client 202 does not require any proprietary sensors to operate and may operate with sensors provided by 3rd party sensor providers. However, without the link device 220 the connection to the 3rd party sensors will not be secure and will not provide privacy features for the user. At step 1405 the client 202 may require an account to be set up prior to use. An account may be set up via a installation wizard. In an embodiment, the user may be asked for personal information such as a phone number, e-mail address, etc. The user may be prompted to create a password and an account user name. The user may then receive an account confirmation code trough SMS or other return communication which further requires a user to confirm the account.

In an embodiment, the user may be asked to add a link device at step 1407. If there is a link device 210 to install at step 1410, the activation wizard will instruct the user to press an activation button on the link device or otherwise utilize a WPS signal so that the link device lights and starts blinking and is ready to communicate with the mobile device 205. The wizard may guide the user through the set up process. At step 1410 a BLE or Wi-Fi connection between the link device 210 and the mobile device 205 is established. At step 1415, once the connection is established, a connection with a remote storage area 232 or database, such as a server or cloud storage 230 may be established. The secure storage may be provided by the system provider or may be personal to the user.

In an embodiment, at step 1420 the activation wizard may ask the user to take a photograph or scan the ID Certificate with the identifier that was included or otherwise provided with the link device 210. The installer may connect via encrypted short range interface, such as BLE or WIFI between the mobile 205 and the link device 210 to verify the link device's unique silicone ID. At step 1425 the installer wizard checks the providers storage 232 to confirm that the unique 38-digit-secret-code on the scanned certificate matches the code on silicone ID chip in the link device 210 to confirm the product ID in the providers libraries/database. This confirmation verifies that the link device is authorized as part of the provider's family of products in the providers secure library. In this manner, if it was an unauthorized use, e.g., if it was stolen, the system would know and would not complete the authorization.

Additionally and/or alternatively, the installer wizard will automatically check the unique user ID on the mobile device 205 and pairs the SMS verified account and password on the providers storage 232. It also verifies the user's mobile device 205 ID and provides link device 210 authorization on the provider's storage with the unique silicone ID authorization in the link device. The installer wizard may then pair the three items, link device 210, secure storage area on storage 232, and mobile device 205, together into one inseparably paired, encrypted and closed communication system. Such a system prohibits further outside items from connecting to any of these paired devices. The paired item keep verifying each member of the system, via the unique ID, with each use and any changes can only be made by having all items accessible at the same time as well as the required paper ID certificates available for re-scanning.

In some embodiments, if the user does not have a link device, the user may complete the set-up installer wizard and skip the set up of the link device 210. The established account will allow the user to search and monitor data on the client 202 that is shared to the user by other users. The user may also add supported third-party devices to the account, but they will appear as "unverified" and "unsecured" devices in the system for all the other users because they are not connected via link device 210 which provides the security and privacy features.

It is to be understood, that once the user has the client 202 (with or without a link device), the user will be able to add views such as "activity views" from an activity library which will allow the user to start following and reporting on the data provides by various sensors and sensor data streams. These activities may be prepared activities which require a specific sensor or may be new activities the user creates. With these views the user may view the activities of various sensors in real time and create a life stream of the user's daily activities.

In order for the activity to report data the user needs at least one sensor to report the selected activity. The client 202 may detect which sensor are needed to report the activity and may offer the user to add the necessary sensor, purchase a sensor, use a 3rd party sensor, or use another user's shared sensor in the system if that user has chosen to share it with the current user. Once the required sensor is identified by selecting the sensor, the system will automatically start reporting the newly added activity if the sensor has previously been added to the system. If the sensor is new and has not yet been added to the network, the system at step 1435 may launch a sensor set-up wizard that starts by asks to set up the link device 210. If the link device 210 is previously set up, the sensor set-up wizard, at step 1440 will establish a connection with the sensor 220 by having the user press the activation button on the particular sensor 220. The sensor icon 33 starts flashing in response. At step 1445 The set-up wizard asks to scan or otherwise input the ID on the paper certificate that came along the new sensor or was otherwise obtained. Once scanned, the set-up wizard connects the sensor via close range link, such as BLE and checks the sensor's unique silicone ID to confirm it matches the scanned ID. At step 1450 the scanned or photographed information is conveyed to the providers storage and the 38-digit-secret-code on the paper certificate is matched to the same code on silicone ID chip in the sensor. At that point, the sensor is classified as an authorized part of the provider's service on the provider's storage security libraries (e.g. if it was stolen, the system knew it was reported stolen and hence would not be authorized). Because of the pairing of the sensors 220 the link device 210, the mobile device 205 and the remote storage 232, the sensor data is only accessible to the user and those the user may choose to share the data with.

Each time a user wishes to add sensors 220 or link devices 210, the pairing routine will be repeated. In this way, the user can expand and grow their sensor network by providing more and different sensors at different locations.

Figure 15:
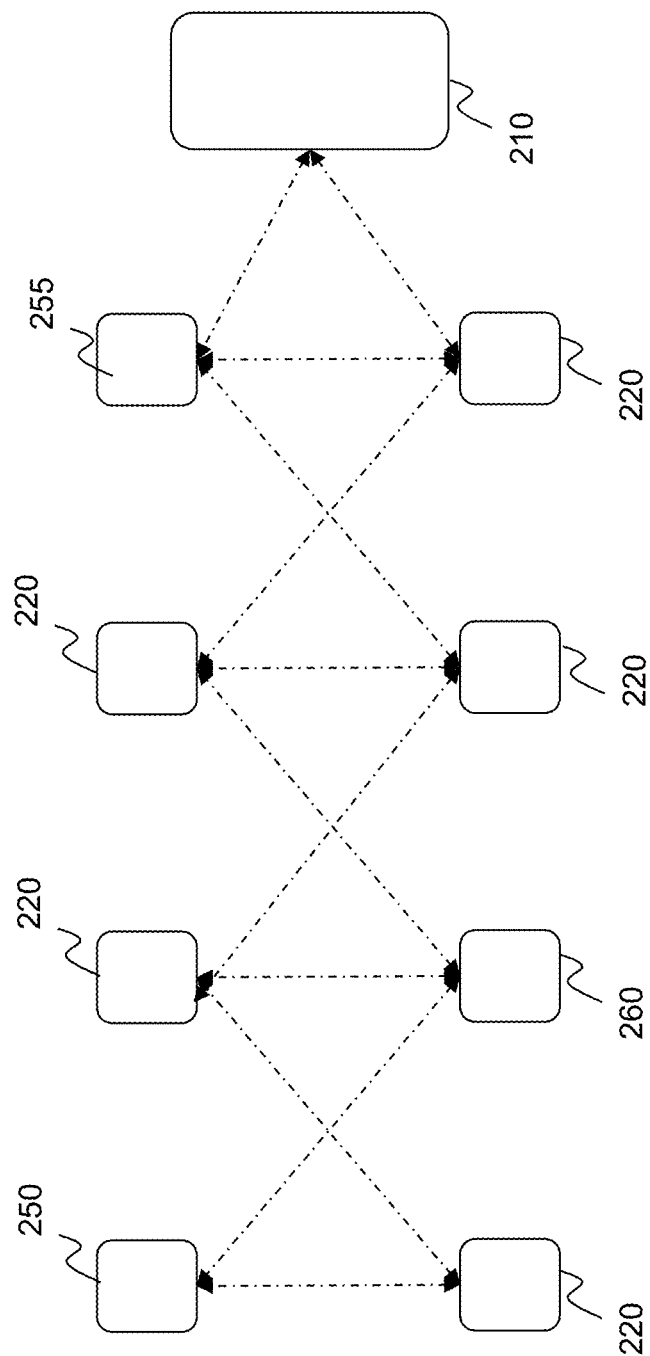
FIG. 15 is an illustration of the various communication interconnections between components in accordance with an embodiment of the present disclosure.

FIG. 15 illustrates the daisy chain interconnectivity of various sensors 220, switches 250, off-grid switches 255 or beacons 260 and a link device 210. Each sensor 220, switch 250, off-grid switch 255 or beacon 260 can communicate and relay information to/from any other switch 250, off-grid switches 255 or beacon 260 using short range connectivity such as BLE. In this manner, the distance between any one single switch 250, off-grid switch 255 or beacon 260 and a paired link device 210 or paired mobile 205 can be greatly extended. Additionally and/or alternatively, because of the daisy chain capability, the power expended by each individual sensor 220, switch 250, off-grid switch 255 or beacon 260 can be greatly reduced because each on only has to transmit over a short range.

Figure 16B:
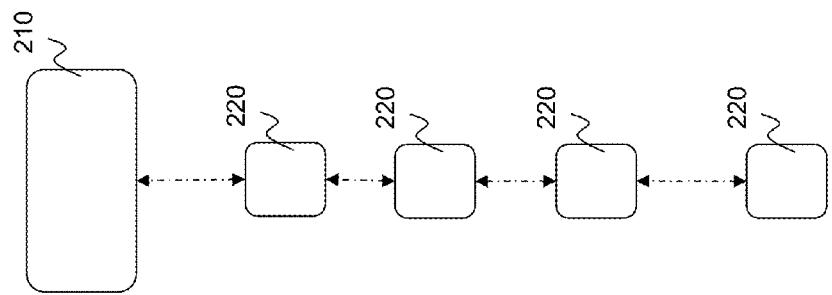
FIGS. 16A-B are illustrations of the various communication interconnections between components in accordance with an embodiment of the present disclosure.
Figure 16A:
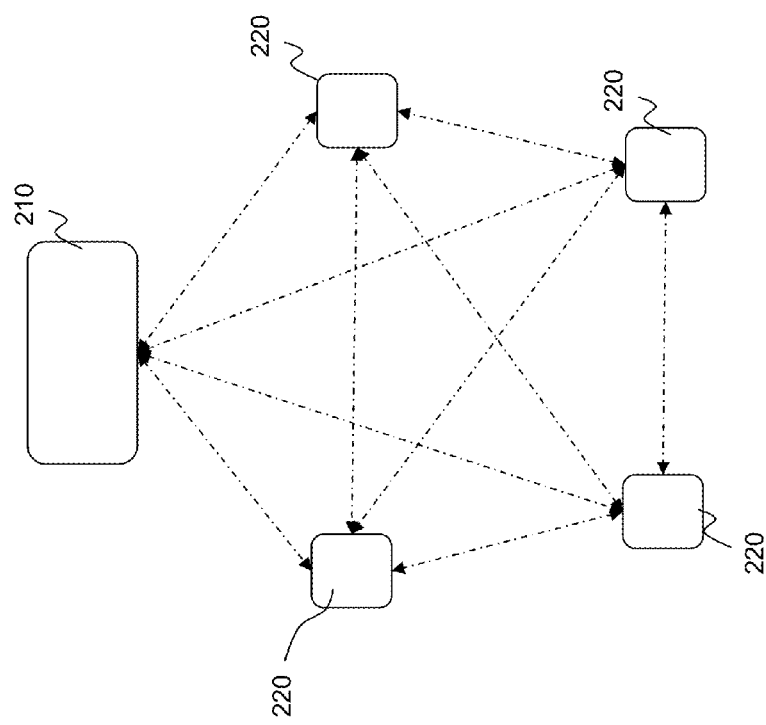

FIGS. 16A and 16B illustrate other daisy chain patterns and scenarios that extend the range of communications between the link device 210 and the respective individual sensors. It is to be understood that sensors 220 may be any type of sensors or may be switches 250, off-grid switches 255 or beacons 260 as well as any paired device within the system, including but not limited to a personal mobile device. It is to be understood, that the sensors 220 and link devices 210 are able to establish and configure the shortest route between sensors and link devices to transmit data and establish connections thereby avoiding unnecessary transit distances and unnecessary gate ways. This is because each sensor 220 and link device 210 has a smart location due to its onboard GPS signal and is able to triangulate its location in 3D space relative to adjacent sensors and relative to a GPS signal.

In an embodiment, sensors 210 use the BLE chips to triangulate their location in relation to each other. Accordingly, a mesh can be created between any three devices, sensors 220, 3rd party supported sensors, link devices 210, or mobile device 205, that have been paired to the system. The triangulation is in 3D space and is accurate up to about 1-2 meters, and preferably to about 20 cm. The position of any paired device can be measured relative to an established sensor mesh within the space where the mesh is established. The mesh may be set up without having a GPS from the link device 210 or mobile device 205 active. When GPS is not present or available, the mesh location will position all sensors relative to each other within the space. Fixed location sensors establish and know their positions after the first time they are set up and can then locate other sensors within that space. As additional sensors are added, they can know their relative positions to each other. Further, once a GPS enabled device like a mobile device 205 or link device 210 is added and paired, the sensor and the other sensors in the mesh can accurately establish their position in relation to a GPS based map like Google maps. Additionally, and or alternatively, the Wi-Fi connection on the link device 210 and other wireless connections with the link device 210 contribute to the positioning.

Figure 17:
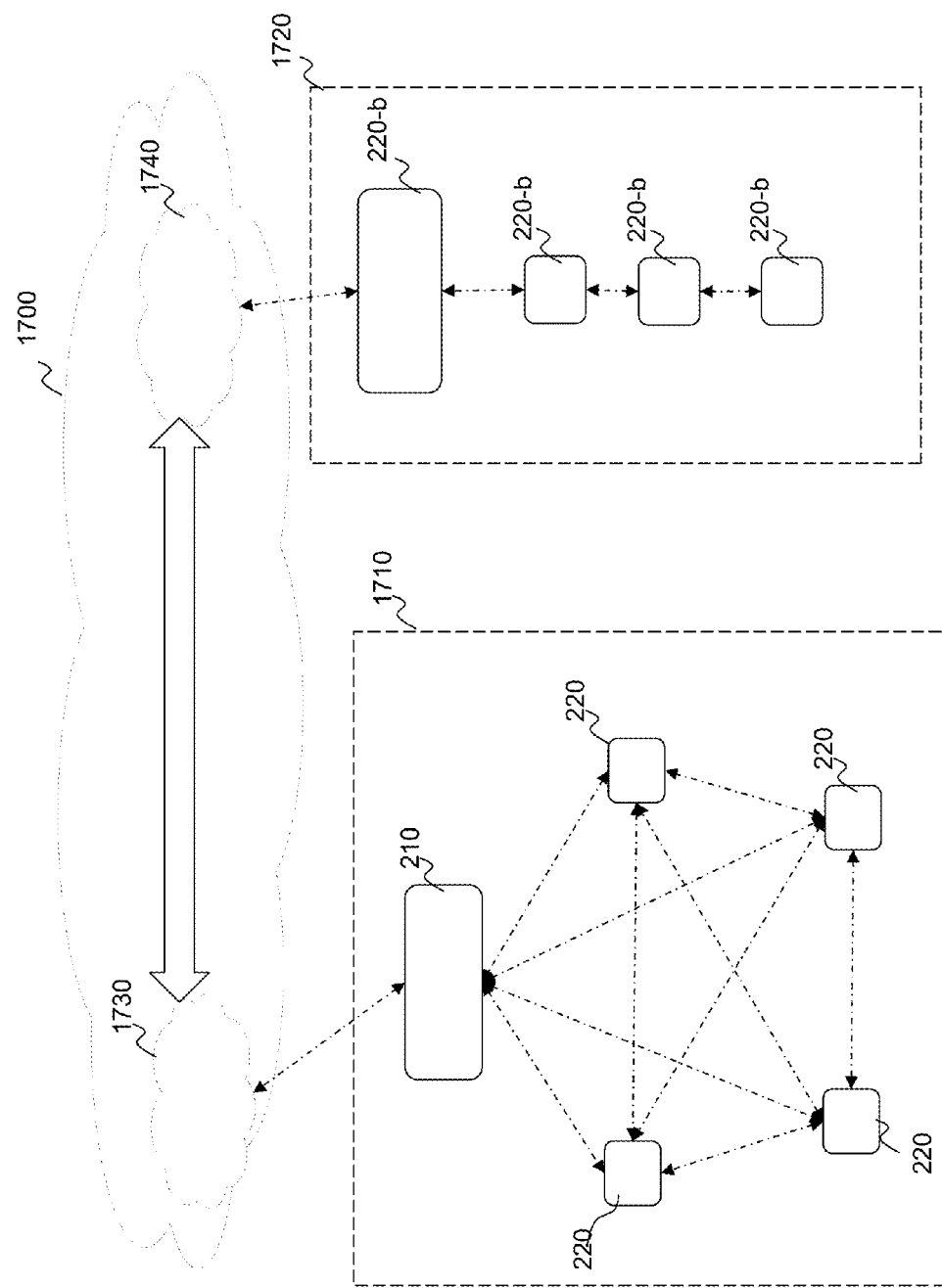
FIG. 17 is an illustration of a sensor based social networking system in accordance with an embodiment of the present disclosure.

FIG. 17 illustrates the sharing of sensor data in accordance with the present disclosure. A user A may have a sensor network 1710 comprising four sensors 220 and a link device 210. User B may have a separate sensor network 1720 comprising three sensors 220-b and a link device 210-b, although more or less sensors could be used. User's A and B can be geographically separated by thousands of miles or may be close in proximity. User A's sensors collects information and conveys that information to a secure storage 1730. Secure storage 1730 may be a secure location on a provider's network, may be a secure cloud storage on a provider's network or may be a secure cloud storage on a private or personal network. It is to be understood, that the communications between user A's link device 210 to secure storage 1730 may involve one or more wired or wireless networks. Similarly, user B's information will be collected by sensor's 220-b and conveyed via link device 210-b to secure storage 1740.

Because of the pairing between sensors 220, link device 210 and secure storage 1730, no other user will be able to view or intercept the sensor information. If however, user A and B wish to share some or all of the data collected by their respective sensors, they will be able to do so because they are all within secure network 1700. In this manner, user B will be able to view the activities of user A's sensors and vice versa. For example, in an embodiment, if one of user A's sensor's 220 is monitoring humidity within a building, and user A shares access to that sensor with user B, then user B will be able to view that activity file even though the information is not being gather by one of the sensors 220-b within user B's network 1720. By allowing sharing across secure storages with specific users or making the information public to all users allows other users to expand and grow their activity views without adding individual sensors. Additionally, such sharing fosters the social networking nature of the present disclosure because it allows users to share information about their real world lives.

Figure 18:
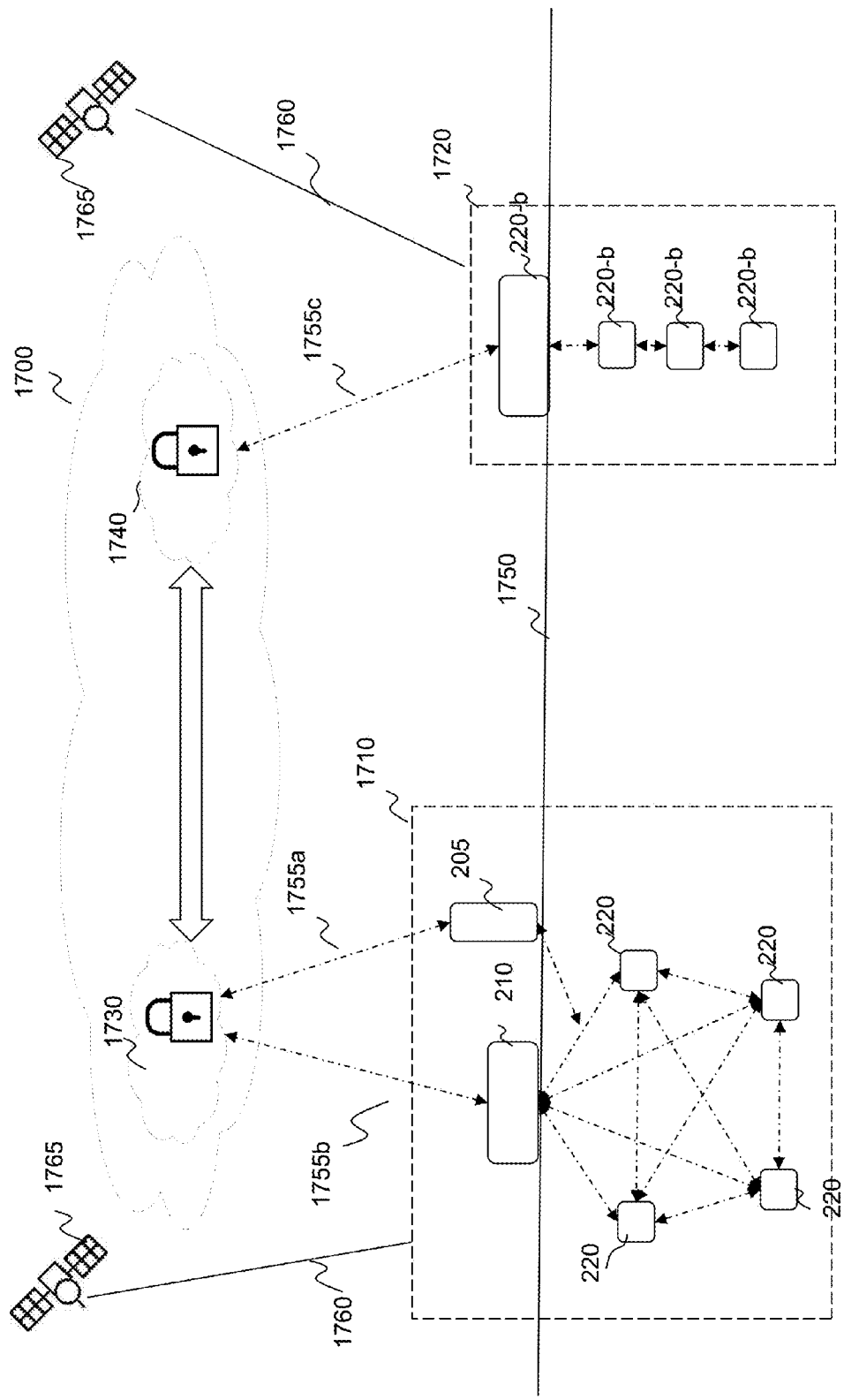
FIG. 18 is an illustration of a sensor based social networking system in accordance with an embodiment of the present disclosure.

FIG. 18 represents user A's and user B's sensor networks including the communications protocols. As seen in FIG. 18, communications that occur below line 1750 between the various sensors and the link devices 210 or the mobile device 205 are all short range communications such as BLE, although any type of low power communication may be used. Communications 1755a-c, between the link devices 210, the mobile device 205 and the personal storage spaces 1730 and 1740 may be any wireless communication technology including, but not limited to Wi-Fi, WCDMA, CDMA, GSM, UMTS, TDMA, etc. and may be based on any telecommunications or wireless standard including but not limited to 3G, 4G, LTE, GPRS, EDGE, etc. Satellites 1765 may global positioning satellites and may communicate with any or all of the components within sensor networks 1710 and 1720 via signals 1760.

The sensor data generated in sensor networks 1710 and 1720 will be sent to the personal storage of users A and B respectively. Any selected subset of the data may be securely shared within secure network 1700 and will remain secure from any outside user. Only user's with devices registered with the provider will have access to the data stored within secure area 1700. In this manner, in an embodiment, the sensor system is closed to outside users. In contrast, data collected from a sensor provided by a 3rd party will not be stored within secure area 1700 but will be generally accessible to all user's at large.

In an embodiment, users are able to share and/or view their sensor networks and/or activities on a mobile device from anywhere in the world. In this manner, user's may create uses and activities for the various sensors and track their sensor data or "life stream".

Figure 19A:
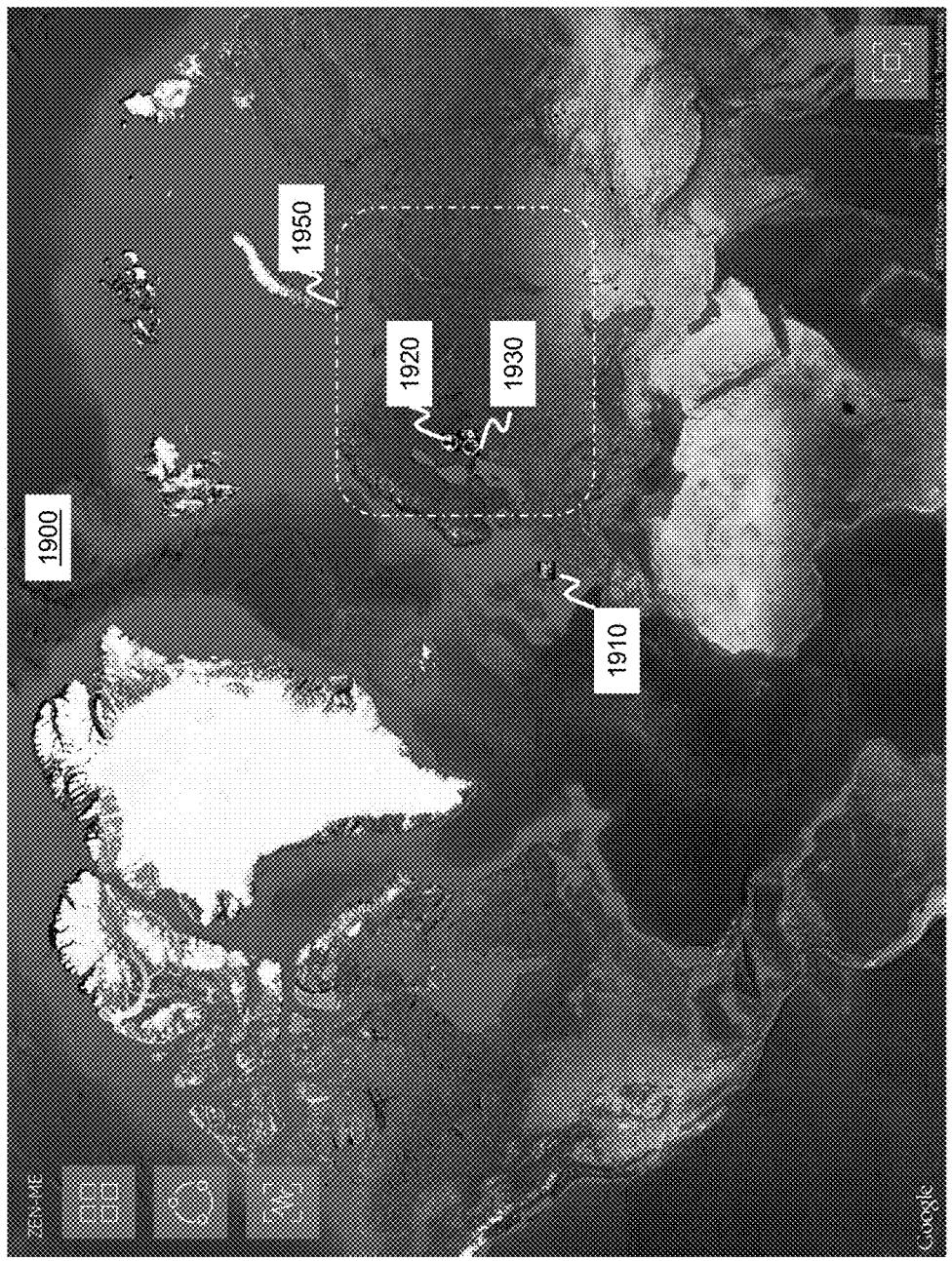
FIGS. 19A-E are various map layer views of a sensor based social networking system in accordance with an embodiment of the present disclosure.

FIG. 19A depicts an embodiment where various sensor networks appear on a world map displayed, for example, on a mobile device running an application such as the Zen-Me™ browser from Zen-Me®. Map 1900 may be generated using any standard mapping application such as Google Maps™ or Google Earth™ and may include all or a portion of the world view. Icons 1910, 1920 and 1930 represent three different available sensor networks that are available for viewing by this user. Sensor networks 1910, 1920 and 1930 may all belong to the same user or may belong to individual users or establishments who have agreed to make their data public for other viewers to see. Additionally and/or alternatively, sensor networks 1910, 1920, and 1930 may be shared only among users who have chosen to share with only other specific users on the same system running the same App. As seen in FIG. 19, three sensor networks 1910, 1920, and 1930 are visible, but because other users may have chosen not to share data with the current user, there may be several or thousands of other sensor networks available, but because of the secure nature of the network disclosed in the present disclosure, only those that have access can see the respective sensor networks.

Figure 19B:
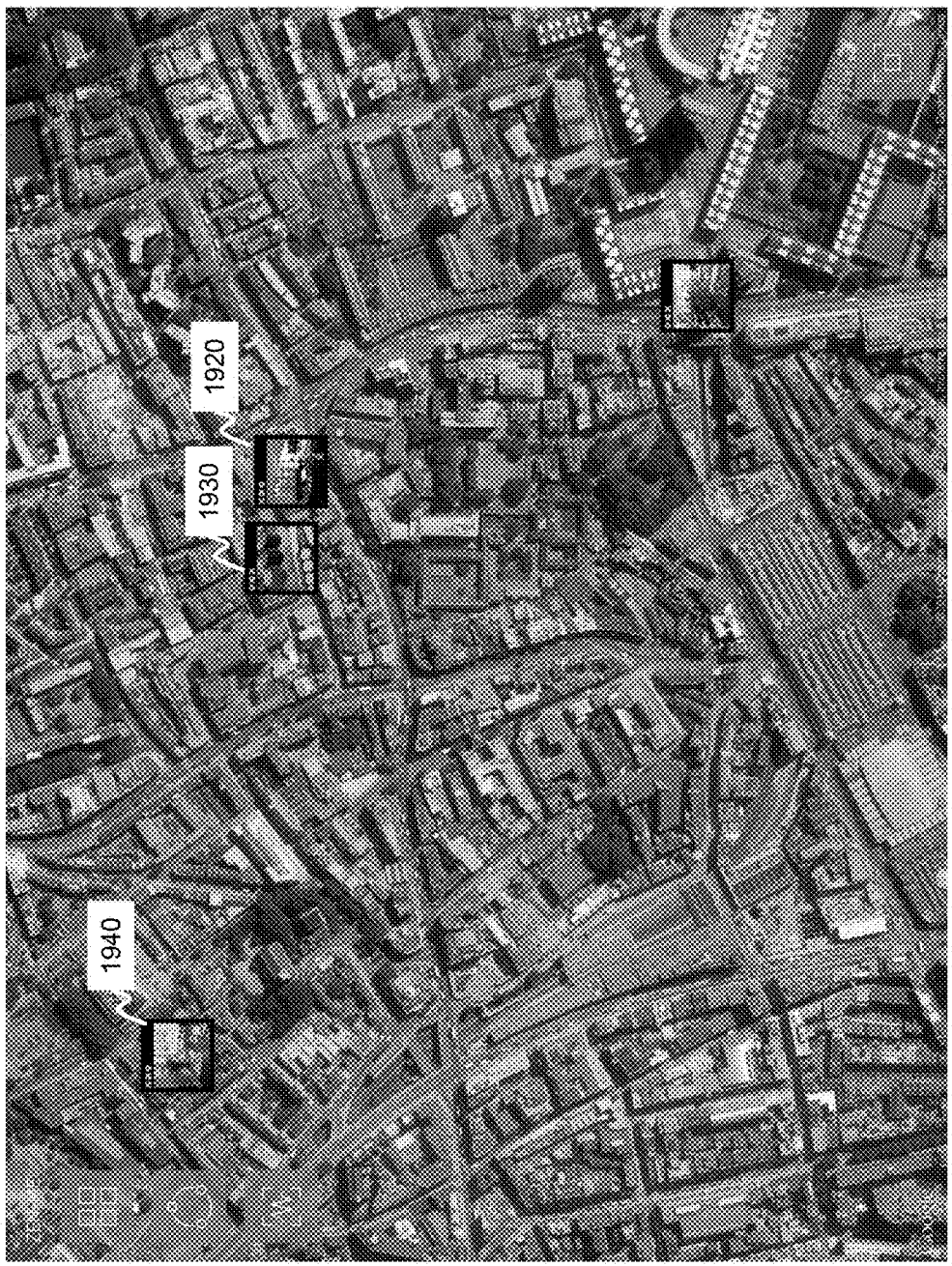

It will be appreciated by those skilled in the art, that map 1900 is scalable and may be manipulated by the user using any known scaling and viewing technique, including, but not limited to tapping, squeezing, pinching, scrolling, etc. FIG. 19B illustrates a close up view of area 1950. As can be seen in FIG. 19B, more detail is displayed as the user zooms in on a specific area of the map 1900. Locations for sensor networks 1920 and 1930 become easier to see and new sensor network 1940 comes into view. As will be appreciated by those skilled in the art, the icons for the various sensor networks may represent the locations of the sensor networks, the owners of the networks, or any other information the user wishes to convey.

Figure 19C:
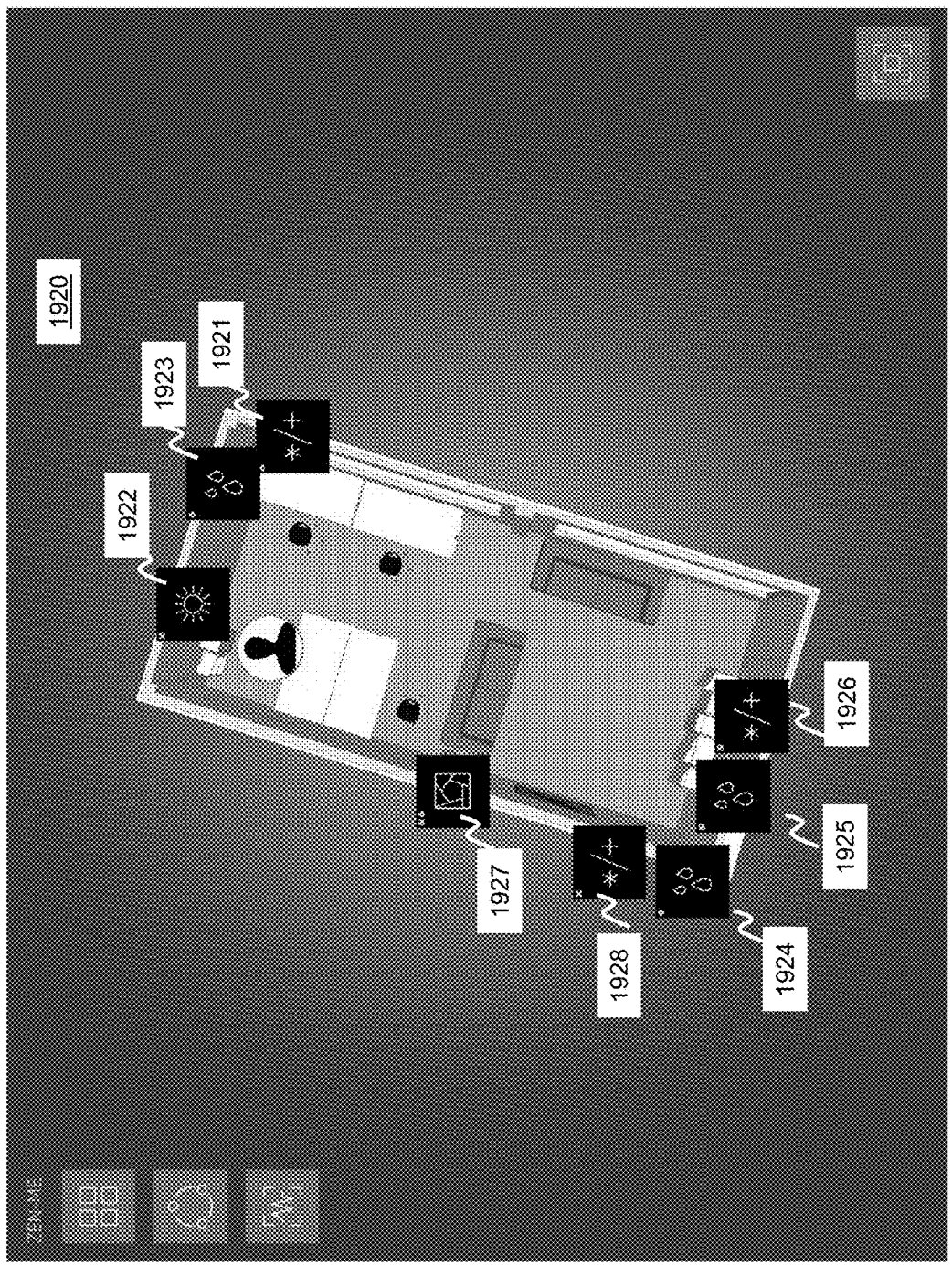

FIG. 19C depicts a view of a map layer in accordance with an embodiment of the present disclosure. As seen in FIG. 19C as a user continues to zoom in on a specific location such as sensor network 1920, a rendering of the underlying office, home, commercial establishment, vehicle, etc. may be displayed creating a personal space layer. This personal space layer may be generated by free hand drawings, standard household layouts, consumer 3D software like Google Sketch-up™, 3D Max™, by using aerial photos, or similar satellite imagery, video footage, drone footage, or by using a sketch tool like Zen-Me Personal Space Editor provided by a network provider like Zen-Me. It is to be understood, that the personal view takes over where imagery from standard maps, etc, ends. Accordingly, aerial footage or other imagery used for establishing the personal space is more accurate than what conventional mapping services. The imagery used for personal space may be an aerial photo that a user has taken from a roof or balcony of her house, or by any other mean, aerials can also purchased from third parties or they can be filmed by drones or other remote devices.

It will be appreciated, that there is no limit to the level of detail that may be included in the personal space layer. In an embodiment, multiple layers of a multi-story building may be displayed allowing the user to penetrate each level in sequence. In an embodiment, a sketch tool may be included in the App. to aid the user in creating this underlying personal space layer. In another embodiment, the personal space layer may be created in any available drawing tool and imported. As seen in FIG. 19C a user may indicate each deployed sensor by icon in the personal space thereby allowing the viewer a better appreciation for the potential information available from sensors 1921-1928.

In an embodiment, because of the communications and triangulation between sensors, the placement of the sensors within the personal space layer depicted in sensor network 1920 is a realistic depiction of the placement of the actual sensors and not just icons on a screen. If a sensor is moved or removed in the real world, its placement within the personal space layer will correspondingly change. The sketch used to generate the underlying personal space layer may be manipulated, i.e., rotated, sized, cropped, to more accurately reflect the actual sensor location since the sensor location is based on their placement in real space. The GPS accuracy of the sensors may be between 1 and 100 feet, but more preferable is between 1-9 feet. Additionally and or alternatively, the actual GPS location of any specific sensor may be offset or dithered for personal security reasons. This offset may be based on a fixed distance or a variable/changing offset. In an embodiment, because each sensor may have an icon depicting its function, the viewer is able to select the data that they are interested in simply by clicking on the sensor icon.

Figure 19D:
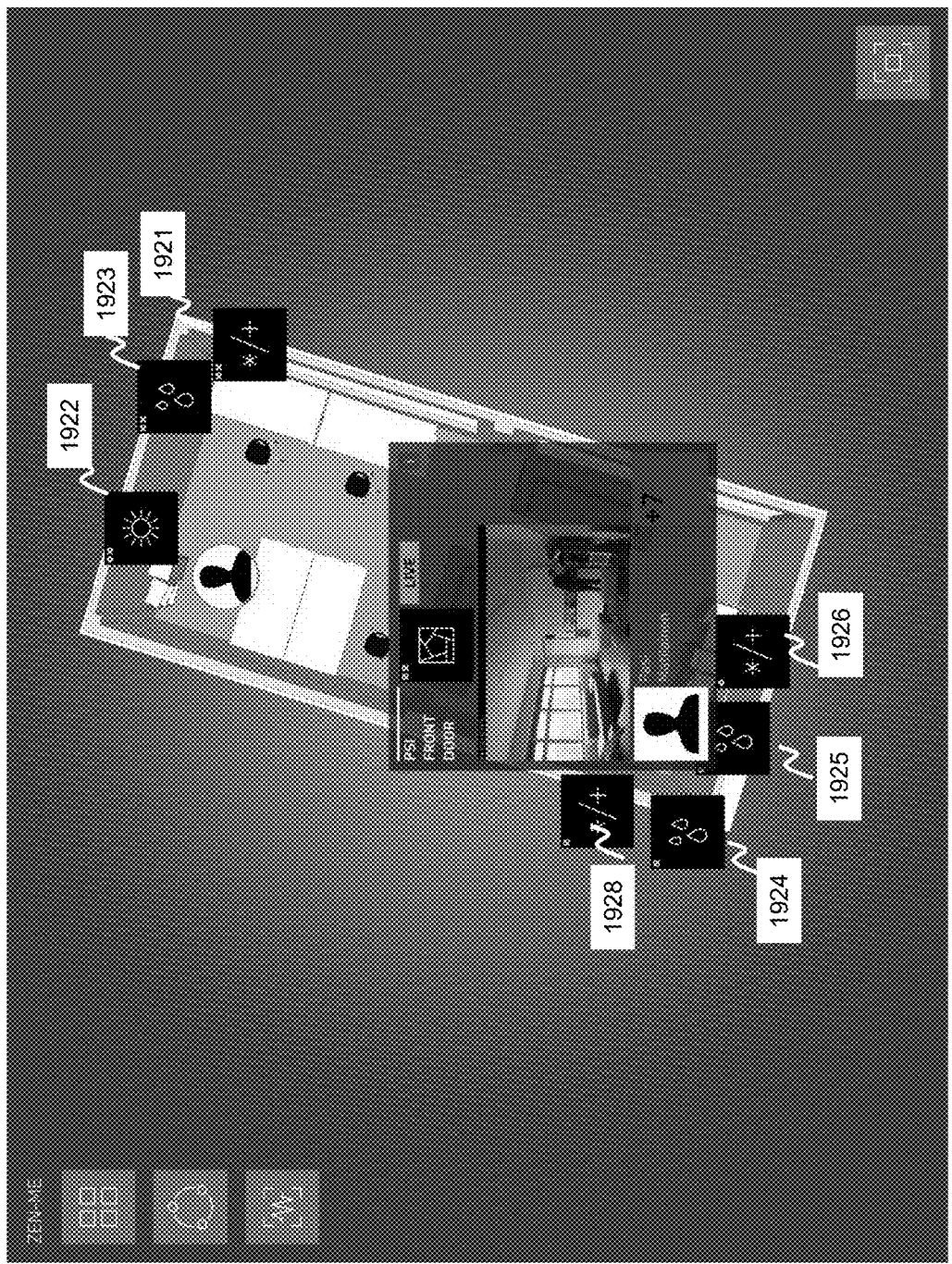
Figure 19E:
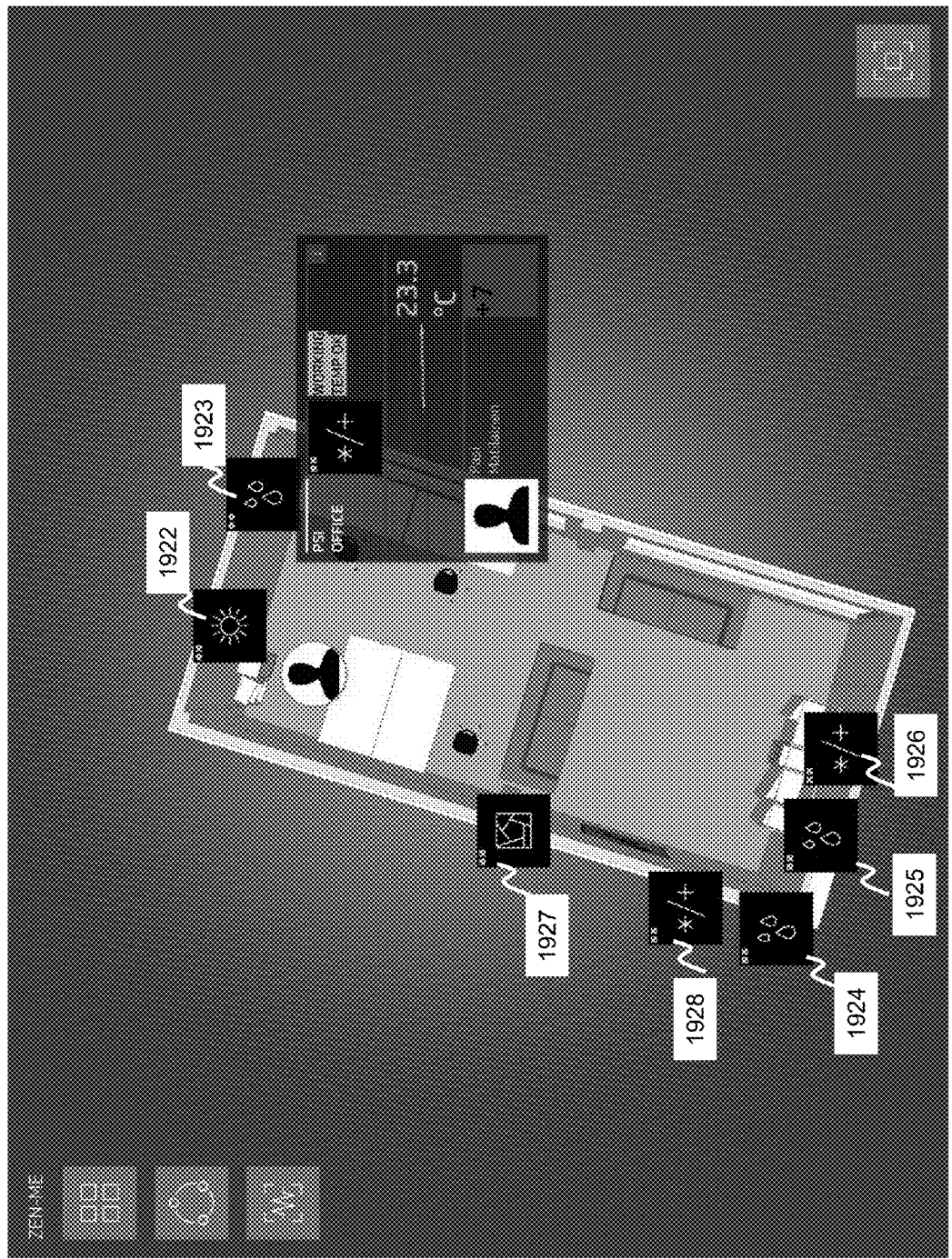

FIGS. 19D and 19E depict sensor information typically available to a user by selecting an icon within a personal view layer. In FIG. 19D the user has selected sensor 1917 which is a camera sensor. The window shows the status of the sensor (live), the sensor icon, and the location of the sensor (Front Door). This visual stream may be available from any device capable of creating visual images and can be used to report any such visual streams. Visual streams may originate from security cameras, personal IP cameras, visual sensors, or drones or robot sensors. The icon may also include information about the owner of the sensor and in the case of a video camera, provides an image or still picture from the sensor itself indicating the availability of the visual stream.

FIG. 19E illustrates the information associated with sensor 1921, which is a temperature sensor. The window may provide owner information, location (office), the status of the sensor (working) and an actual temperature reading (23.3° C.) and graph. It may also provide a visual indicator of an alarm condition via color (red, yellow, or green).

In an embodiment, user's can incorporate social communication into any view including but not limited to personal views, life stream views, or any other view or selection of data available. This ability enhances the social networking experience for user's sharing sensor networks. In an embodiment, user's can add comments directly to the activities. In an embodiment, once the user selects the activity to view and comment on, they may additionally select to add comments by any known means. The user, in an embodiment, is able to comment on the values displayed in the activity informational graphics, like the temperature reading displayed, "Vey hot at the Gym today, and crowded too . . . avoid lunch times". Also, in an embodiment, the most recent comments are visible in the life stream views in near real time, as well as anywhere the information from the sensor and info-graphics is being shared.

Figure 20:
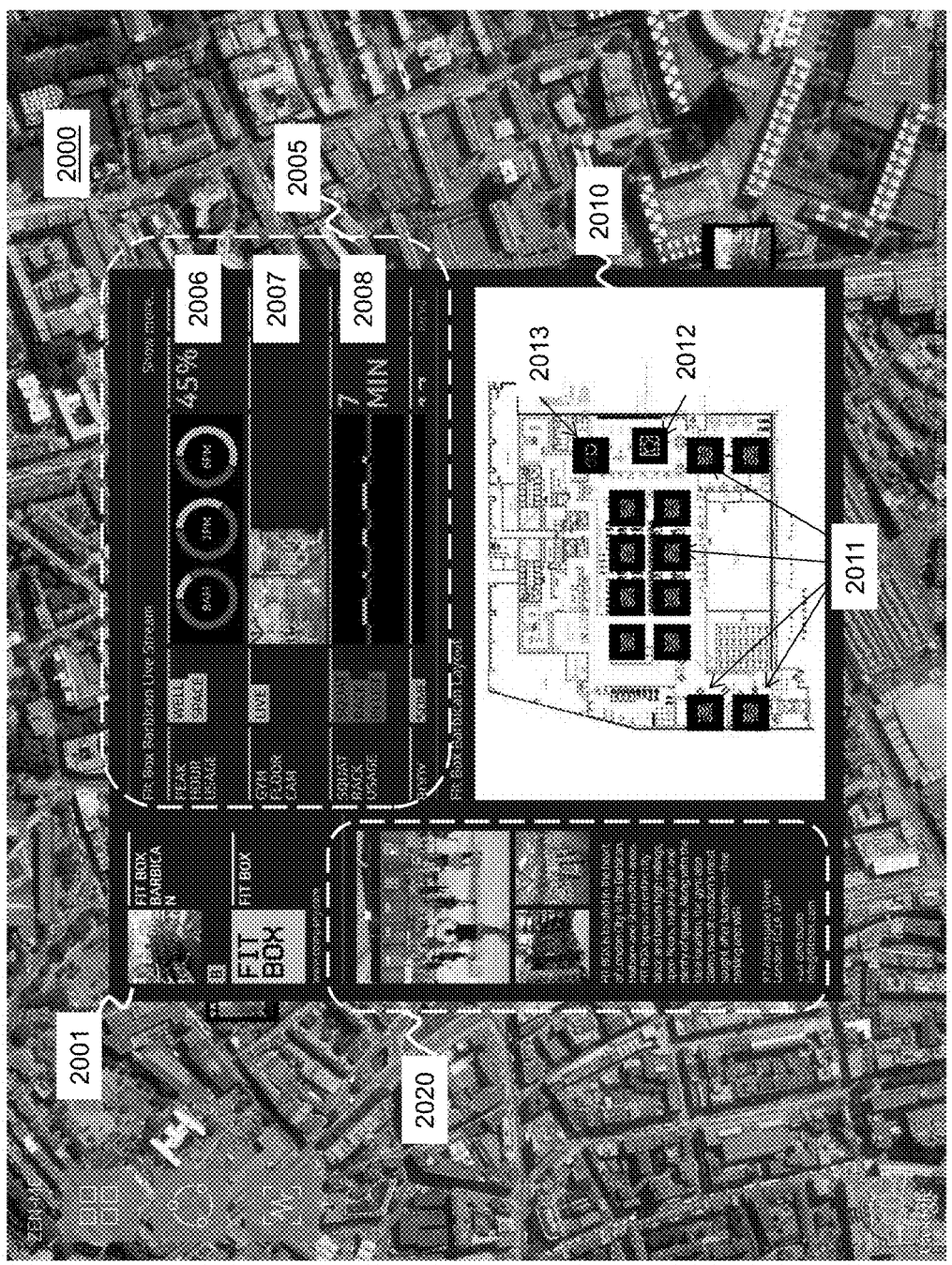
FIG. 20 depicts a location view of a sensor based social networking system in accordance with an embodiment of the present disclosure.

In another embodiment, a location view for a building or commercial site is displayed. FIG. 20 depicts a location view 2000 for the "FitBox" health club. Window 2001 displays information related to the location including sensor space 2005, location view 2010, and description/content space 2020. Sensor space 2005 may include some or all of the sensors located at the location. Sensor space 2005 includes information related to peak hour usage 2006, a camera 2007 and the squat rack usage 2008. As will be appreciated, peak hour usage information 2006 may be provided by a motion sensor, a vibration sensor, an ambient light or noise sensor or other types of sensors. As indicated in peak hour usage area 2006 gym usage may be indicated on an hourly bases. This information may be displayed in a variety of ways and is not limited to the display shown. As will be appreciated a variety of bar graphs, line graphs or any other rendering may be used to convey the desired information. In space 2007, a camera view directed at the gym floor is shown. As will be appreciated, this could provide streaming video, time lapse or still images. In area 2008, a line graph depicting the squat rack usage within the gym is presented. This information may be provided by vibration sensors, but could also be provided by other sensors, such as motion sensors or noise sensors. As will be appreciated, in an embodiment, the sensor information is related to the sensors depicted in the location view 2010. Location view 2010 provides the personal layer with the various sensor icons placed within the image. As can be seen, 12 vibration sensors 2011, 1 camera 2012, and 1 motion sensor 2013 are located throughout the location. As noted, the sensors displayed in the personal view depict the actual placement of the sensors within the space.

Description/content space 2020 of window 2000 may include promotional or informational content provided by the windows owner or may include other information. It may comprise streamed video images provided by a camera sensor or may comprise text and still images.

Figure 21:
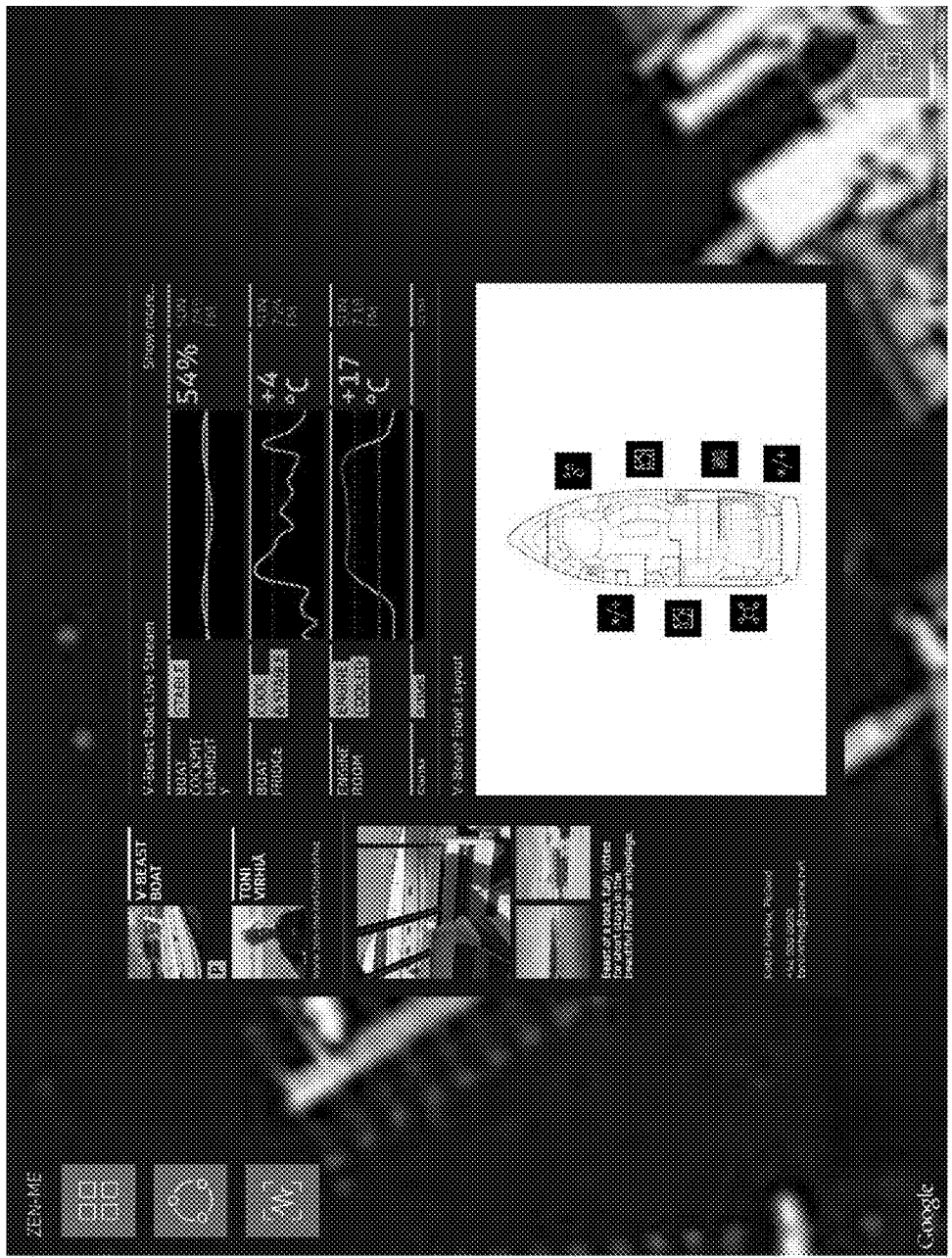
FIG. 21 depict a location view of a sensor based social networking system in accordance with an embodiment of the present disclosure.
Figure 22:
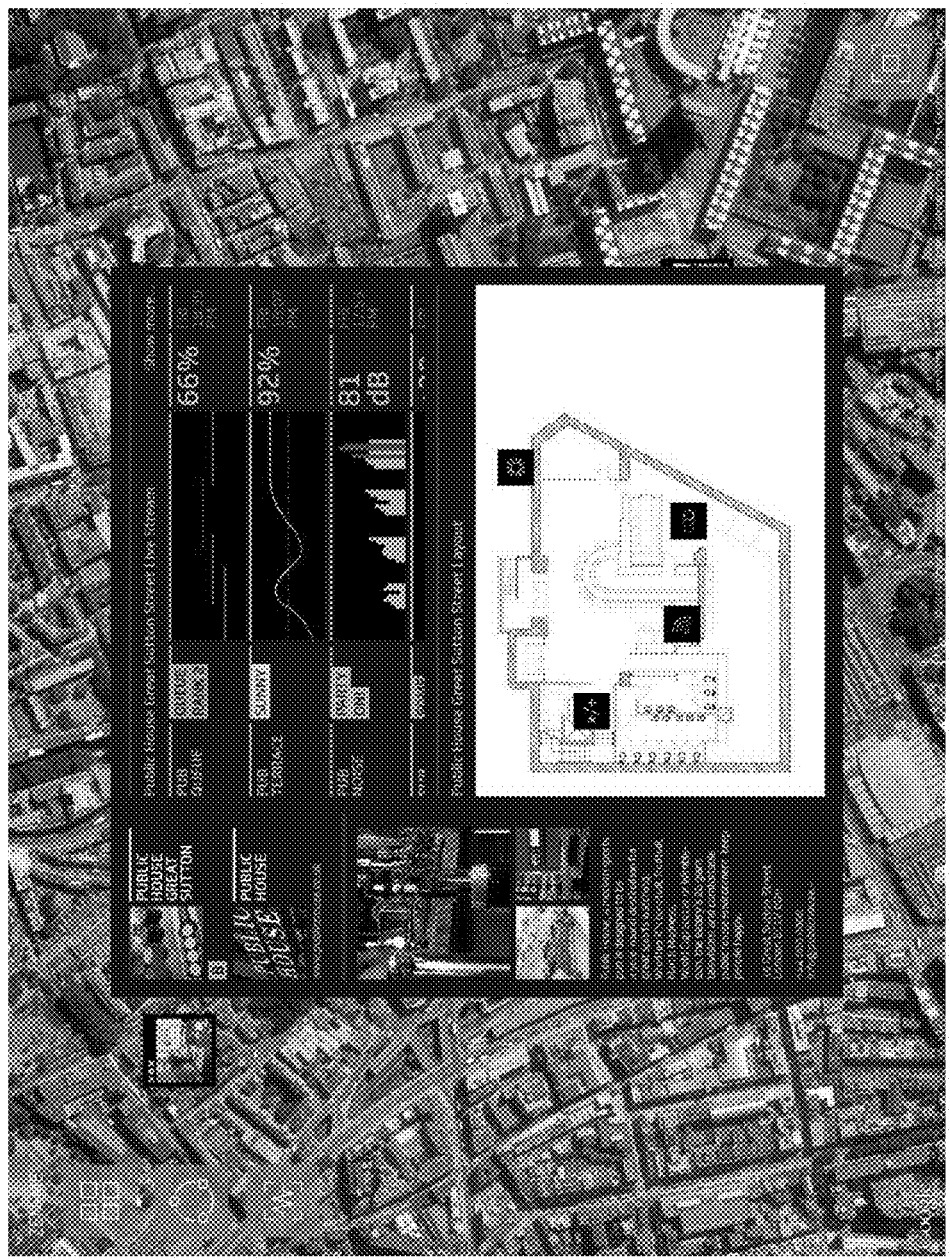
FIG. 22 depicts a location view of a sensor based social networking system in accordance with an embodiment of the present disclosure.

FIGS. 21 and 22 depict additional location views for both private locations (FIG. 21) and public locations (FIG. 22). As will be appreciated, the location views are not limited to houses, office, or retail sites, but may include, boats, RVs', trucks, outdoor spaces, parks, parking lots, playgrounds, sports facilities, garages, warehouses, hot tubs, spas, saunas, woods, mountains, ski resorts, pools or any other location, were a sensor may be located.

Figure 23:
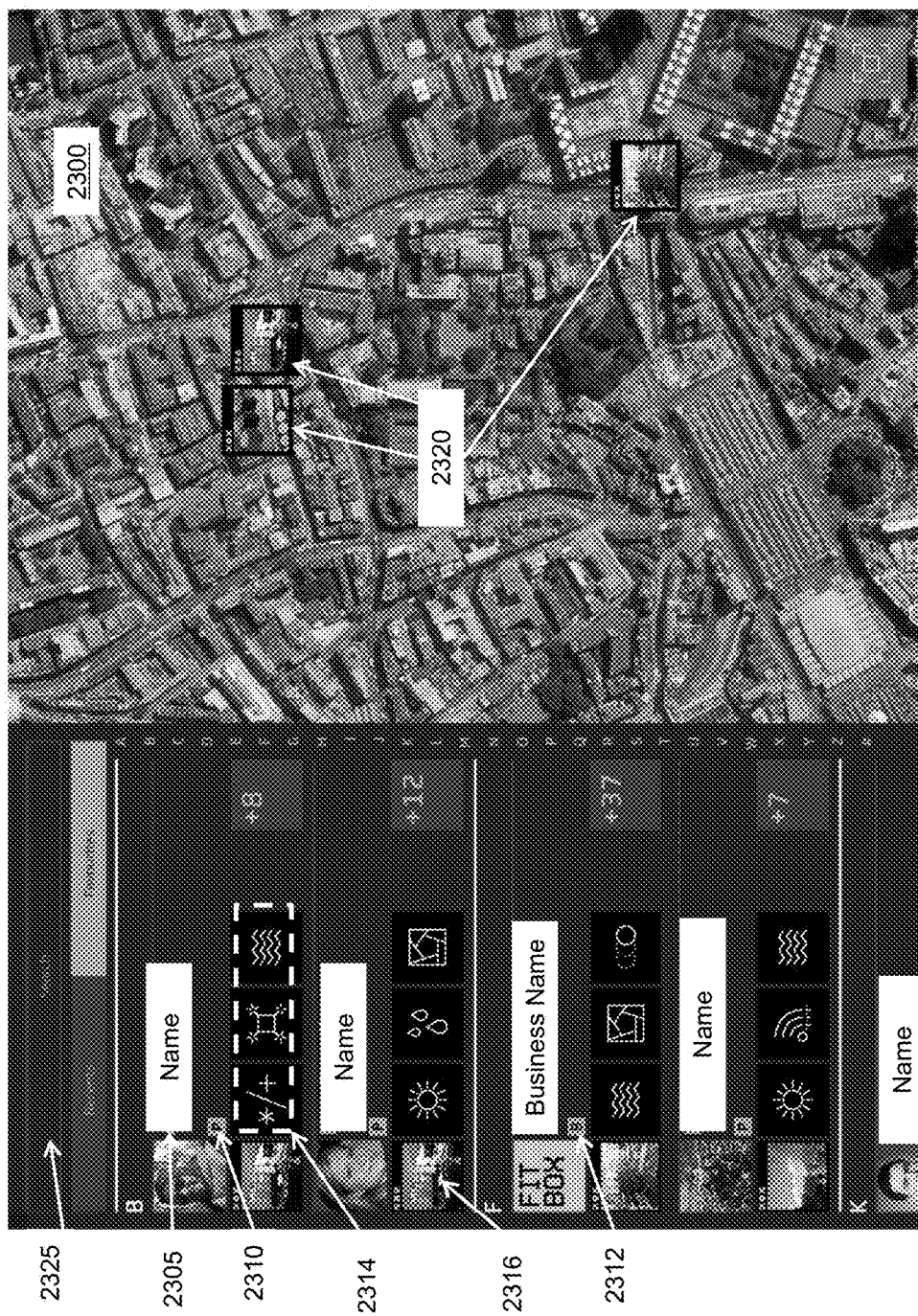
FIG. 23 depicts a contact list of a sensor based social networking system in accordance with an embodiment of the present disclosure.

In an embodiment, users of the system, may create contact lists comprising other users and/or other retail or commercial establishments which have established sensor networks. In this way, a user is able to build a social network of other users and share data within the confines of the secure network. FIG. 23 depicts a sample of a contact list in accordance with an embodiment of the present disclosure. Image 2300 may be overlaid with a contact list indicating the contacts which appear within the map image. Additionally and/or alternatively, the contact list may overlay the map allowing the user to scroll and select any contact desired. Icons 2320 may indicate sensor networks for the contacts displayed in area 2325. Both business and personal contacts for users of the sensor network are displayed in the left portion of image 2300. Area 2305 may indicate the name of the contact and/or the name of the business. Icon 2310 indicates if the contact is personal or a business 2312. Area 2314 indicates a sample of the sensors deployed by the select contact, in the case shown in area 2310, the contact has three sensors, a temperature sensor, an ambient light sensor and a vibration sensor. Icon or image 2316 may provide an image if a camera sensor is installed. It will be appreciated by one skilled in the art, that by selecting a contact, the user will be taken to that contact's sensor network and will have access to the shared information provided by that contact. While the present disclosure represents a single contact list, it will be appreciated by those skilled in the art, that numerous variations of the contact list may be employed without departing from the present disclosure.

Figure 24A:
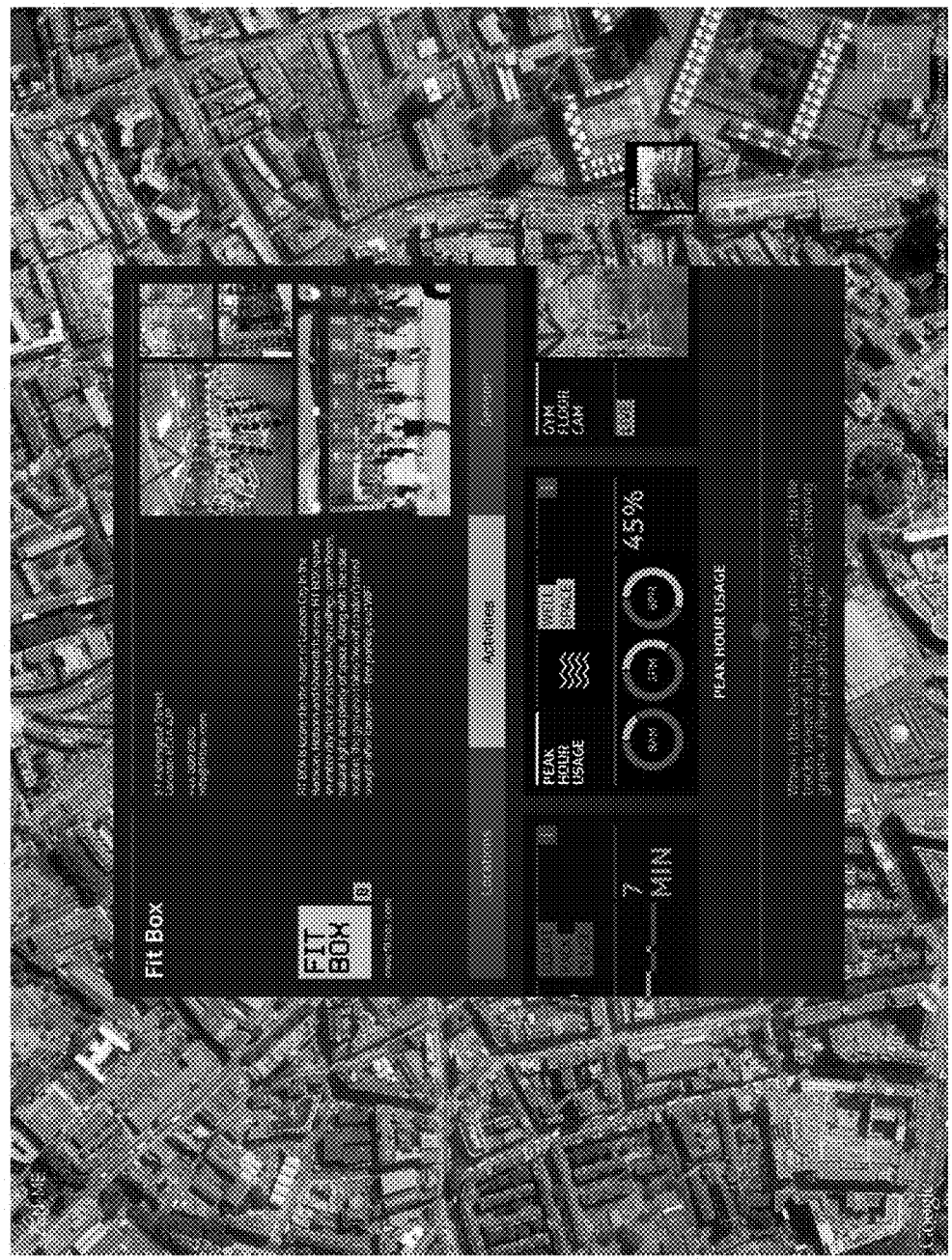
FIGS. 24A-B depict contact views of a list of business contacts for a sensor based social networking system in accordance with an embodiment of the present disclosure.
Figure 24B:
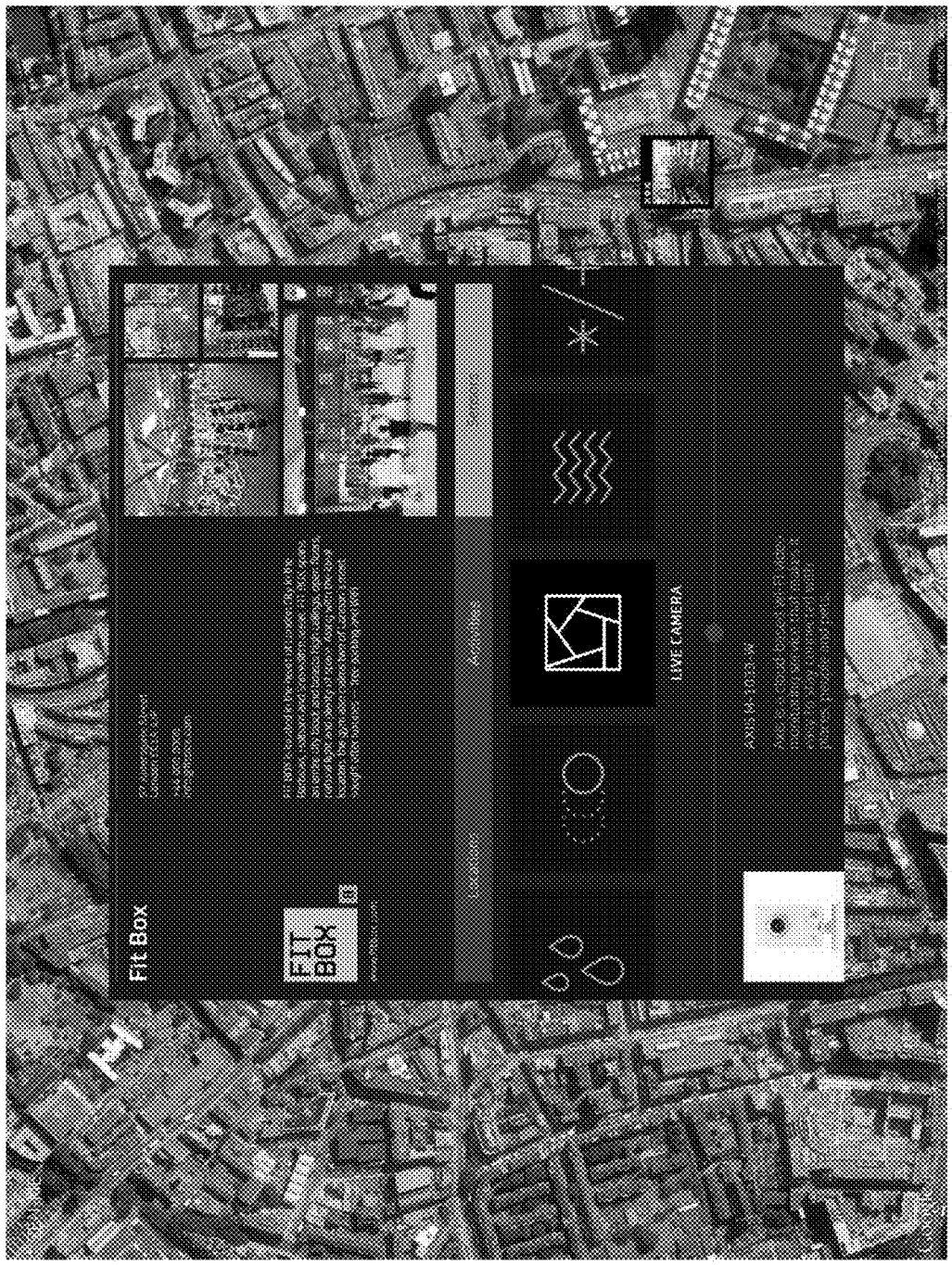

FIGS. 24A and 24B depict views of a business contact in an embodiment of the present disclosure. FIG. 24A shows the "activities" or sensor scenarios currently deployed at the FIT BOX gym. As can be seen, the peak hour usage is one of the activities available to view and or share from the contact with the present user. Other activities include the gym floor camera and the squat rack usage activities. By selecting one or more of these activities, the user may gain access into the sensor environment and track the activities at this location.

FIG. 24B, in an embodiment, illustrates the available sensors at the selected business location. By selecting the available sensors, information about the sensor and its capabilities may be displayed for the user. If the user is interested in tracking this data, they may select the specific sensor at this location and that information will be shared in the user's network.

Figure 25A:
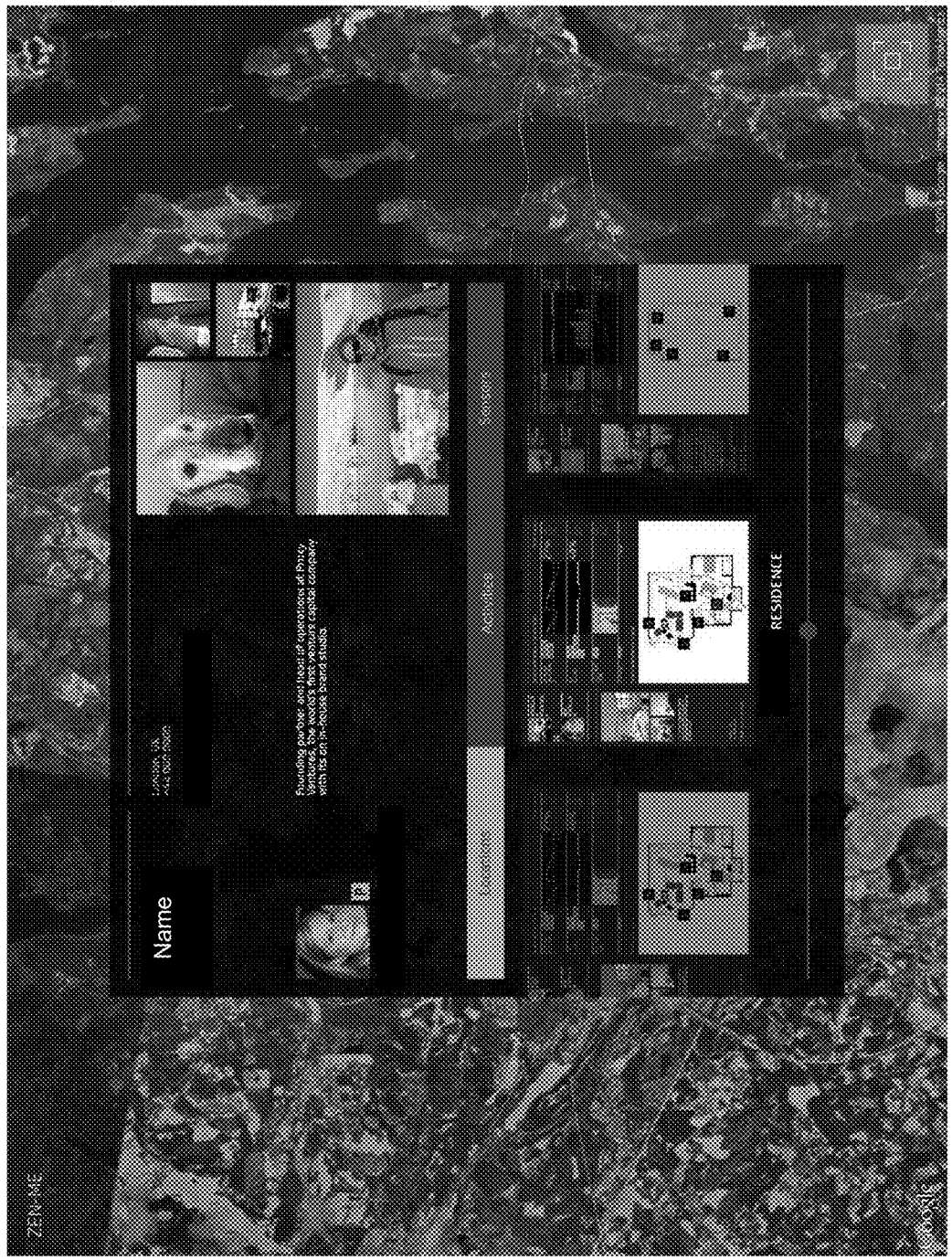
FIGS. 25A-C depict views of a personal contacts activities for a sensor based social networking system in accordance with an embodiment of the present disclosure.
Figure 25B:
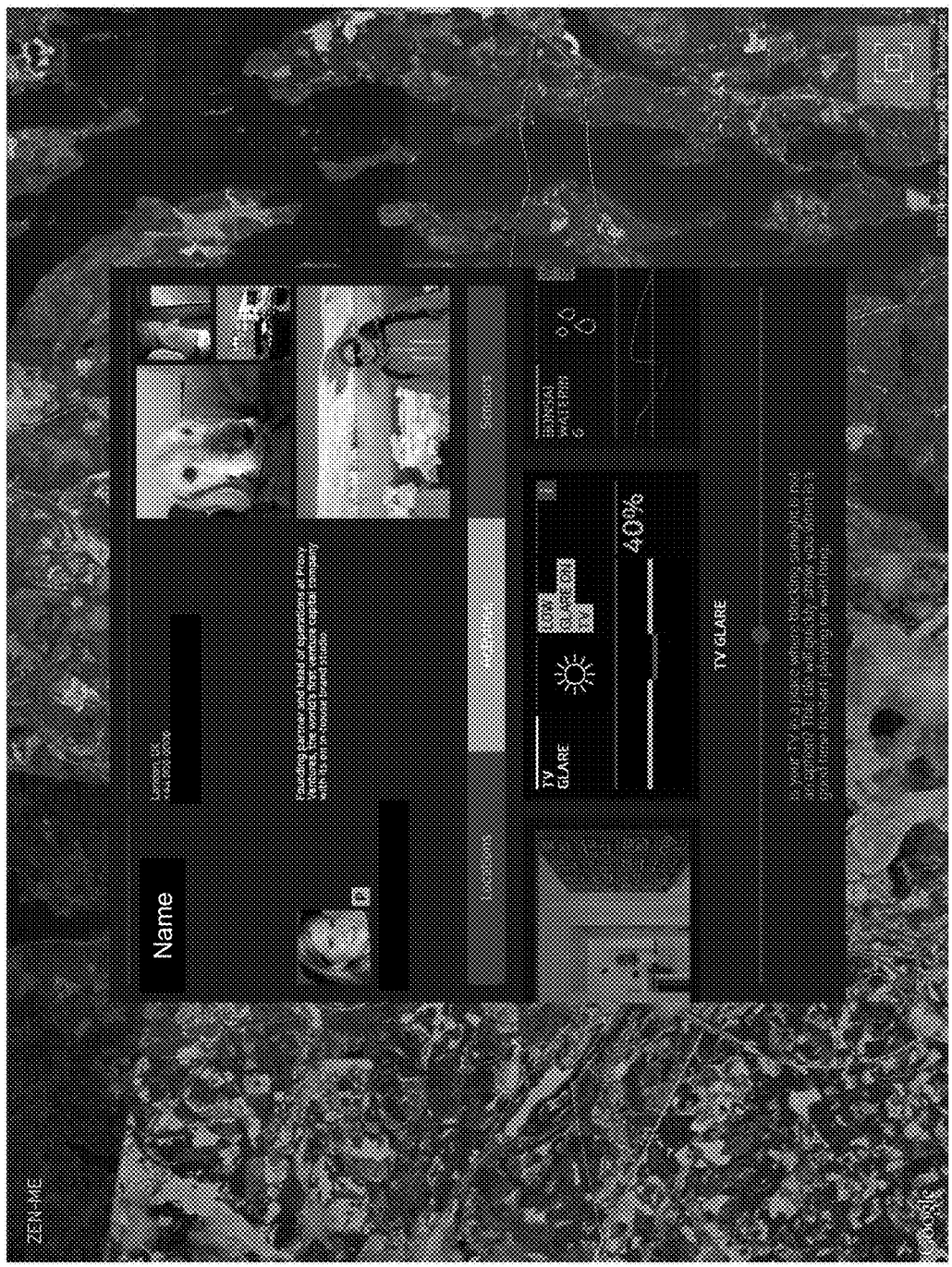
Figure 25C:
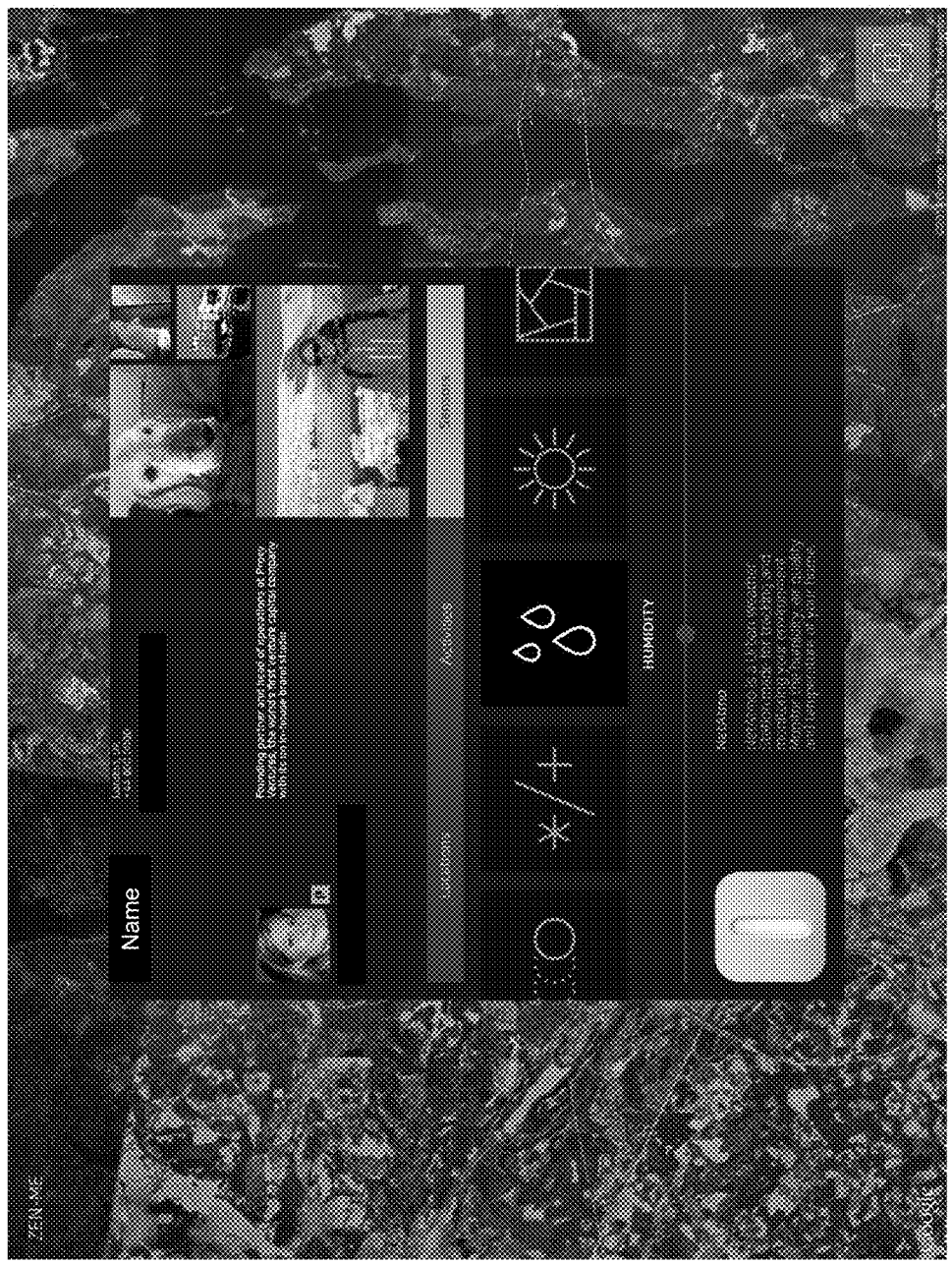

FIGS. 25A-C depict views of a personal contact. FIG. 25A depicts the various locations that this contact has deployed sensors. As illustrated, the residence is available as well as the office and any other locations where a sensor network is located. It will be appreciated, that if a contact has only one link device 210 only information for the location where the link device is presently located will be available. This is because the sensors need to communicate through the secure pairing with the link device 210. Additionally and/or alternatively, if the user is at a location with their mobile device, which may have been paired with the deployed sensors, sensor data may also be available at that location because the sensors may communicate securely through the user's mobile device 205. Accordingly, if a user wishes to monitor sensors at several locations, they may need to deploy separate link devices 210 or may move their link device 210 from location to location.

FIG. 25B depicts the activities available for this particular contact. In this embodiment, the user created a TV glare activity to monitor light on the television screen using an ambient light sensor. The user also may have other activities established such as plant watering, etc. If a contact in the user's network has created an activity, in addition to monitoring that activity, the user may, if permission is granted, copy that already created activity and deploy it within the user's own network. In this manner, the user does not need to recreate the activity from scratch. This ability in some embodiments, creates an "activity library" for users within the same social network to share activities. In an embodiment, the provider's "official" library of activities contains ever increasing number of activities because any new activity created by a user for their own purposes becomes part of the provider's library for other user to deploy. The data from these user generated activities is not be shared nor is any other user data. In an embodiment, the can add creator credits or attribution for the activity that can be shared in the activity "about" details. FIG. 25C illustrates the sensors the contact may have deployed within their sensor network.

In an embodiment, the user may create their sensor network utilizing activities that have been previously created by the App provider. For example, a user may wish to deploy a temperature sensor to remotely monitor the temperature in their garage. Rather then create an activity to control the sensor from scratch the user may be presented with a series of already created activities to select from. The activities may be presented based on the type of sensor or may be presented based on the type of activity the user is seeking to monitor. For example, in an embodiment, the user may be presented with 10 activities to use with a temperature sensor. This may cause the user to deploy a sensor in a fashion not previously intended. Additionally and/or alternatively, the user may be presented with a list of activities for temperature sensors and the user can then select the activity. The activities allow the user to quickly and easily deploy the purchased sensor or achieve the desired monitoring they are seeking.

In an embodiment, the activities are presented to a user in display of available activities or in a list or menu format that allows the user to drag and drop from a library of activities to the user's personal canvas. The user may add by selecting or dragging and dropping the activities from the activities menu, although any other method may be used.

Once the user selects the desired activities, they may be presented to the user in any format. In an embodiment, an arrangement of squares boxes with individual elements inside is presented in a heads up display (HUD) type format. The HUD acts as a canvas where user sets up the activities. In an embodiment, the user does not necessarily use the HUD for daily observations, instead, only for setting up and managing activities. All set-up may be done by visual and graphical interface, although menus, drop downs, overlays, pop ups, could all be used. Once a user has set up the activities and sensors selection on the HUD the user defines the privacy settings utilizing a privacy menu. The privacy menu allows the user to share only the elements the user wants to share. The user is the only one that may access their own HUD. In an embodiment, elements from the HUD are mirrored to other users on map view, contacts view and other public displays in the system. In an embodiment, the HUD is never shared or accessible by other users.

Figure 26A:
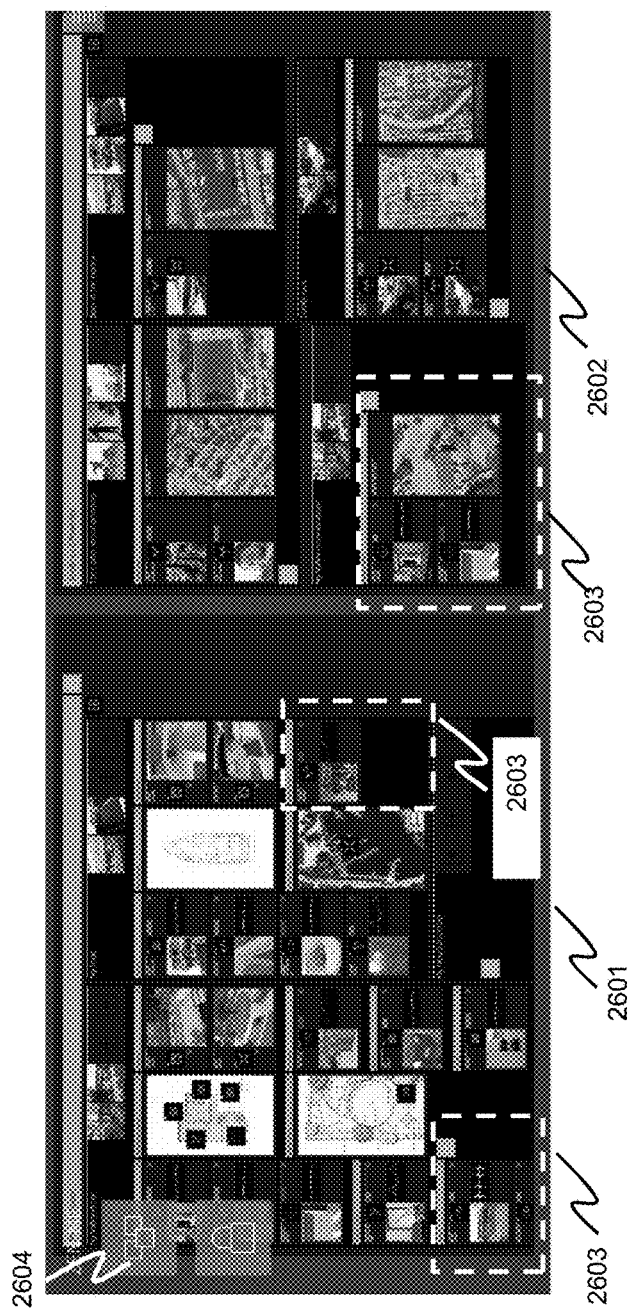
FIG. 26A depicts a user's display view for a personal space for a sensor based social networking system in accordance with an embodiment of the present disclosure.
Figure 26B:
FIG. 26B depicts an activity menu display view for a sensor based social networking system in accordance with an embodiment of the present disclosure.

FIG. 26A depicts a HUD for a user showing personal space area 2601 and geofence and proximity spaces 2602. Personal space area 2601 may comprise all the activities the user has previously selected and placed in the network. Each element 2603 may represent a separate activity or sensor that the user is presently controlling and/or monitoring. Icon 2604 represents the activity menu and allows the user to easily add and select new and additional activities to enable. By selecting icon 2604, the user is presented with the activity menu as seen on FIG. 26B. The activities menu 2605 presents the user with options which may be selected and dragged directly to the user's HUD 2601. Area 2606 presents the user with a selection of the most popular activities to choose from. Area 2607 may present the user with activities used by others within the network and shared with the user. Area 2608 allows the user to search by activity while area 2609 allows the user to search by parameter. Such parameters may be by creator, by organization, by sensor manufacturer, by use, by indoor, outdoor, weather, etc. Once a user has selected a new activity, they may just drag it and place it on area 2601. The activities already present may automatically rearrange to allow the new activity to be displayed or it may add at the bottom of the display. It is understood by those skilled in the art, that the selection and placement of activities may be implemented in a number of ways based on design choice without departing from the present disclosure.

Figure 27:
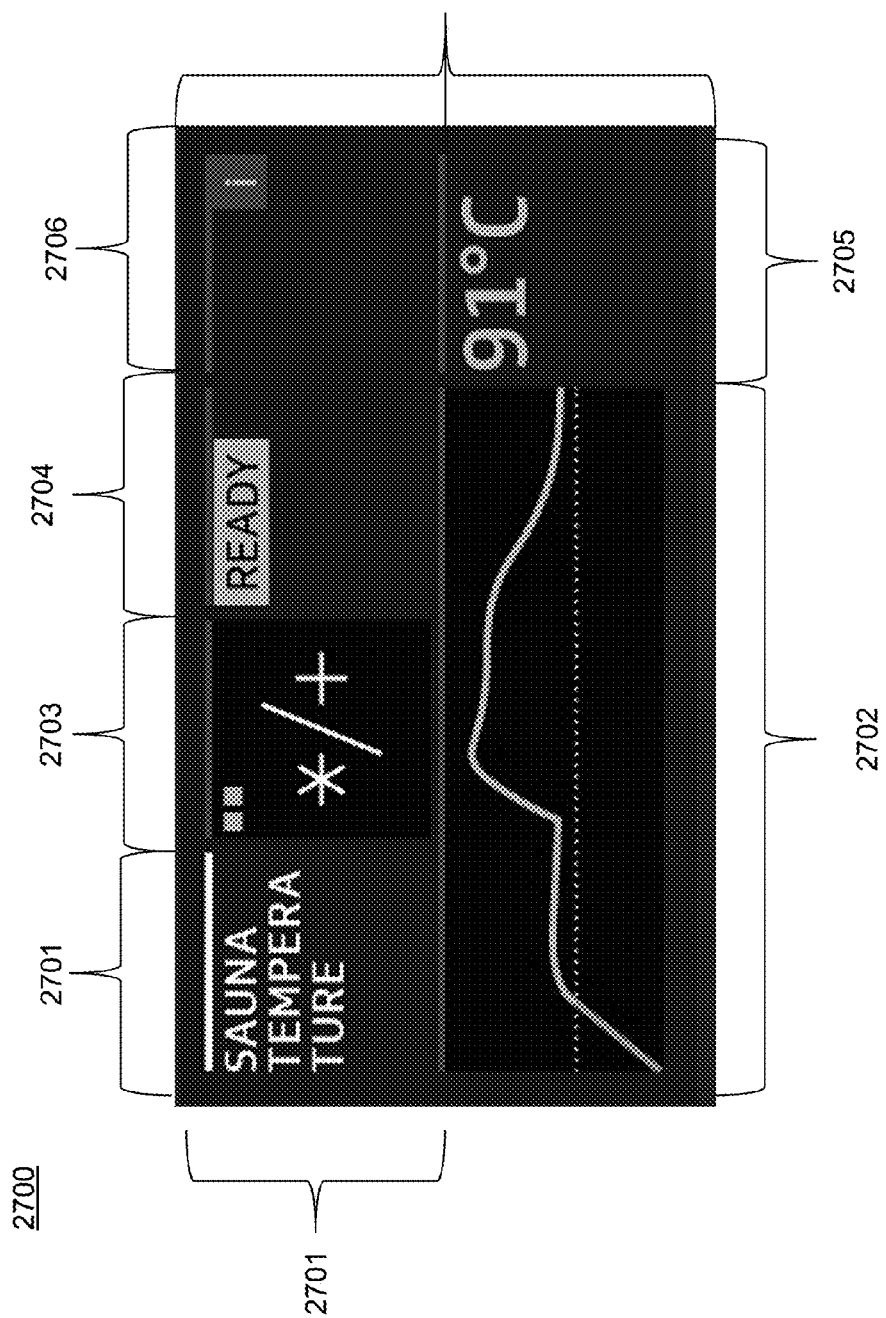
FIG. 27 depicts an activity pixel in accordance with an embodiment of the present disclosure.

In an embodiment, as seen in FIG. 27, the activity is arranged as a grid of individual pixels. All the individual smaller pixels or elements form a larger pixel 2700 and form an exact grid. In an embodiment, a size of 2×4 elements is selected with 4 pixels along the horizontal and 2 pixels along the vertical, although any grid layout may be used, such as a 4×4, 2×2, etc. In an embodiment, an element may occupy more then 1 pixel. For example, element 2701 is 1×1 pixel, whereas, element 2702 is a 1×3 pixel. In an embodiment, a user taps or otherwise selects an individual element and moves the element anywhere within the large pixel area 2700. This is similar to how icons on a touch screen can be ordered or rearranged.

Once the activity is arranged by the user, the user customizes the activities display. Each activity contains a set of elements like header element 2701, info-graphics element 2702, sensor element 2703, feedback element 2704 and reporting element 2705. The reporting element may be a numerical display or raw data such as temperature. Activities may also comprise an information element 2706 that provides information about the activity creator or owner, version, etc. The informational element 2706 may be helpful in a map view where the activity is presented alone.

In an embodiment, a user, rather then selecting from the activity menu creates their own activity. By selecting a creator menu, the user selects individual elements to create a unique activity. The user creates the activities by just dragging and dropping individual elements like those shown for example in FIG. 27. The systems or app will build the new activity from the selected elements.

The individual elements may be tuned and adjusted by the user. By allowing elements to be customized, the activities may be user defined to set parameters, alarms, operating ranges, and other personalized settings. For example, header element 2701 can be changed from "Sauna" to "Sunset" and sensor element 2703 from temperature to light. Feedback element 2704 which provides feedback to the user when an event occurs, can be altered from sending the message "Sauna Ready" to "Sun Setting". Additionally, feedback element 2704 may be color coded and can include triggers and thresholds that may be user defined. In an embodiment, the feedback element 2704 becomes visual on the life stream and that defines when the update to stream will occur. For example, whenever the monitored condition changes, i.e., "Sauna heating up" to "Sauna Ready", the data will be updated and the feedback displayed will change as well. It is understood, that in an embodiment, the defines these messages with text, colors, and triggers that can cause the feedback to notify the user. In some embodiments, the feedback may trigger other external devices. In an embodiment, the feedback can be used to generate an "Alarm" that may causes the system to use appropriate tools like SMS, voice messages, iOS alarms to notify the user of the change in the event on the monitored life stream. In this manner, the activities that can be created and utilized by users may be greatly expanded to monitor and interact with the user. The info-graphics element 2702 may also be changed into some other style that visualizes sunsets better than the Sauna Temperature style does. For example, it may be a bar chart, circle chart, etc.

Figure 28A:
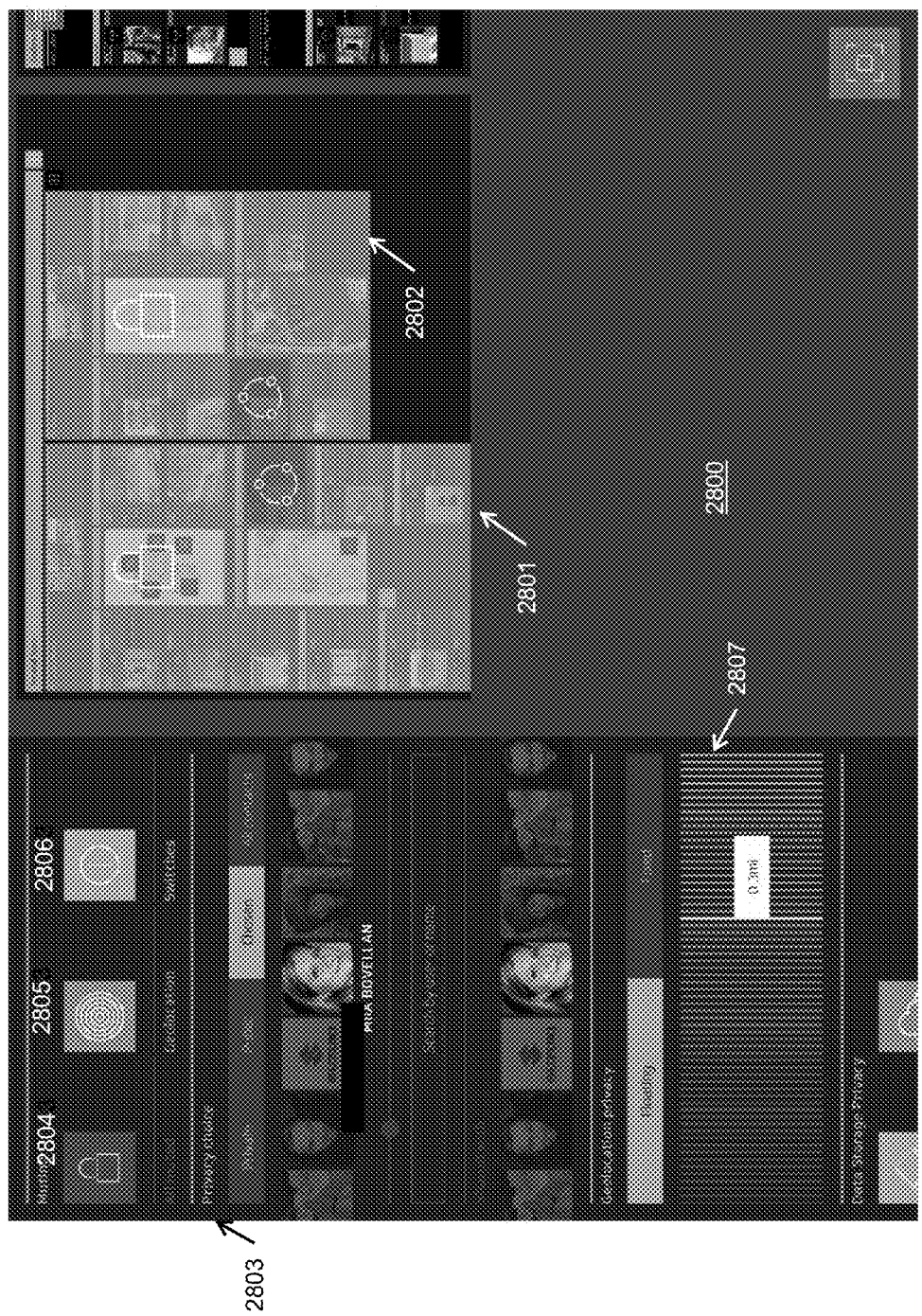
FIGS. 28A-B depict a user's privacy settings for a sensor based social networking system in accordance with an embodiment of the present disclosure.
Figure 28B:

FIGS. 28A and 28B depict a user's privacy settings for their sensor network on the HUD. In an embodiment, once the user sets up the HUD with all their activities they may assign different privacy setting/sharing setting to each activity. In an embodiment, all activities and elements are private by default until the user selects something different.

In an embodiment, if a user wants to define privacy settings on any activity, on the HUD, the user may tap or otherwise select the specific activity. The selected activity changes to a different color indicating the user has made a selection regarding that activity. In an embodiment, the activity transitions from to red from green to mark that the user is choosing to change the privacy setting for that activity.

In an embodiment, the user simultaneously selects a number of activities, such as activities 2801 and 2802, to apply the same privacy settings across the selected activities. Next, from the privacy settings menu 2803, the user selects what the privacy setting for the chosen activities will be. The setting can be "private", "public", (i.e., shared to all users), "chosen" (i.e. selected members from the user's network) or "all contacts", (i.e., all the user's contacts but not the entire network—not public). If selecting by contact a list of contacts from the user's contact list appears in the privacy menu 2800. The same contacts may be available on the contacts view.

Additional privacy setting switches such as "All Muted" 2804, "Geo Location", 2805 and "Switches" 2806 appear as buttons on the privacy screen 2800. All muted button 2804 mutes all of a user's sharing instantly, making none of the shared sensor assets visible to the outside world. Only the user will have access to the sensors and data when the all mute is deployed. By selecting the all muted button 2804, the user's data will disappear. By selecting it again, all the shared assets will reappear as they where. The history during the muted period will not be visible to shared audiences but will be available to the user. In an embodiment, the implementation of the muting occurs at the hardware level, i.e., at the link device 210. That is, once the mute is triggered, the link device hardware will do the muting. This is different then continuing to transmit data to a storage but not broadcasting the data. In this embodiment the data is not transmitted past the link device. For example, for a home based sensor network, if the user wants to stop sending data outside of his home to any networks whatsoever, the mute is executed at the link device hardware and no traceable sensor data is sent via a public network. So in an extreme case, if there is a data breach of a large scale server operations like Apple iCloud, the user can just by pressing all mute button 2804 stop all system communication to the outside world beyond the gateway of the link device 210. This hardware based privacy feature of the link device is central to the present disclosure. In an embodiment, based on various user defined set-ups, the link device may still store the "muted" data in link device memory and individual sensors memory until the all mute button function is disabled. In an embodiment, the user defined settings and privacy tool, allow the data to either be shared after the fact as history or remain private but stored in the user defined location. In an embodiment, this feature creates "dead zones" in the user's shared history when desired.

Similarly, in an embodiment, geo-location button 2805 will stop reporting the geo-location of the sensors to the shared audience. Additionally, in an embodiment, for reasons of security, geo-location may be dithered so as to not provide an exact location. Using slider 2807, the user may introduce some location delta into the geo-location data, thereby protecting the location and privacy of the user. The delta may be selected as a set fixed distance or may be a floating distance that varies.

In an embodiment, a location privacy element is added to the sensor data. The location privacy may be "floating" or "fixed." Slider 2807 on the privacy tools 2800 allows a user to define whether the location based data is accurate in its representation of location, i.e., "fixed" or if it is only in the proximity of the data source, i.e. "floating". By selecting a sensor icon on the map view a user may see an indicator that indicates that the position on the map is "true" and "fixed". If the sensor icon element does not have the indicator, it means that the user has decided to share the data but not the exact location, i.e., the sensor icon is floating. The amount of offset or float is determined by the user. In an embodiment, that range is between 0.1-5 miles, but preferably between 0.1 to 3 miles. The fact that the data is being shared with an offset, may be disclosed to other users so they may judge the quality of the data and determine if they can still wish to use it for their personal use. For example, if a user wants to check the temperature on 5th Ave in Manhattan, that user could be sure the reading they were viewing from a shared sensor is at least a temperature within the Manhattan area even if its floating and not exactly on 5th Avenue. This location privacy feature enables sharing any location while maintaining a level of privacy. In another example, a user may wish to share the city they are in but not the exact location. In an embodiment, the system shows the floating data point on the map view randomly within the set radius from its source and updates the location randomly upon refresh of the map view screen at pre-defined intervals.

In an embodiment, switch button 2806, will stop any activity of a sensor switch that may be controlling another device.

FIG. 28B depicts a data privacy portion 2808 of the privacy screen 2800. As depicted, the data privacy buttons 2809 and 2810 allow the user to select where the sensor data will be stored. The user may select between a personal cloud space or a provider cloud space.

In an embodiment, once a user has established a sensor network of personal and shared sensors, the user may view all the data in any variety of ways. Such life stream data may include data from one or more sensors and may include sensors from a provider such as Zen-Me® or other third party sensors from other sensor manufacturers.

Figure 29A:
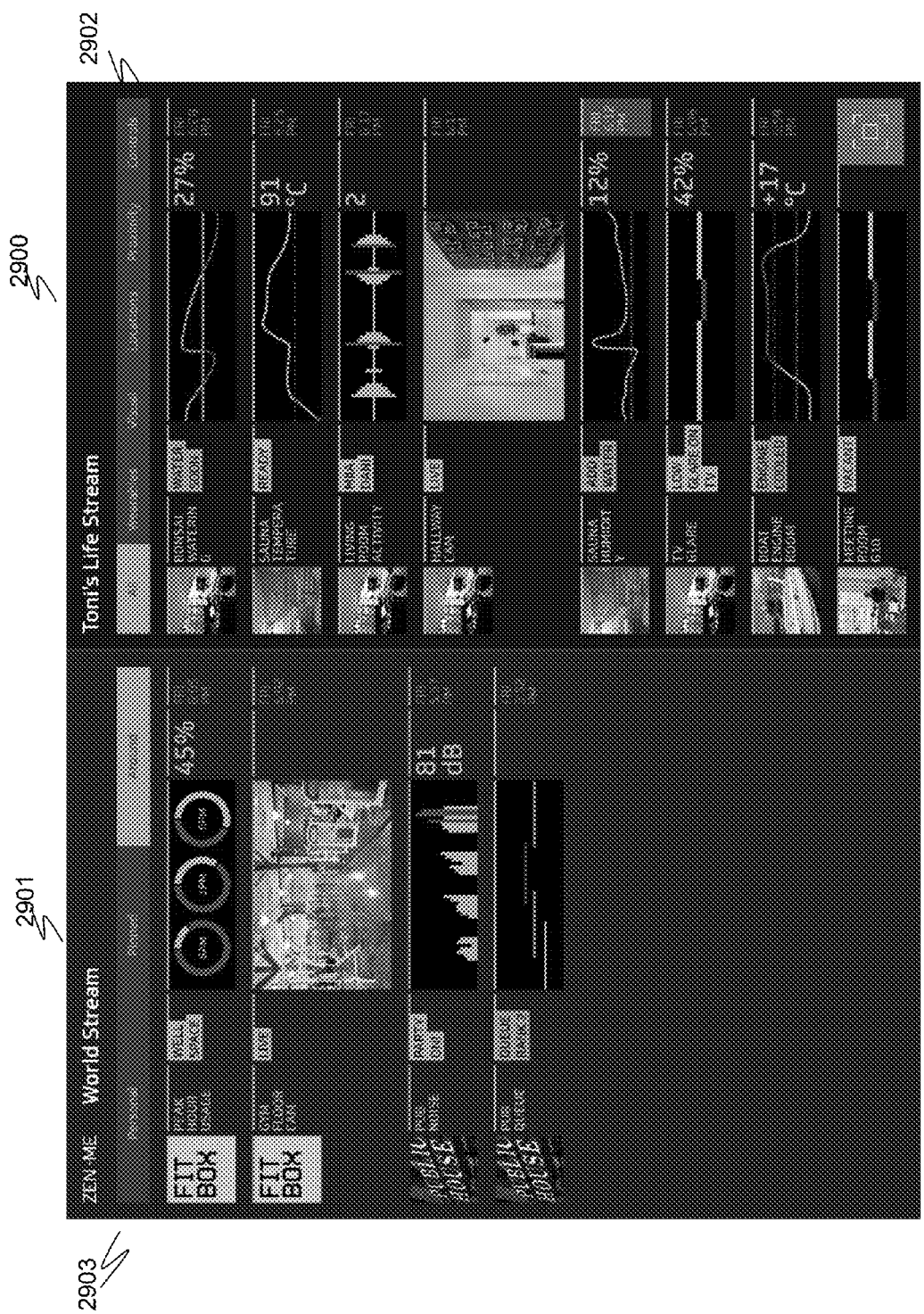
FIGS. 29A-H depict various stream views of a user's sensor network in accordance with an embodiment of the present disclosure.

FIGS. 29A-H depict various stream views of a user's sensor network in an embodiment of the present disclosure, although other views and displays may be used. FIG. 29A shows the user's personal life stream 2900 built off of the user's own sensors and a world stream 2901 showing other user's sensors that the user is monitoring. In FIG. 29A all the user's sensors are shown in the life stream 2900, but menu 2902 allows the user to selectively choose groupings of sensors such as wearable sensors, visual sensors, location based sensors, proximity sensors, and control type sensors.

Menus 2903 similarly may allow the user to view different views in the world stream, such as the user's personal sensors in the world view, i.e., how others may see them, public sensors in proximity to the user's location, and pinned sensor activities that the user has selected. In an embodiment, the world stream 2901 is different than life stream 2900. The life stream 2900 displays data the user collects about his or her personal life and personal space. The world stream 2901 displays data that the world reports to the user, i.e., data shared by others. The section "personal" in menu 2903 on the world stream 2901 is another privacy feature that allows the user to clearly see exactly what data the user collects on the life stream that the user has decided to share with the world. The world stream 2901 can have all the same views as the life stream 2900 but will consist of only the data that another user shares with the current user. In that way, in an embodiment, a user can add a view like "My Boss" to the world stream 2901 thereby following in that stream only the activities that the user's boss has decided to share with the user or everyone. "Pinned" view in menu 2903 is another view that follows the activities that the user has pinned to follow on this view. These pinned views may be used to cluster or group activities into relevant categories for the user to follow. For example, a user could create a grouping for music or clubs. In an embodiment, these views can be added by the user and named anything the user chooses, in an embodiment, "personal" is the default view and can not be removed.

Figure 29B:
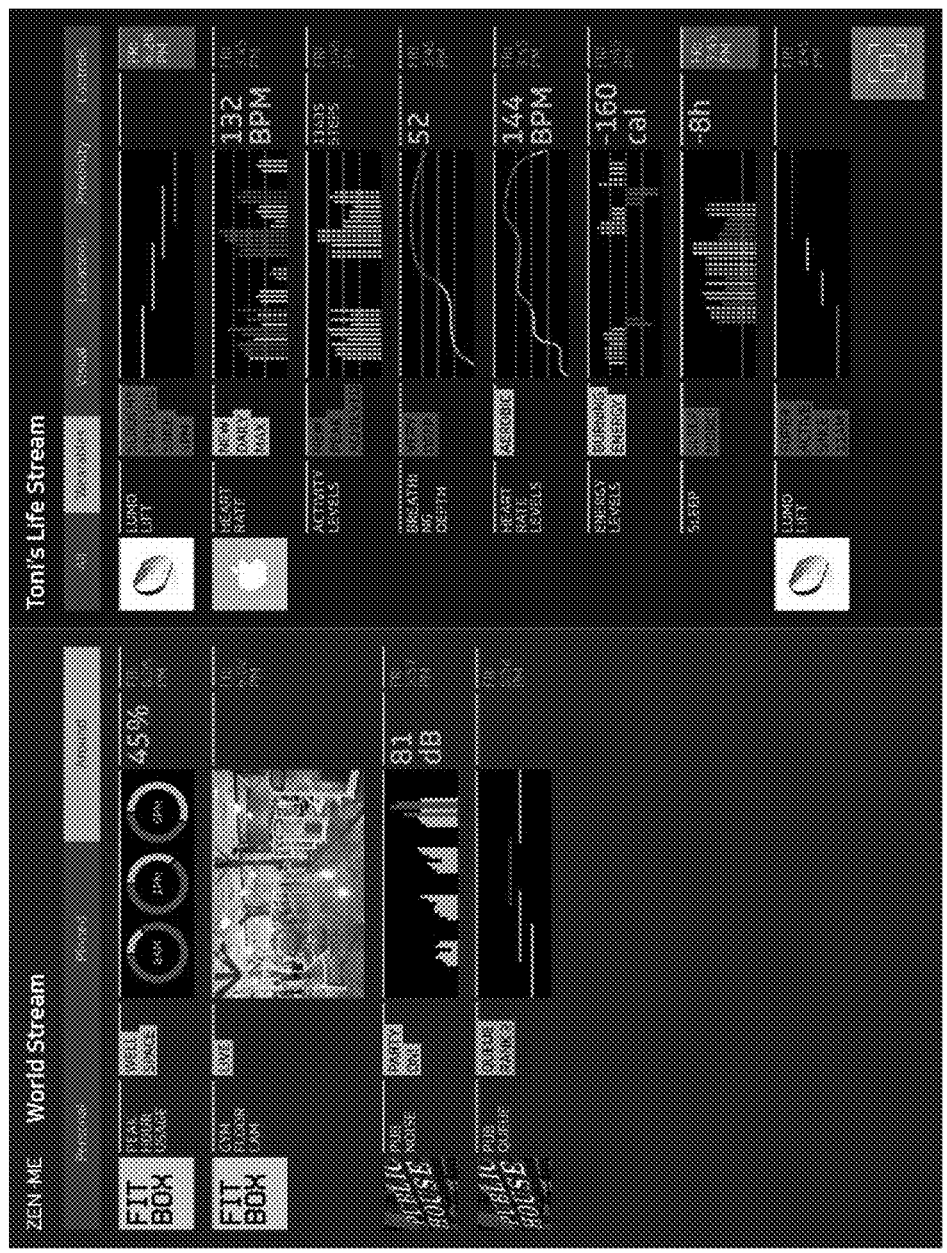
Figure 29C:
Figure 29D:
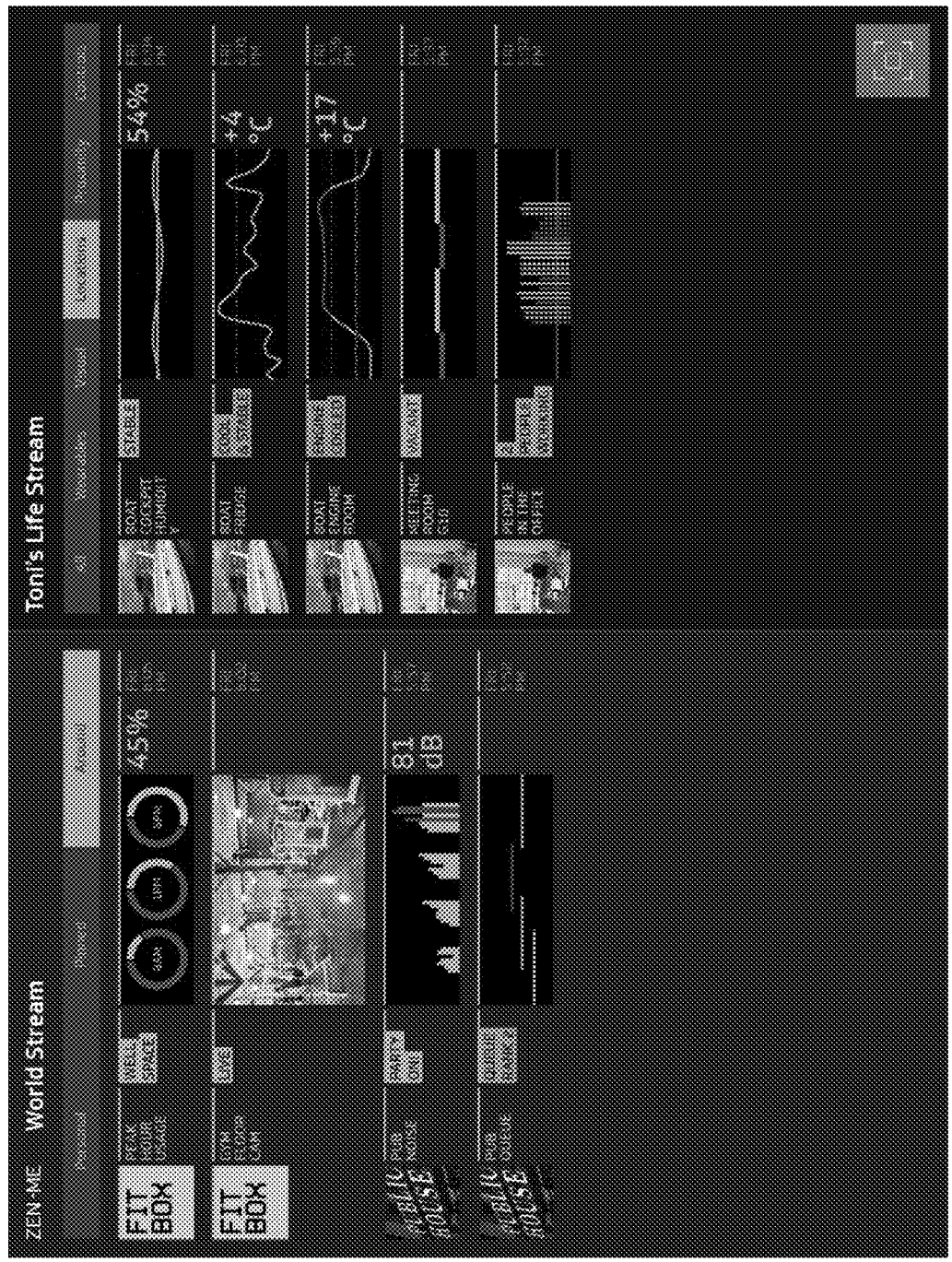
Figure 29E:
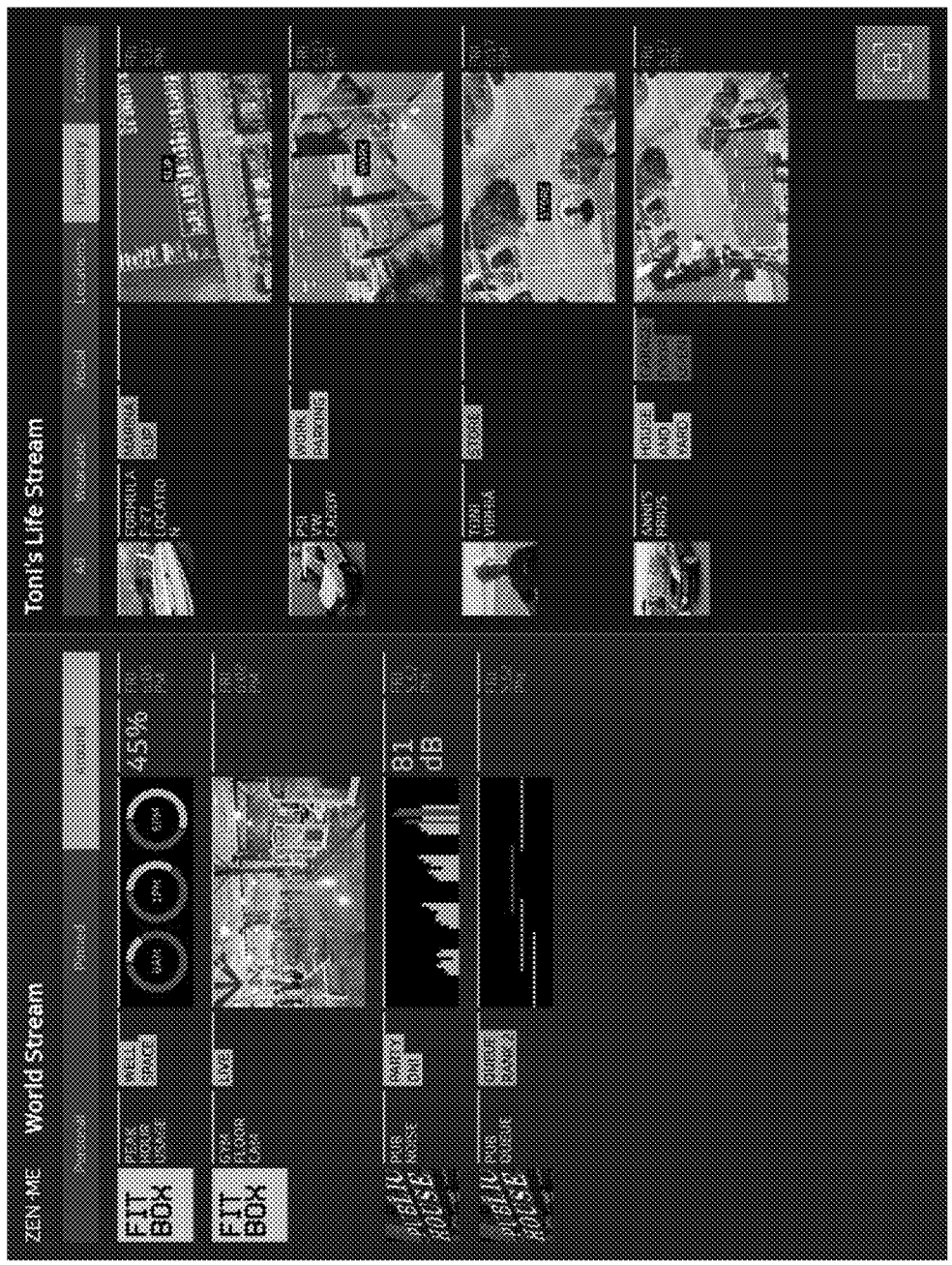
Figure 29F:
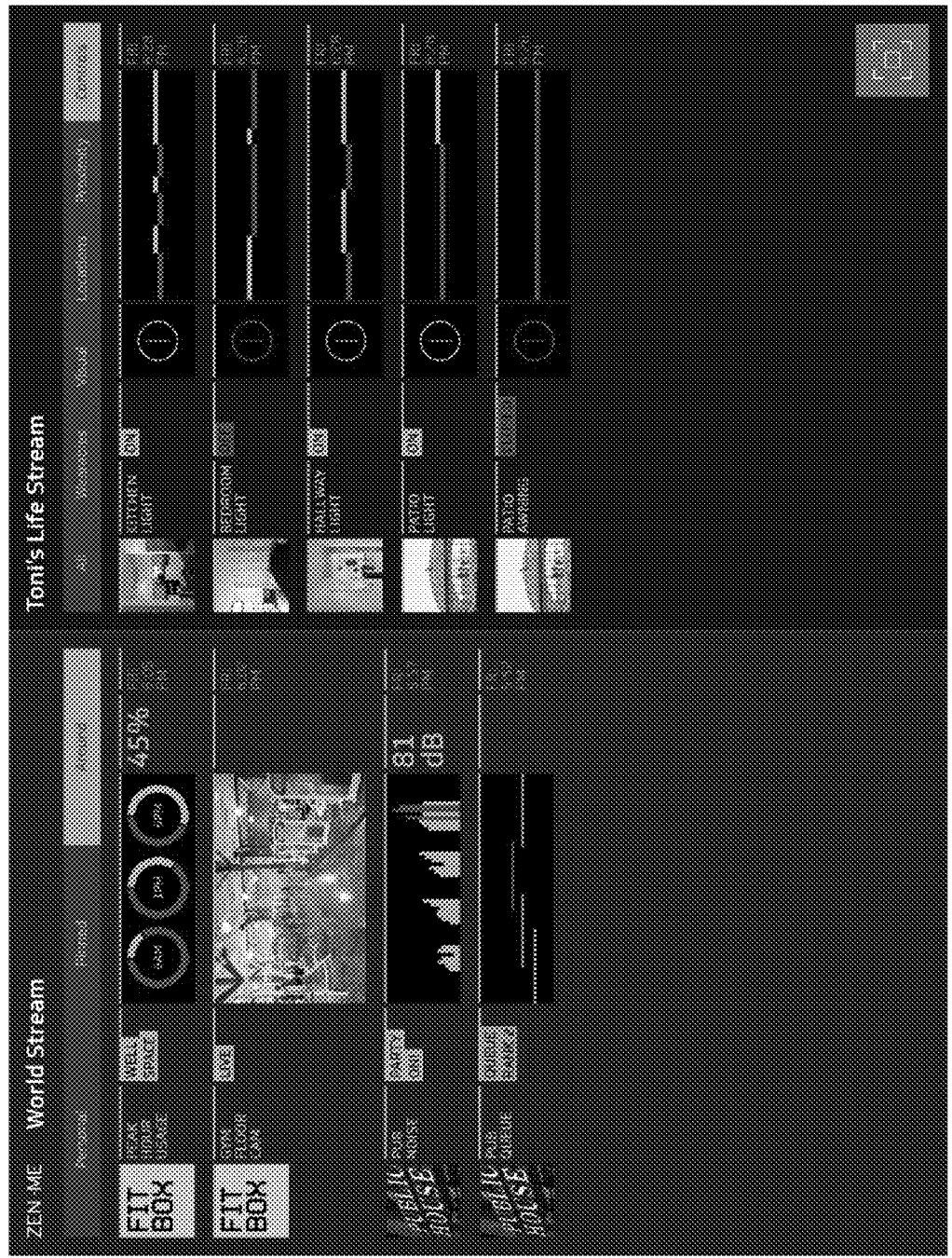
Figure 29G:
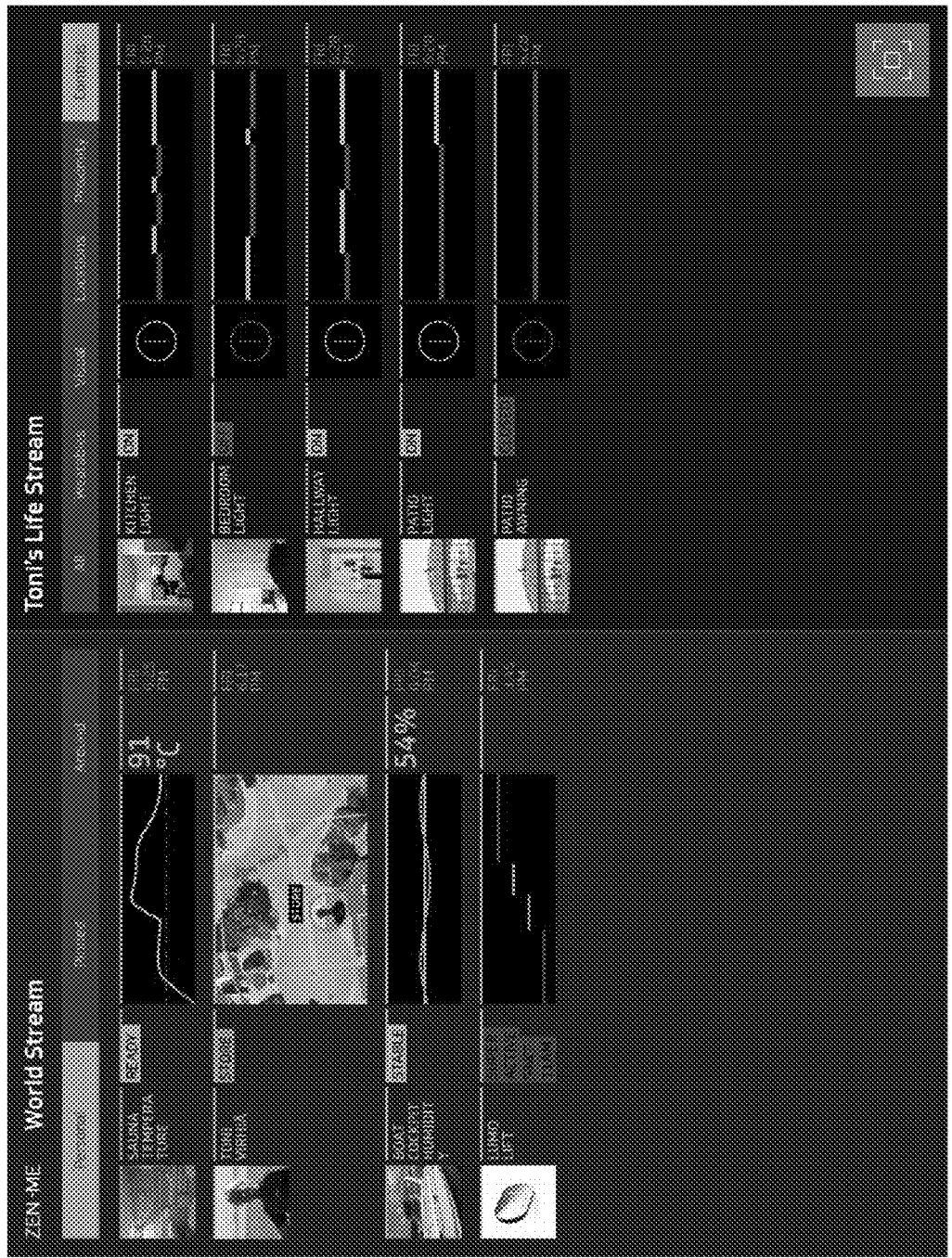
Figure 29H:

FIG. 29B shows all the activities for the wearable sensors the user may be currently monitoring. FIG. 29C shows all the visual sensors, FIG. 29D shows the activities sorted by locations, FIG. 29D all activities sorted by proximity and FIG. 29E shows all the control type devices the user is monitoring and or controlling. FIGS. 29F and 29G depict different world stream views as well.

In an embodiment, activity from the sensor data streams may be shared with other users who then may provide comments, post and add updates about the Activities and generally discuss and share the sensor data.

Comments on the sensor data may be in the form of text, pictures, links, or any other format. User's with access to an activity may interact in a social network aspect with the data and/or the data's owner to provide insight, updates, and commentary based on the data.

In an embodiment, the sensor data, data stream is presented in a timeline format that represents the sensor activities in chronological order. Associated with that data is any corresponding comments and posts shared by the user and or any of the user's contacts that have access to that data. In an embodiment, the user is able to manage the data and information about his or her activities in real life via the streamed sensor updates from the user's private network of social sensors.

In an embodiment, the timeline presentation of data allows users to comment and share information in chronological format based on the network sensor data. As the sensor data is gathered, the information is conveyed to the secure storage and is identified with a universal time indicator. Time indicators may be provided from the GPS information or may be generated based on a system wide or network wide timing mechanism. In an embodiment the sensor data owner may decide how the sensor data is shared. The data owner may set commenting levels and permissions as well. For example, a user that shares data with select members within a group may allow those users to comment on the data and to share those comments with others that have access to that data. Additionally and/or alternatively, those users may be able to post comments which are viewable by a subgroup of users or the data owner only. In another embodiment, the data may be sharable with all users. Still further, the activity data may be shared only once by using a "Share Once" function. Such a function allows a user to share a moment of personal sensor data without having to share the full history or to allow future sensor data to be shared.

Figure 30B:
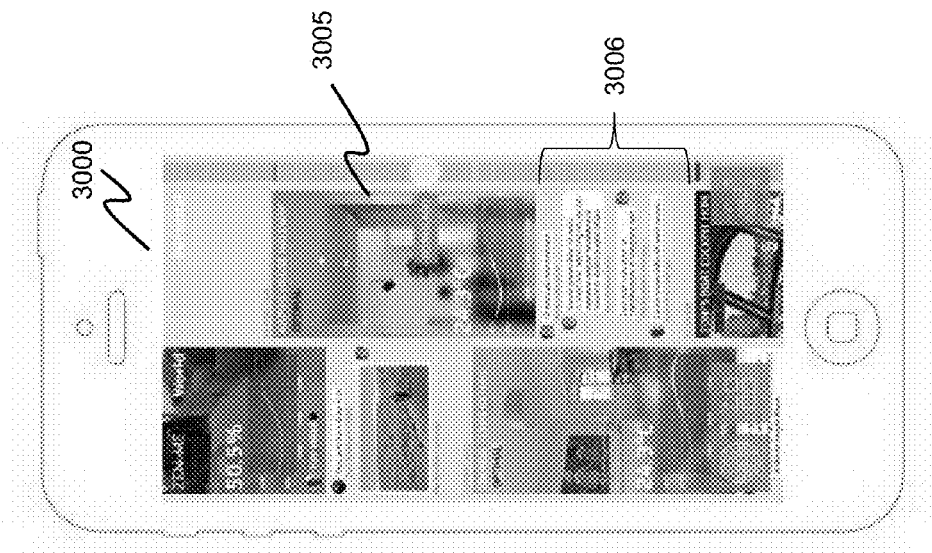
FIGS. 30A-B depicts an activity screen with a social network in accordance with an embodiment of the present disclosure.
Figure 30A:
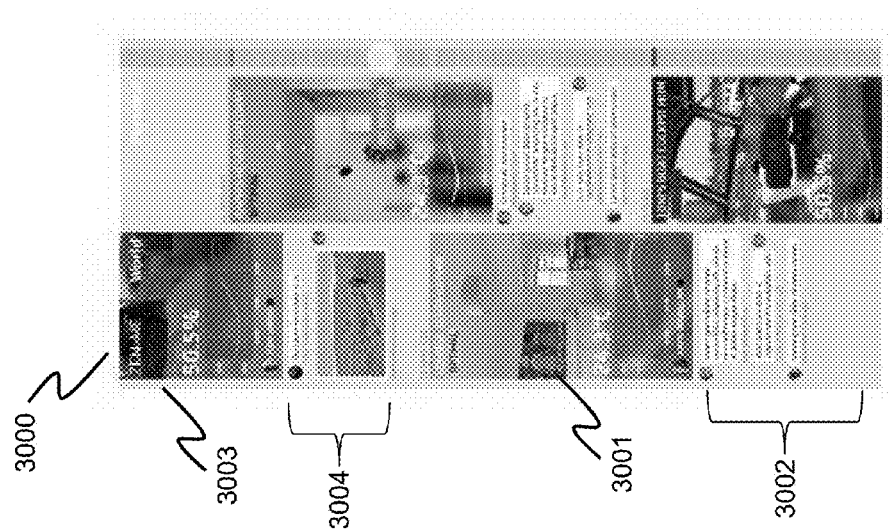

FIGS. 30A-B depicts a world view stream in an embodiment for use on a personal mobile device such as a smart phone. Screen 3000 depicts a user's world view as it may appear on a mobile device such as a smart phone. Activity tiles 3001, 3003, and 3005 represent different sensor activities that the user is monitoring. These may be the user's own sensor activities or activities that have been shared by others. Each activity may have its own social media component associated with it, such as a conversation, photo, etc., Users may engage in conversation and post updates related to various activities, such as seen in area 3002 and 3006. Alternatively, and/or additionally, users may post photos and comments associated with the activity as seen in area 3004. It is to be understood that there is no limit to the nature of the conversation, content or type of information that may be shared, posted and/or commented on. User's can post hyperlinks, audio files, video files, or other information in comments.

FIGS. 31A-B depicts an expanded view of the world view screen for activity 3001. This view may be seen when a user engages the activity from the summary screen. Conversation 3002, related to activity 3001 may have two participants, 3101, 3102 or any number of participants. If the viewer looks to expand the information associated with activity 3001 the user may select that activity and to be presented with expanded information. Additionally, and/or alternatively, the user may swipe left or right or up and down to advance from one monitored activity tile to the next.

Figure 32:
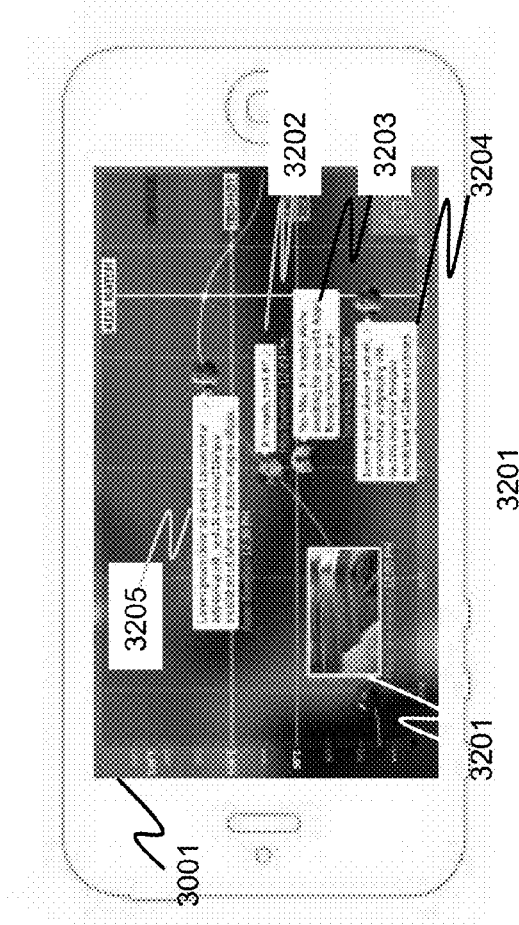
FIG. 32 depicts an activity screen with a social network in accordance with an embodiment of the present disclosure.

FIG. 32 depicts an expanded view of the data and the social conversation, networking, aspect associated with that activity. FIG. 32 depicts activity 3001 with the conversation 3002 presented in a chronological order associated with the data. As seen, comment 3201 the start of the conversation begins with a photo at 12:09 and is pinned to that time on the data stream. Subsequent conversations 3202-04, which occur some time later appear further down the data stream and directly below each other indicating their close proximity in time. Comment 3205, however, which occurs later in time, is shown further chronologically further down the data stream. In this manner asocial network associated with the active data may be established.

Figure 33:
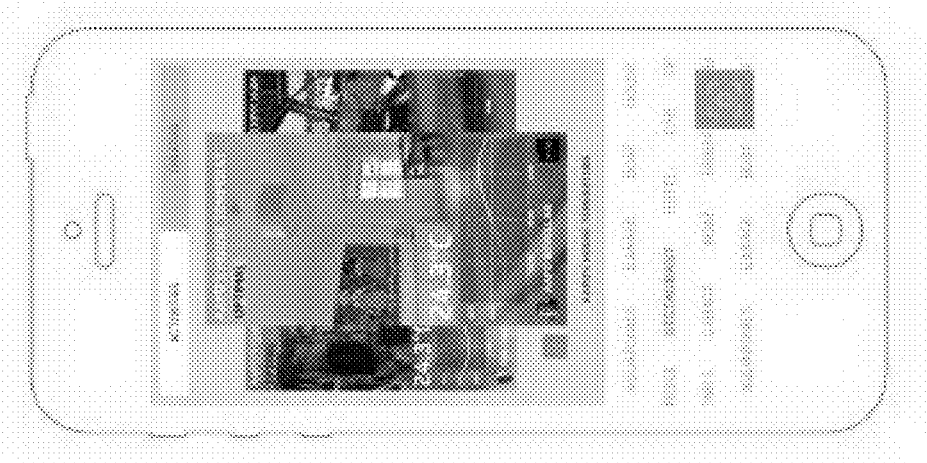
FIG. 33 depicts an activity screen in accordance with an embodiment of the present disclosure.

FIG. 33 depicts the activity tiles selection and as seen, allows the user to swipe through their activities, or select them based on a category.

In an embodiment, the social data itself is cataloged and indexed based on a number of criteria, such as user, commenter, type of activity followed, location, frequency and others. For example, if the activity was a sauna-activity, the social data related to the activity may be indexed based on the activity. So if a user shares the activity, the user can also share the social data related to the activity, like discussions, or only the Activity with sensor data only. This data may be indexed on any one or more of the identified criteria allowing the operator (i.e., system owner) an opportunity to gather large amounts of user data from users showing a propensity to specific topics. Such indexed data may be of substantial value to the system owner. The data owner may decide to auction their own data to third parties such as companies willing to buy such data, however, it is up to the data owner to control the data. In an embodiment, the monetization of data includes the owner. That is, the data owner/user can auction the data though a provided third-party service, wherein the third-party service provider takes a share of owner's transaction but does not control any decisions about the ultimate sale of the data.

By allowing the data to be pre indexed allows a potential data user an opportunity to quickly and easily use such data. It is to be understood, that it is up to the actual user to allow the use of the data by selecting various privacy settings associated with the private network of social sensors.

In an embodiment, the indexed data may be monetized. This may be done by auction, bulk purchase, criteria purchase, targeted user data purchases, etc. However, because the data is indexed as it is catalogued, the granularity of data purchases of user information is easy and efficient.

Figure 35:
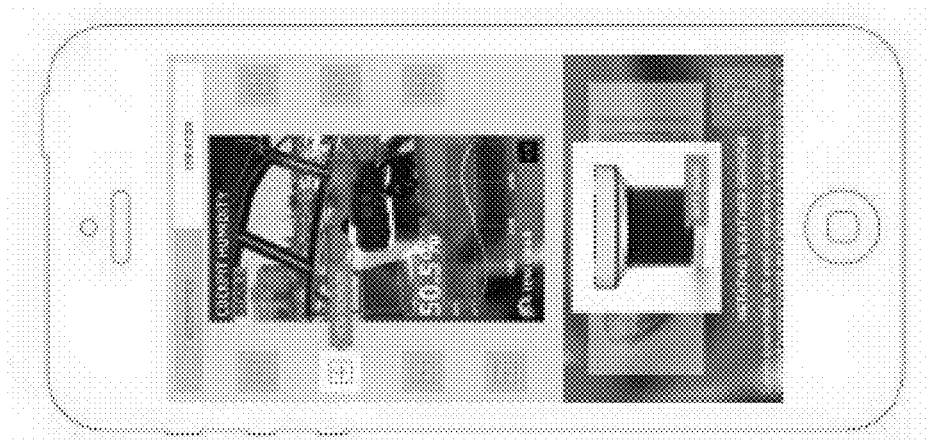
FIG. 35 depicts an activity screen creator in accordance with an embodiment of the present disclosure.
Figure 34:
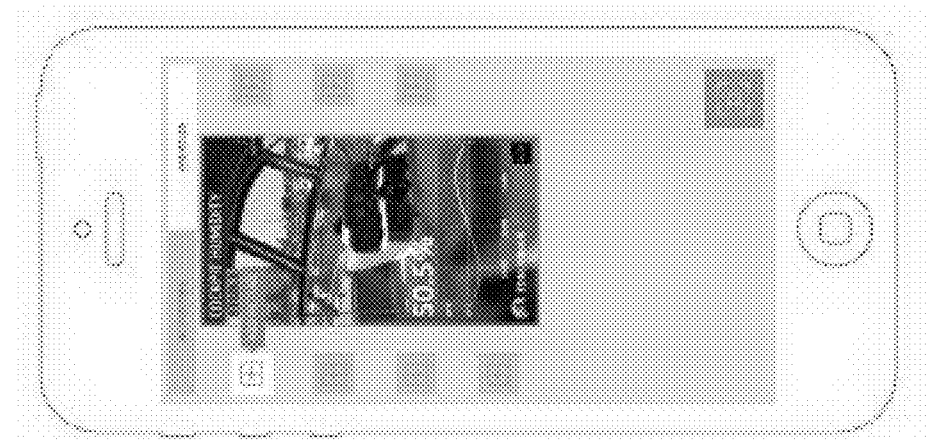
FIG. 34 depicts an activity screen creator in accordance with an embodiment of the present disclosure.

FIGS. 34-37 depict various activity creator pages in an embodiment. FIG. 34 depicts the activity creator page allowing the user to select, a photo for the activity backdrop, thereby personalizing their activity as well as making it illustrative of what area and/or type of sensor monitor will be being used. For example, a user may select a garden picture if they are creating an activity for a moisture sensor or a pool or hot tub picture for a temperature sensor. They may select a picture of a kitchen or den if creating an activity associated with a room within a home or office. In an embodiment, the user may select a picture from a personal or general photo library or may choose to take a picture. The user may crop, edit, rotate, or otherwise manipulate the picture in any way prior to selecting it as the background for the activity. FIG. 35 depicts the activity tile creator allowing for the user to select the sensor to associate with the specific activity. As seen in FIG. 35, the user may select a weather sensor to monitor humidity or any other available sensor. In an embodiment, the selection of a sensor may prompt the user with an opportunity to purchase the sensor directly from the activity creator.

Figure 36:
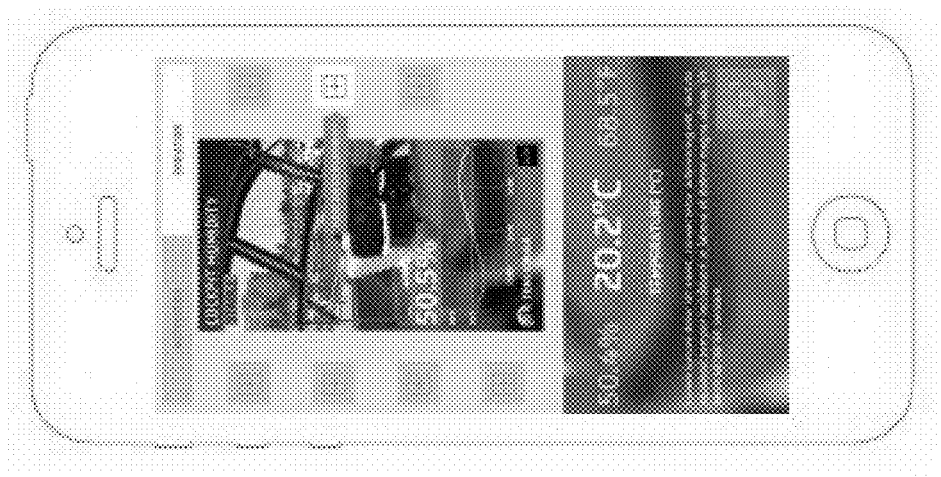
FIG. 36 depicts an activity screen creator in accordance with an embodiment of the present disclosure.

FIG. 36 depicts another step in the activity creator which allows the user to select a data element for the sensor, such as a threshold or set point. For example, a user may select a data element for a alarm or a ready trigger. The selection of available data elements will be dependent on the sensor selected.

Figure 37:
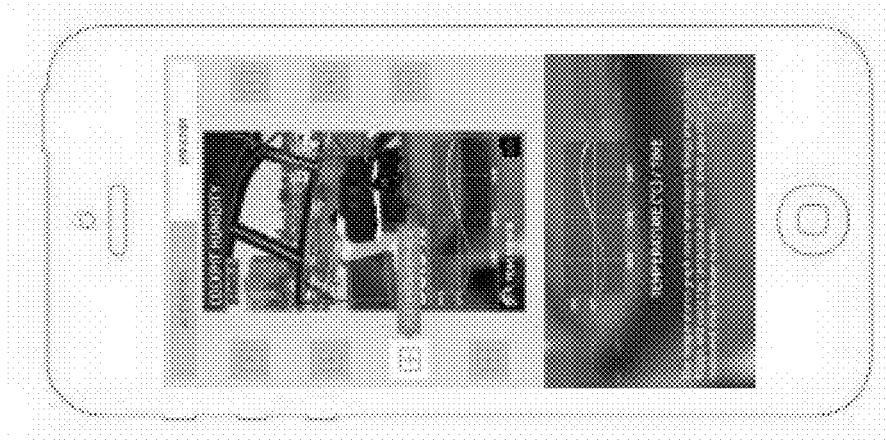
FIG. 37 depicts an activity screen creator in accordance with an embodiment of the present disclosure.

FIG. 37 depicts the feedback element that can be added during the creation of an activity. The feedback could be a graph of any type and color or may be alphanumeric, or any other available symbol, chart, or graphic that represents the data to the user. Other options for creation of the activity include but are not limited to creating titles, descriptions, color options, fonts, images, videos, etc. The creation of the personal activity screen allows the user to personalize the experience while also customizing the activity in such a way that others may be inspired to use that activity for their own rather then create an activity. Any activity a user selects may be edited and/or personalized for the user. Additionally and/or alternatively, a user may make his or her activities public for others to use and/or be inspired by. In this manner there is no need for a user to recreate an activity that has already been designed and or deployed.

Figure 38:
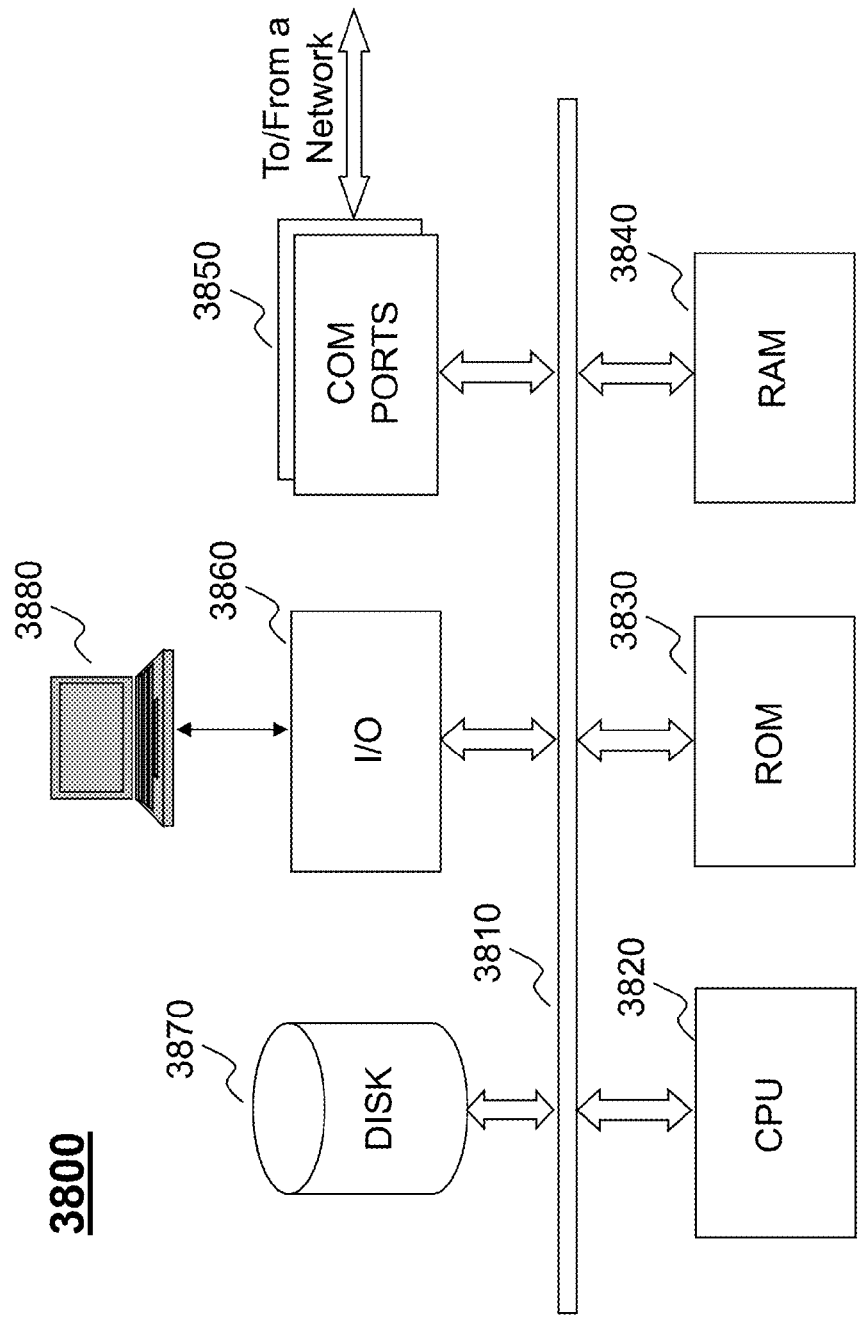
FIG. 38 depicts a general computer architecture in accordance with an embodiment of the present disclosure

FIG. 38 depicts a general computer architecture on which the present teaching can be implemented and has a functional block diagram illustration of a computer hardware platform which includes user interface elements. The computer may be a general purpose computer or a special purpose computer. This computer 3800 can be used to implement any components of the sensor social networking platform as described herein. For example, the secure storage, the network, the activity library can all be implemented on a computer such as computer 3800, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 3800, for example, includes COM ports 3850 connected to and from a network connected thereto to facilitate data communications. The computer 3800 also includes a central processing unit (CPU) 3820, in the form of one or more processors, for executing program instructions. The exemplary computer platform includes an internal communication bus 3810, program storage and data storage of different forms, e.g., disk 3870, read only memory (ROM) 3830, or random access memory (RAM) 3840, for various data files to be processed and/or communicated by the computer, as well as possibly program instructions to be executed by the CPU. The computer 3800 also includes an I/O component 3860, supporting input/output flows between the computer and other components therein such as user interface elements 3880. The computer 3800 may also receive programming and data via network communications.

Hence, aspects of the sensor social networking platform may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated devices thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer of the sensor social networking platform or other DCP service provider into the hardware platform(s) of a computing environment or other system implementing a computing environment or similar functionalities in connection with generating the sensor social networking platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the sensor social networking platform and its components as disclosed herein can be implemented as a firmware, firmware/software combination, firmware/hardware combination, or a hardware/firmware/software combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system for gathering data comprising:
   a sensor with a unique sensor ID;
   a communications device with a unique communications device ID;
   a device certificate having an information code associated with the unique sensor ID or the unique communications device ID, and
   a secure data store including a database for confirming pairing of sensor and communications devices based on the unique sensor ID and unique communications device ID;
   wherein the sensor is capable of being paired with the communications device in an exclusive relationship based on the sensor ID, the communications device ID, the database and the device certificate,
   the communications device is capable of being paired with the data store based on the communications device ID;
   wherein the unique sensor ID is unalterable and hardwired into the sensor as a number of fuses that are permanently blown to either represent a 0 or 1 and/or the unique communications device ID is unalterable and hardwired into the communications device as a number of fuses that are permanently blown to either represent a 0 or 1.

2. The system of claim 1, wherein sensor data from the sensor is communicated to the communications device via a first communications link, and wherein the sensor data is communicated from the communications device to the data store via a second communications link.

3. The system of claim 2 where the first communications link is a short range communications link.

4. The system of claim 1 where the information code is a machine readable code.

5. The system of claim 1 where the device certificate is a paper certificate and the information code is unique to the sensor or the communications device.

6. The system of claim 1 where the device certificate is available electronically and the information code is unique to the sensor or the communications device.

7. The system of claim 1, wherein the unique sensor ID and/or the unique communications device ID hardwired into the sensor or communications device respectively is unalterable.

8. The system of claim 7, wherein the hardwired unique sensor ID and/or unique communications device ID is hardwired with a multi-digit one time programmable fuse method.

9. The system of claim 1, wherein the communications device includes a special authentication circuit having a pre-programmed unique serial number, and wherein the communications device and the sensor are capable of being irreversibly paired via the special authentication circuit.

10. A method for collecting data comprising:
    from a sensor having a unique sensor ID which is paired to a communications device having a unique communications device ID, said pairing being based on the unique sensor ID, the unique communications device ID and a device certificate having an information code associated with the unique sensor ID or the unique communication device ID, wherein the unique sensor ID is unalterable and hardwired into the sensor as a number of fuses that are permanently blown to either represent a 0 or 1 and/or the unique communications device ID is unalterable and hardwired into the communications device as a number of fuses that are permanently blown to either represent a 0 or 1 said collection method further comprising:
    generating via the sensor, said sensor being paired based on the hardwired unique sensor ID and/or the hardwired unique communications device ID as well as a device certificate and a database in a data store for confirming pairing, sensor data related to an environmental parameter; transmitting, from the paired sensor, via a short range communications link, the sensor data to the paired communications device;
    receiving, at the paired communications device, the sensor data;
    transmitting, from the paired communications device, to a network, via a communications link, the received sensor data;
    receiving at the data store, via the network, the transmitted sensor data; and
    storing the sensor data in the data store.

11. The method of claim 10 further comprising;
    displaying the sensor data on a display of a personal user device;
    wherein the displayed sensor data is associated with at least one of the following: a geographic location, a user, a sensor type, a geographic region, a vendor, a residence, a commercial establishment, a vehicle, a building, a storage location, and a facility.

12. The method of claim 11 wherein the displayed sensor data is positioned on an underlying map, and wherein the map is capable of displaying a personal space layer.

13. The method of claim 10 further comprising:
    determining a data storage location based on a user selected data storage setting,
    wherein the data storage setting is capable of being selected from a private storage setting or a third-party storage setting.

14. The method of claim 10 further comprising:
    pairing the sensor to the communications device in an exclusive relationship based on the sensor ID and the communications device ID.

15. The method of claim 14 wherein the communications device pairs with a plurality of sensors.

16. The method of claim 14 wherein the pairing between the sensor and the communications device is irreversible.

17. The method of claim 10, wherein after pairing, the sensor is not detectable to non-paired communications devices.

18. A method for establishing sensor data privacy comprising:
  installing a client on a first communications device;
  establishing, via a first short range communications link, a connection between the first communications device and a second communication device;
  communicating, via a communications link, between the first communications device and a database;
  inputting, into the first communications device, a unique ID associated with the second communications device from a device certificate having an information code associated with said second communications device, wherein the unique ID is unalterable and hardwired into the second communications device as a number of fuses permanently blown to either represent a 0 or 1;
  transmitting, via the communications link, the input unique ID associated with the second communications device;
  authenticating the second communications device, by comparing the input unique ID associated with the second communications device to data stored in the database;
  pairing, based on the authentication, the first communications device and the second communications device, and
  storing pairing confirmation information in the database.

19. The method of claim 18 further comprising:
  establishing, via a second short range communications link, a connection between the second communications device and a sensor;
  inputting, via the client, a sensor ID associated with the sensor;
  transmitting, via the communications link, the sensor ID to the database;
  authenticating the sensor, by comparing the sensor ID to data stored in the database;
  pairing, based on the authentication, the sensor with the first communications device and the second communications device.

20. The method of claim 18 further comprising:
  transmitting sensor data from the sensor, via the second short range communications link, to the second communications device;
  receiving, at the second communications device, the sensor data;
  transmitting from the second communications device, via a second communications link, the received sensor data;
  receiving, the transmitted sensor data; and
  storing the sensor data in a secure data store.

* * * * *